(12) United States Patent
Sanfilippo et al.

(10) Patent No.: US 11,673,728 B2
(45) Date of Patent: Jun. 13, 2023

(54) DUAL FUNCTION PORTION CONTROL CONTAINER AND METHOD OF MAKING THE SAME

(71) Applicant: Sonoco Development Inc., Hartsville, SC (US)

(72) Inventors: James J. Sanfilippo, Barrington Hills, IL (US); John E. Sanfilippo, Barrington Hills, IL (US); Jeanne M. Skaggs, Arlington Heights, IL (US)

(73) Assignee: Sonoco Development Inc., Hartsville, SC (US)

( * ) Notice: Subject to any disclaimer, the term of this patent is extended or adjusted under 35 U.S.C. 154(b) by 333 days.

(21) Appl. No.: 16/757,365

(22) PCT Filed: Oct. 18, 2018

(86) PCT No.: PCT/US2018/056500
§ 371 (c)(1),
(2) Date: Apr. 17, 2020

(87) PCT Pub. No.: WO2019/079588
PCT Pub. Date: Apr. 25, 2019

(65) Prior Publication Data
US 2020/0239212 A1 Jul. 30, 2020

Related U.S. Application Data

(60) Provisional application No. 62/574,174, filed on Oct. 18, 2017.

(51) Int. Cl.
*B65D 77/20* (2006.01)
*B31B 50/84* (2017.01)
(Continued)

(52) U.S. Cl.
CPC ........ *B65D 77/2056* (2013.01); *B23K 26/362* (2013.01); *B31B 50/84* (2017.08);
(Continued)

(58) Field of Classification Search
CPC .............. B65D 77/2032; B65D 75/325; B65D 77/2056; B65D 1/30; B65D 47/36;
(Continued)

(56) References Cited

U.S. PATENT DOCUMENTS 3,184,121 A * 5/1965 Volckening ........ B65D 75/5811
222/541.6
5,411,178 A * 5/1995 Roders ................. A47K 5/1215
222/541.9
(Continued)

FOREIGN PATENT DOCUMENTS

EP     1046595 A1    10/2000
EP     2599735 A1    6/2013
(Continued)

OTHER PUBLICATIONS

International Preliminary Report on Patentability for International Application No. PCT/US2018/056550, dated Apr. 21, 2020.
(Continued)

*Primary Examiner* — Kareen K Thomas
(74) *Attorney, Agent, or Firm* — Marshall, Gerstein & Borun LLP

(57) ABSTRACT

In an embodiment, a portion control container can have a body and a lid sealed to the body. The lid can have defined therein a spout-type opening. The spout-type opening can be defined by an initiation region having 100% cut-through the lid that transitions to a pattern of reduced strength having less than 100% penetration through the lid. The container can remain sealed until the lid is separate from the container along the seal to provide a dip-type opening or the lid
(Continued)

material is torn at the initiation region and pattern of reduced strength to define a spout-type opening for squeeze dispensing of the product from the container.

14 Claims, 55 Drawing Sheets

(51) Int. Cl.
    *B23K 26/362*     (2014.01)
    *B65D 1/30*     (2006.01)
    *B65D 47/36*     (2006.01)
    *B31B 120/10*     (2017.01)

(52) U.S. Cl.
    CPC .............. *B65D 1/30* (2013.01); *B65D 47/36* (2013.01); *B31B 2120/10* (2017.08)

(58) Field of Classification Search
    CPC ...... B65D 2577/205; B65D 2577/2066; B65D 2577/2091; B23K 26/362; B31B 50/84; B31B 2120/10; B26F 1/22
    See application file for complete search history.

(56) References Cited

U.S. PATENT DOCUMENTS

| | | | | |
|---|---|---|---|---|
| 5,529,224 A | * | 6/1996 | Chan | B65D 75/5811 383/7 |
| 5,826,737 A | * | 10/1998 | Zakensberg | B65D 75/5811 222/541.6 |
| 5,839,609 A | * | 11/1998 | Zakensberg | B65D 75/32 206/820 |
| 5,996,845 A | * | 12/1999 | Chan | B65D 77/2068 222/212 |
| 6,085,942 A | * | 7/2000 | Redmond | B65D 75/5811 206/820 |
| D641,642 S | * | 7/2011 | Caldwell | D9/707 |
| 8,616,375 B2 | * | 12/2013 | Welch | B65D 75/5822 510/439 |
| 9,061,796 B2 | * | 6/2015 | Caldwell | B65D 21/0202 |
| 9,617,024 B2 | * | 4/2017 | Sharp | B65D 35/10 |
| 9,694,965 B2 | * | 7/2017 | Cox | B65D 75/54 |
| 9,988,190 B2 | * | 6/2018 | Berg, Jr. | B65D 75/008 |
| 10,017,300 B2 | * | 7/2018 | McGuire | B65D 35/24 |
| 10,266,328 B2 | * | 4/2019 | Arent | B65D 75/008 |
| 2004/0035865 A1 | * | 2/2004 | Rosen | B65D 75/008 220/4.01 |
| 2008/0058239 A1 | * | 3/2008 | Evers | E03D 9/022 222/321.1 |
| 2010/0320206 A1 | * | 12/2010 | Caldwell | B65D 85/72 220/266 |
| 2016/0362228 A1 | * | 12/2016 | McGuire | B65D 75/525 |

FOREIGN PATENT DOCUMENTS

| | | |
|---|---|---|
| JP | 2002160758 A | 6/2002 |
| WO | WO-2017/143143 A1 | 8/2017 |

OTHER PUBLICATIONS

International Search Report and Written Opinion, Corresponding Internatinal application dated Apr. 1, 2019.

* cited by examiner

DUAL FUNCTION PORTION CONTROL CONTAINER AND METHOD OF MAKING THE SAME

This application is a U.S. national stage of International Patent Application No. PCT/US18/56500 filed Oct. 18, 2018, which claims the benefit of U.S. Provisional Application 62/574,174 filed on Oct. 18, 2017, the disclosures of which are incorporated herein by reference in their entireties.

BACKGROUND

Field of the Disclosure

The disclosure is directed to a container having a lid that provides access to the product contained within the container in two different manners, such as squeezing and dipping, and to methods of making such a container.

Brief Description of Related Technology

Individual portion size, disposable containers are widely used, for example in the food service industry for condiments. Conventional portion control containers are provided in the form of foil packets, plastic bodies with peel-off foil lids, and plastic bodies with plastic lids. Recently, dip and squeeze type containers have made a commercial presence, providing a conventional dip-type access with a peel off lidding material, or having a twist off component of the lid and body to provide a squeeze spout alternative. Such containers can be difficult to manufacturing, requiring significant reconfiguration or entirely new fill and seal equipment. Additionally, because these require tearing of the rigid container body material, they can be difficult to open.

SUMMARY

In accordance with an embodiment, a lidding material can include a plurality of lids, each lid joined to an adjacent lid by at least one edge, and a continuous scoring pattern disposed at an intersection of four adjacent lids. The continuous scoring pattern comprising initiations regions and patterns of reduced strength defining spout-type openings in each of the four adjacent lids, wherein the continuous scoring pattern comprises initiation regions crossing between a boundary between adjacent lids, and patterns of reduced strength formed from each initiation region and extending inwardly toward an opposed corner of the lid.

In accordance with an embodiment of the disclosure, a container can include a body having an interior volume defined therein for retaining a product; a top flange surrounding a top surface of the body; and a lid having a spout-type opening region defined therein by at least one initiation region and a pattern of reduced strength connected to the initiation region. The spout-type opening is formed by removal of a portion of the lid starting at the initiation region and following the pattern of reduced strength. The initiation region can be a score line having 100% penetration through the lid, and the pattern of reduced strength can be a score line or perforations having less than 100% penetration through the lid.

In accordance with an embodiment, a method of forming a spout-type opening in a flexible lidding material can include laser scoring at least one initiation region starting from first end disposed at or near a circumferential edge of a lid defined in the lidding material and extending to a second end, the at least one initiation region comprising a score line having 100% penetration through the lidding material. The method can further include laser scoring a pattern of reduced strength starting from the second end of the initiation region and extending inwardly from the initiation region and then curving such that the direction of the pattern of reduced strength extends back towards a circumferential edge of the lid that interests with the circumferential edge of the lid from which the initiation region started.

DETAILED DESCRIPTION

Disclosed herein is a container having a body and a lid sealed to the body. The container advantageously includes a lid that is capable of providing dual access to a produced sealed within the container. In various embodiments, the lid can be attached to a conventional body or a body fitting in conventional fill and seal equipment. Dual functionality of the container can thus be advantageously provided without modification of conventional fill and seal equipment.

Figure 1A:
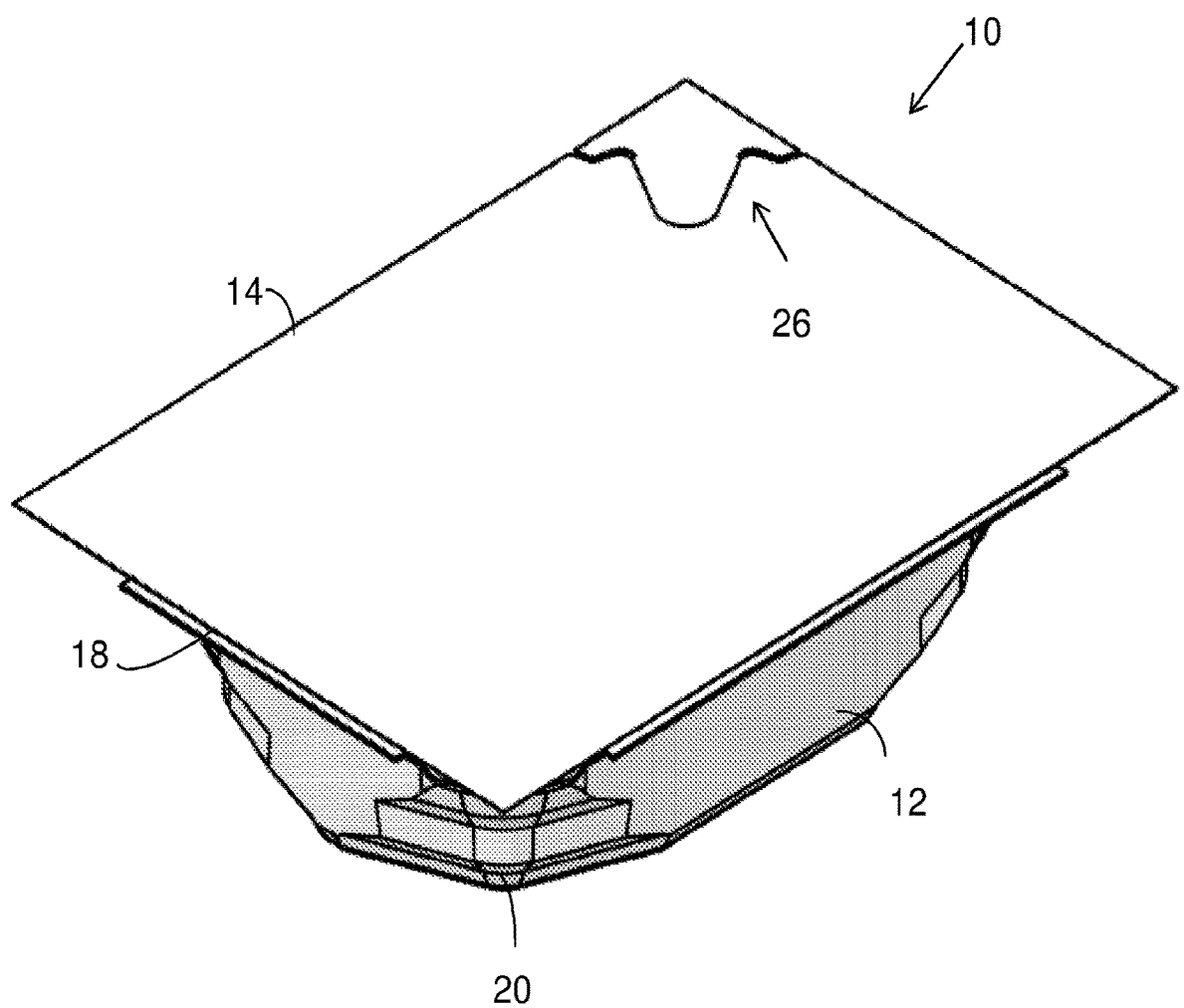
FIG. 1A is a top perspective view of a container in accordance with an embodiment of the disclosure.
Figure 1D:
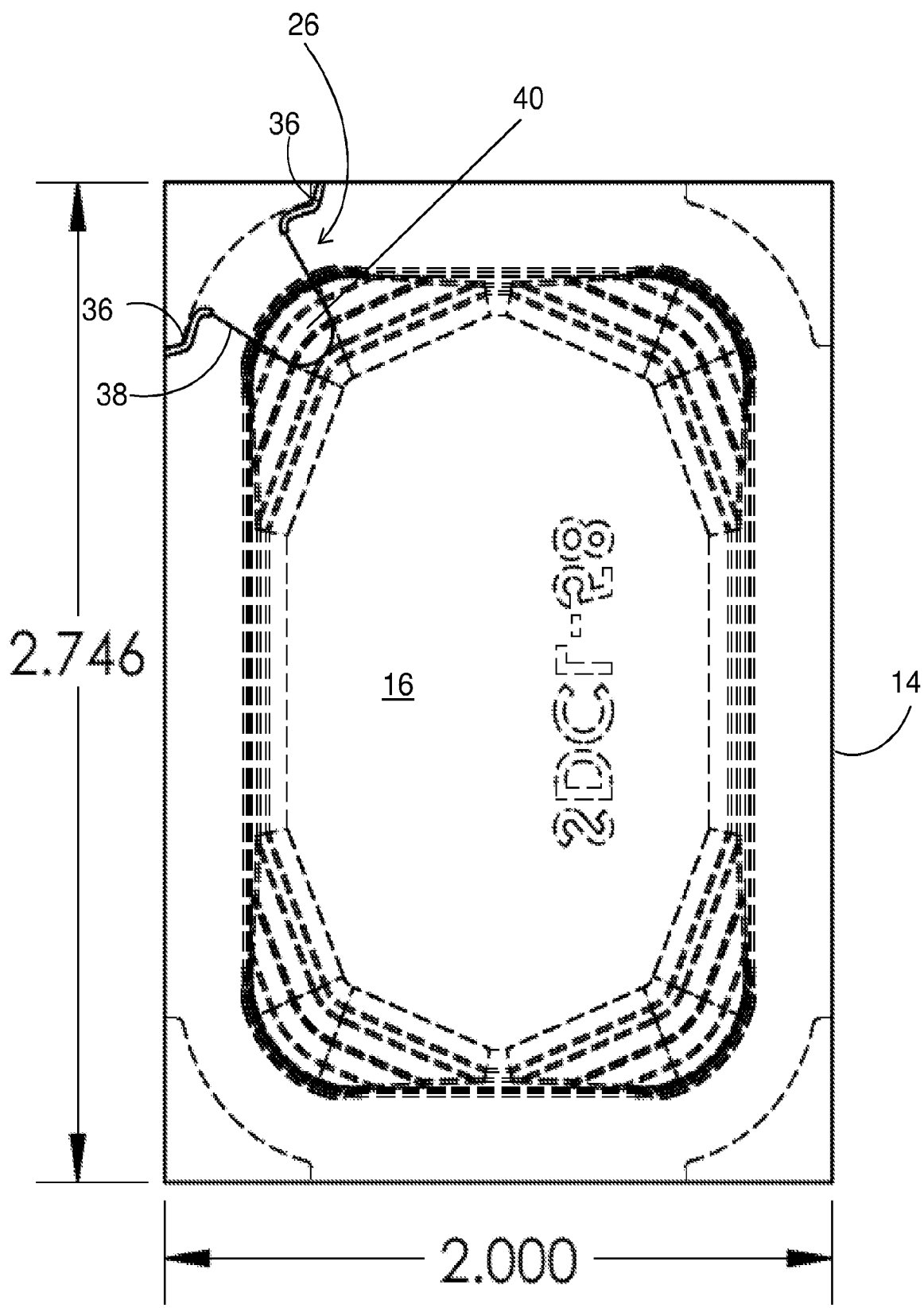
FIG. 1D is a top view of the container of FIG. 1A.
Figure 2A:
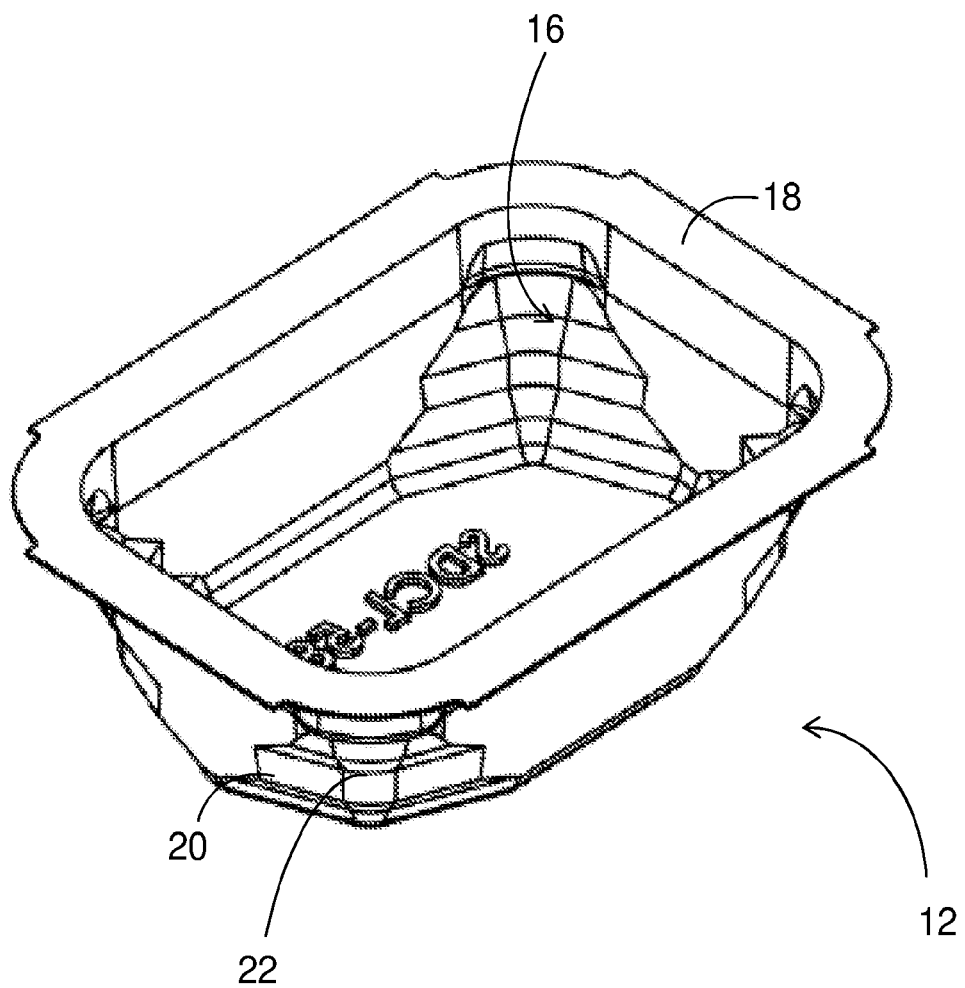
FIG. 2A is a top perspective view of a body of the container of FIG. 1A.
Figure 2B:
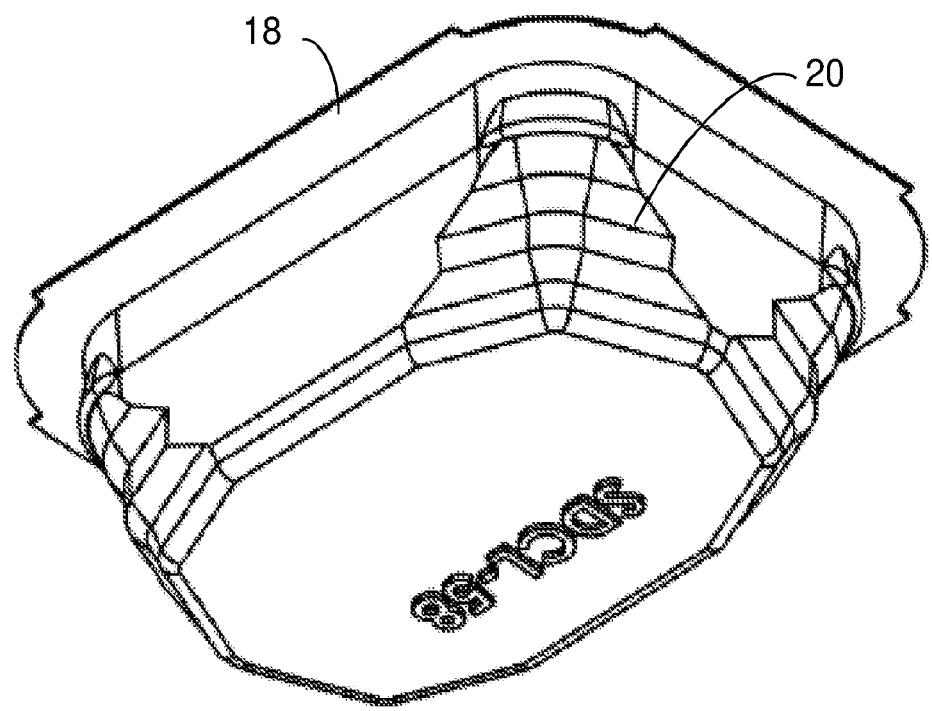
FIG. 2B is a bottom perspective view of the body of FIG. 2A.
Figure 2C:
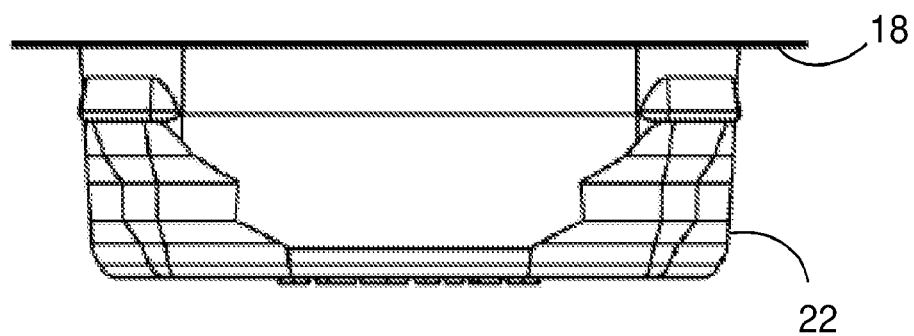
FIG. 2C is a front side view of the body of FIG. 2A.
Figure 2D:
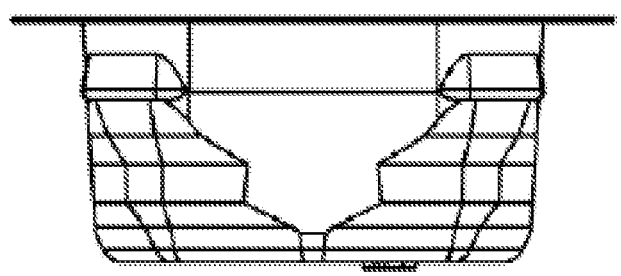
FIG. 2D is a left side view of the body of FIG. 2A.
Figure 2E:
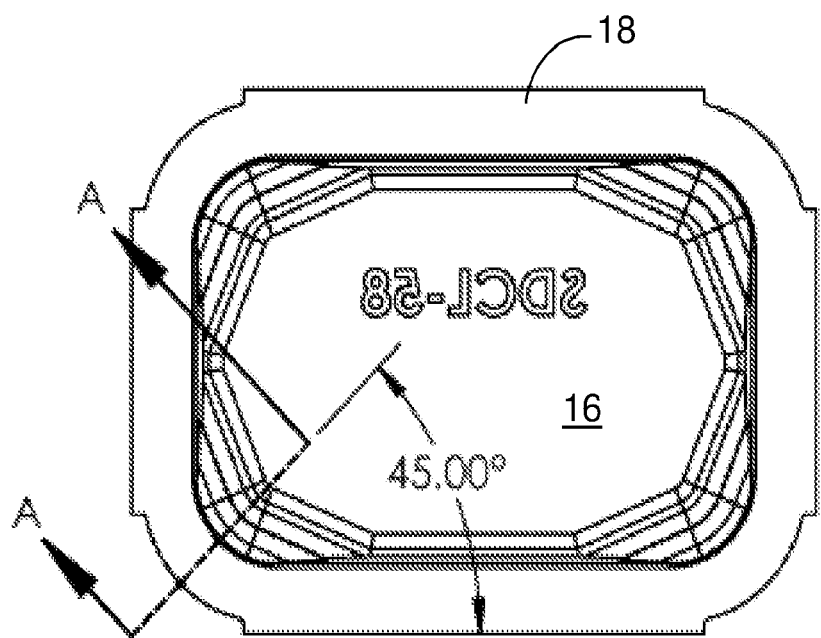
FIG. 2E is a top view of the body of FIG. 2A.

Referring to FIG. 1A, a container 10 in accordance with an embodiment of the disclosure can include a body 12 and a lid 14. Referring to FIGS. 1D and 2A, the body 12 has an internal volume 16 for receiving a product. The body 12 can include a top flange 18 that surrounds a top portion of the internal volume 16. The container 10 can be sealed by sealing the lid 14 to the top flange 18.

The body 12 can be formed of any known material, including, for example, polystyrenes, polyethylenes, polyesters, polyvinyl chlorides, and combinations or layers thereof. Selection of the body material can be dependent on the product contents to be retained within the container 10. For example, suitable materials or layers for the body 12 include PET, APET, oriented-PET, MET-PET, PE, LDPE, LLDPE, MDPE, mLLDPE, HDPE, mPE, EVA, PP, MET-PP, PS, OPS, HIPS, EVOH, PVC, PLA, and combinations or layered structures thereof. The interior of the body 12 and/or the top flange 18 can be coated with coatings, such as to provide certain barrier properties, including oxygen or moisture barrier properties. Use of coated and uncoated materials are contemplated herein depending on the product to be stored in the container 10. The body 12 and the top flange 18 can be formed of the same material or of different materials. In various embodiments, the body 12 and top flange 18 are formed by thermoforming. Any conventional thermoformable materials for forming containers can be used. Other forming methods, such as injection molding, are also contemplated herein. The materials can include coatings or additives as known in the art. The top flange 18 can be a flat or a substantially flat surface.

The body 12 can have any suitable size and shape depending on the type and amount of product to be contained therein. For example, the body 12 can have a generally rectangular shape, a rounded-rectangular shape, a square shape, and oval or oblong shape, or any other suitable shape. For example, the body 12 can be sized to receive a single-serve volume of a product, such as a condiment. Multi-serve content amounts are also contemplated herein.

The containers 10 of the disclosure can have different widths, and depths to accommodate any desired product and amount. In some embodiments, the body 12 can have a tapered shaped that increases in width from the bottom 13 of the body 12 to the top 15 of the body 12. Referring to FIG. 3A, the container 10 can generally have the same width throughout the depth of the container 10.

The body 12 can, in some embodiments, have a structure that is the same as or substantially similar to conventional portion control containers. In various embodiments, the body 12 can have a size and shape such that the body 12 is capable of fitting in a receiving tray of a conventional fill and seal machine.

Figure 1B:
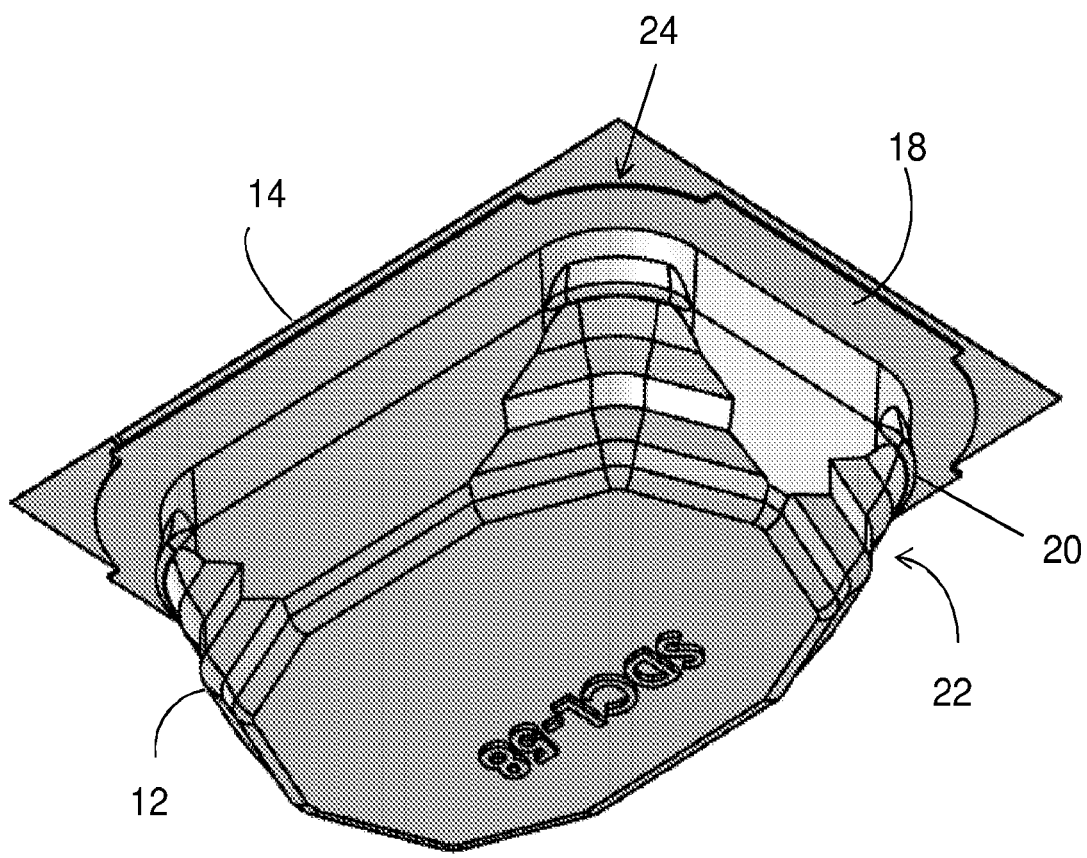
FIG. 1B is a bottom perspective view of the container of FIG. 1A.
Figure 1C:
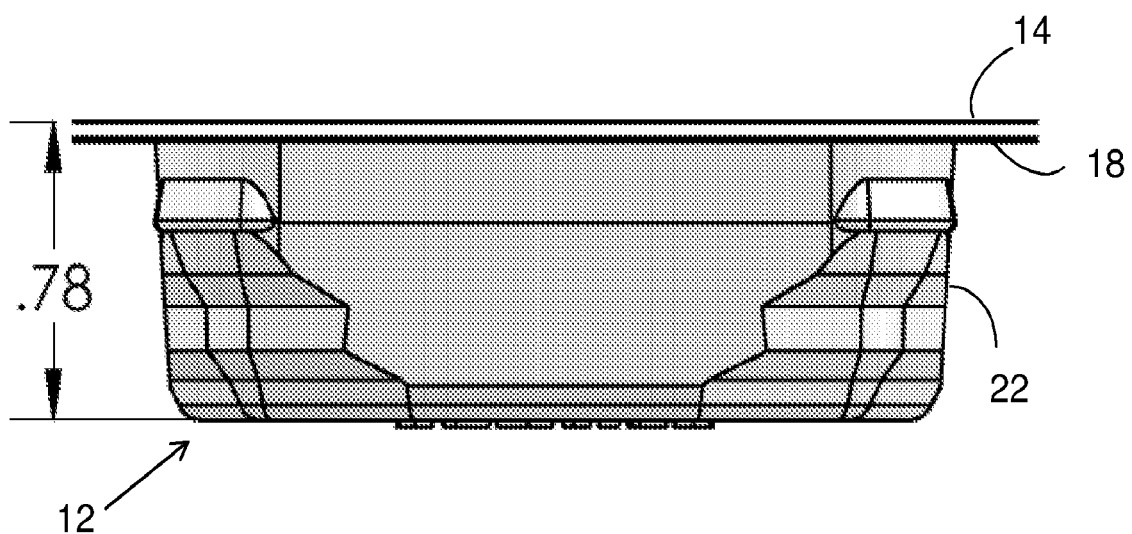
FIG. 1C is a side view of the container of FIG. 1A.

Referring to FIGS. 1B and 1C, the body 12 can include one or more ribs and/or denesting lugs (collectively referred to herein as ribs 20) disposed in the side wall or portions of the side walls of the containers 10. In containers 10 having a generally uniform width throughout the depth, the ribs 20 can result in some local widening of the width. The overall structure in such containers 10, however, is referred to herein as generally having a uniform width. Any suitable number and configuration of ribs 20 can be provided. A rib 20 can be provided as a continuous structure that surrounds the entire perimeter of the body. Alternatively, or additionally a rib 20 can be defined in one or more walls of the body. In some embodiments, the ribs 20 can be provided such that they nest to define an accordion region 22. This can facilitate squeezing of the container 10 to remove product when using the squeeze-type dispensing mode. The shape, orientation, draft, and number of ribs 20 can be tailored to achieve a desired squeeze profile. For example, for more viscous products, it may be desirable to provide a more collapsible structure that facilitates squeezing the container 10 with sufficient force to force the viscous product through a spout-type opening 26 in the lids. In other applications, such as for less viscous products, it may be desirable to use more rigid, less collapsible rib 20 structures so that the user does not inadvertently apply an excessive amount of force that would cause the less viscous product to exit rapidly or uncontrolled from the container 10.

Figure 2F:
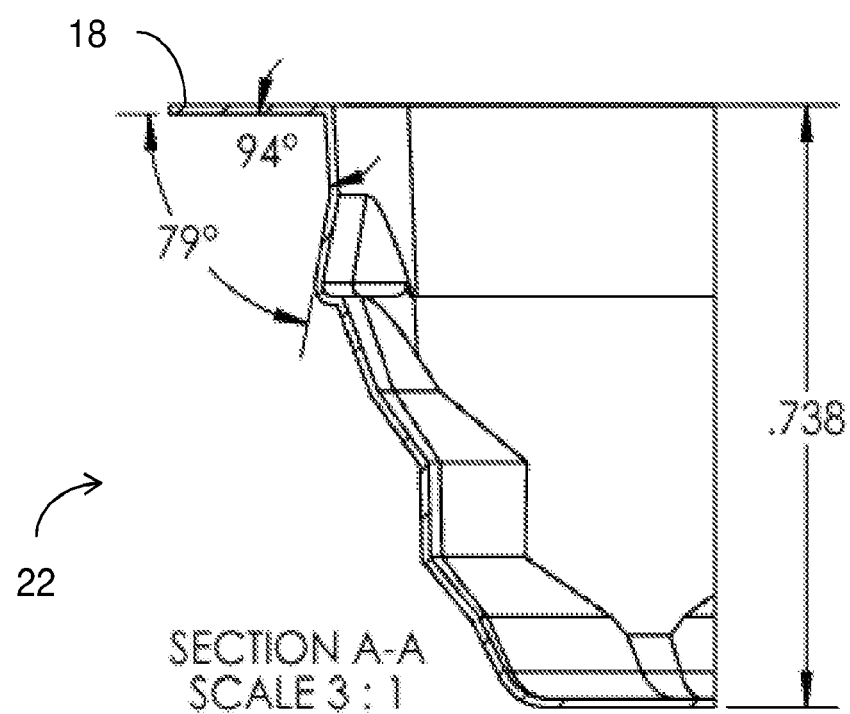
FIG. 2F is a cross-sectional view through section A-A of FIG. 2E.

FIGS. 2A-F illustrate an embodiment of a rib design. In this embodiment, the body 12 can include ribs 20 disposed in one or more of the corners 24 of the body. For example, as illustrated in FIG. 1D, the ribs 20 can be placed in the corner 24 corresponding to the location of a spout-type opening 26 defined in the lid 14 to allow for deformation of the body 12 in the spout-type opening 26 to facility dispensing product through the spout-type opening 26. In various embodiments, the body 12 can be manufactured with ribs 20 in each of the corners 24, providing accordion regions 22 in each corner 24. This can ease manufacture by allowing uniform body formation when a sheet of body structures is formed (see FIG. 9) and orientation of the spout-type opening 26 in the lid 14 is not uniformly disposed in the same corner 24 for each body structure. Referring to FIG. 2F, in the embodiment shown, the ribs 20 are provided with two separate drafts, which can allow the ribs 20 to collapse more easily when squeezed. The side wall structures between the corner accordion regions 22 are generally flat.

Figure 13A:
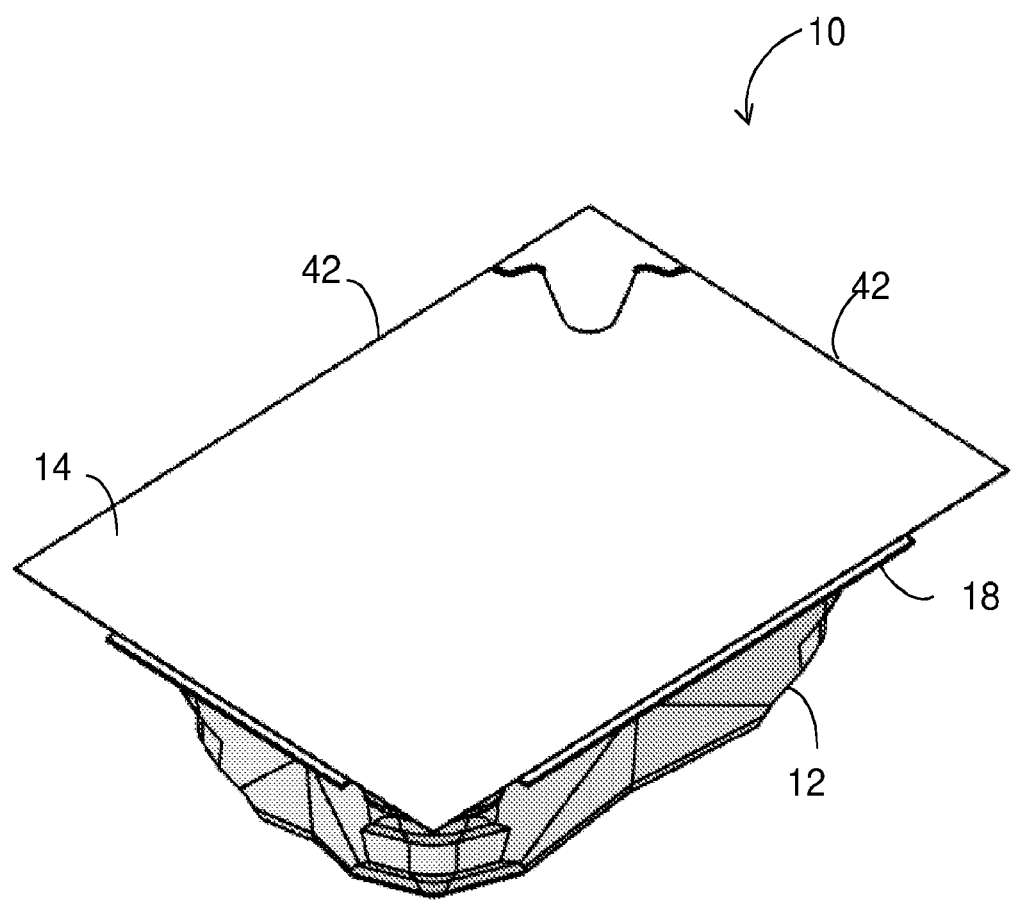
FIG. 13A is a top perspective view of a container in accordance with an embodiment of the disclosure.
Figure 13B:
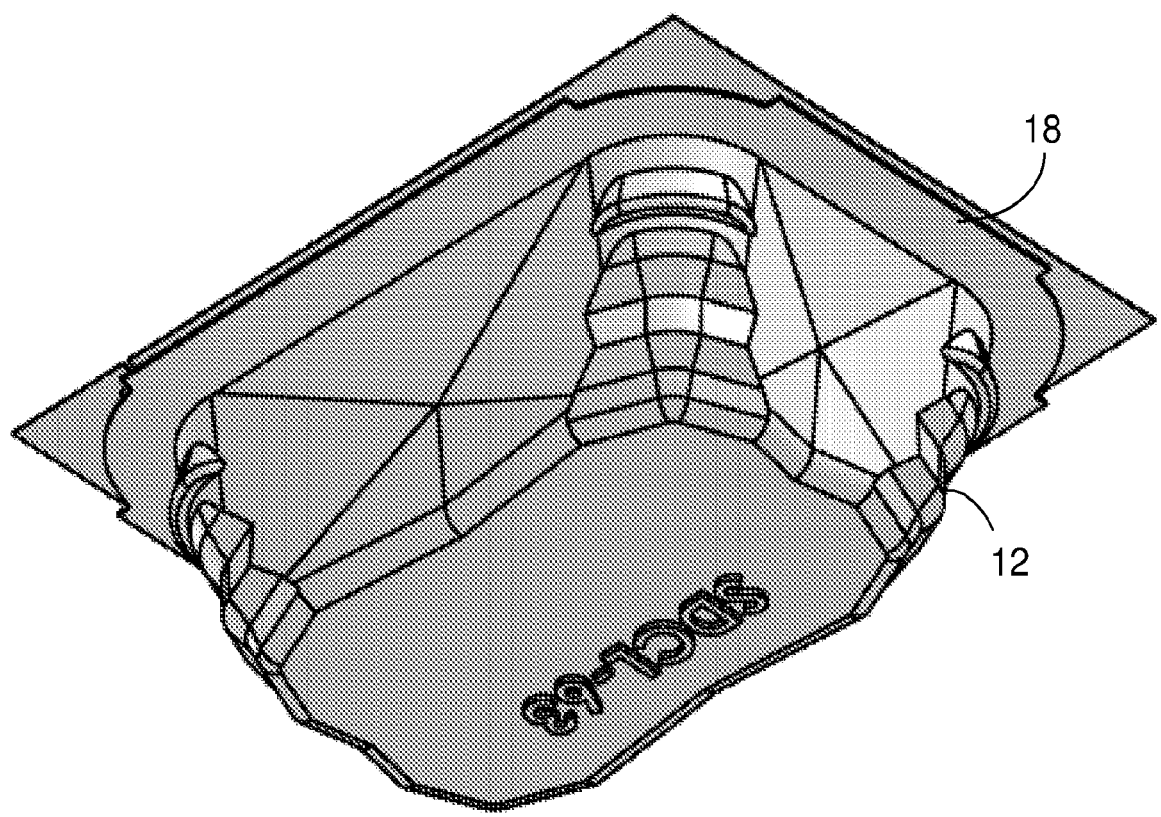
FIG. 13B is a bottom perspective view of the container of FIG. 13A.
Figure 13C:
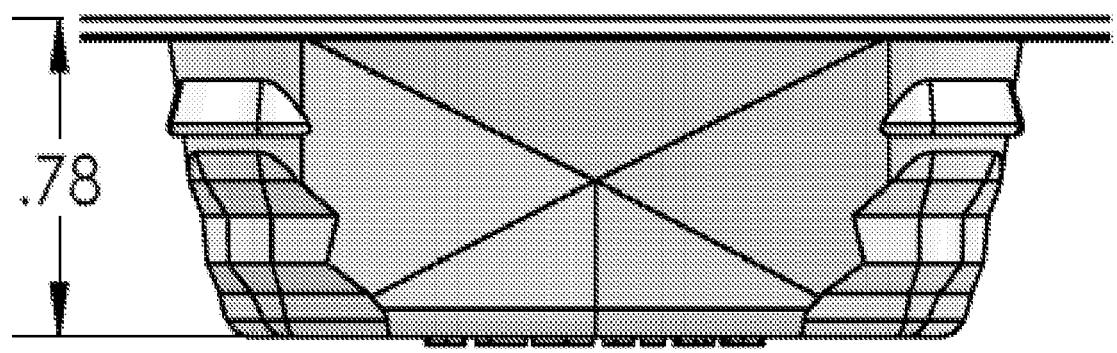
FIG. 13C is a front side view of the container of FIG. 13A, showing the seal area.
Figure 13D:
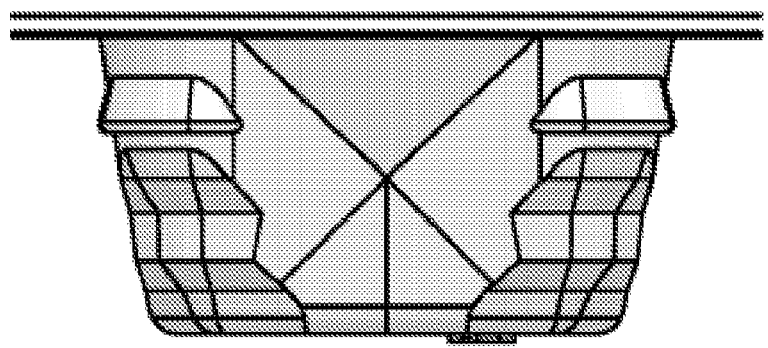
FIG. 13D is a left side view of the container of FIG. 13A.
Figure 13E:
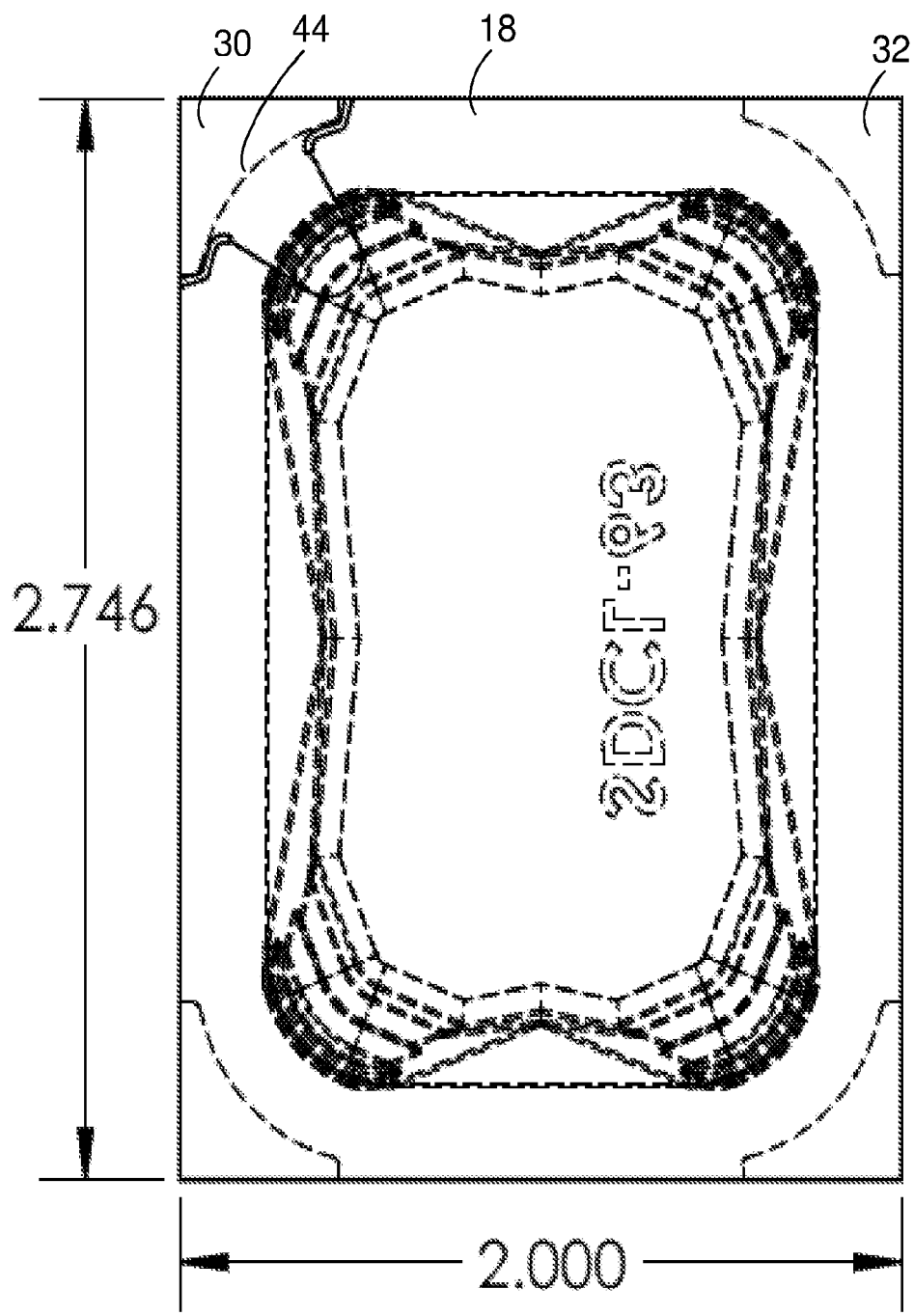
FIG. 13E is a top view of the container of FIG. 13A.
Figure 13F:
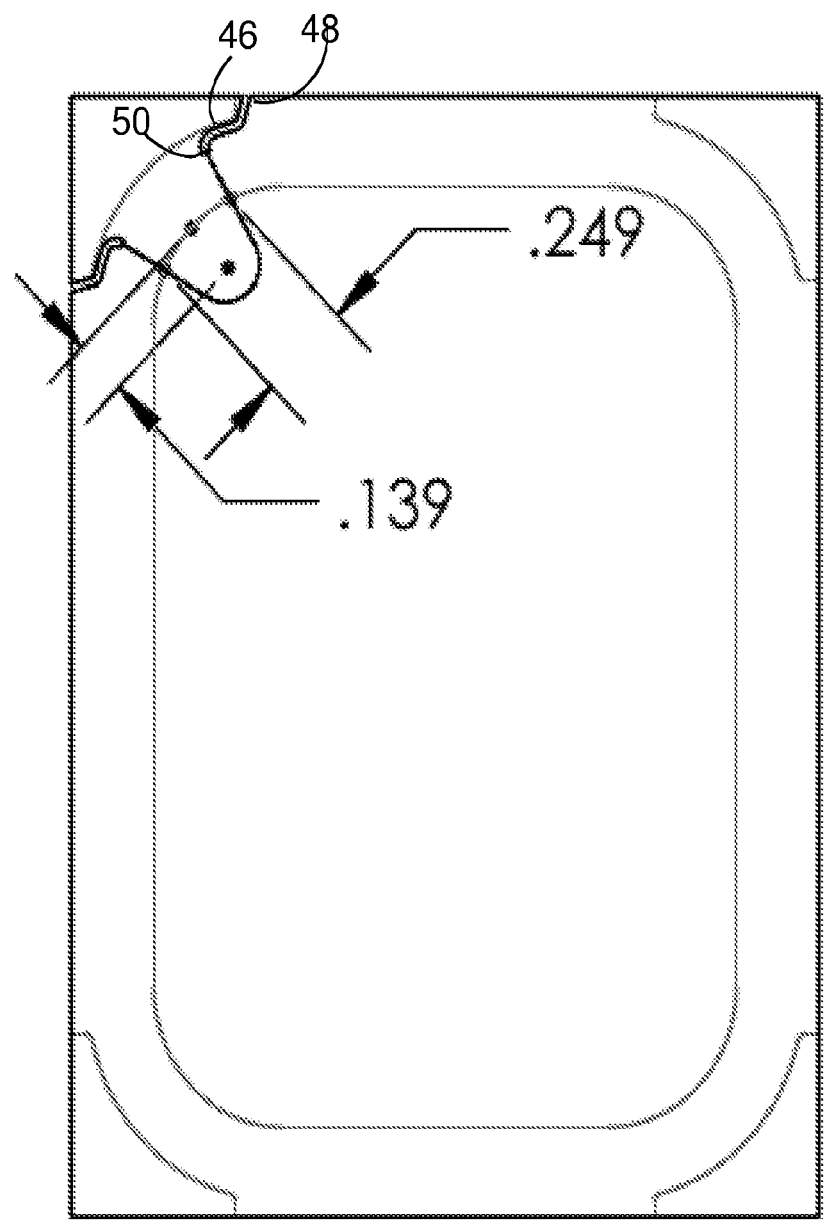
FIG. 13F is a top view of a lid of the container of FIG. 13A.
Figure 14A:
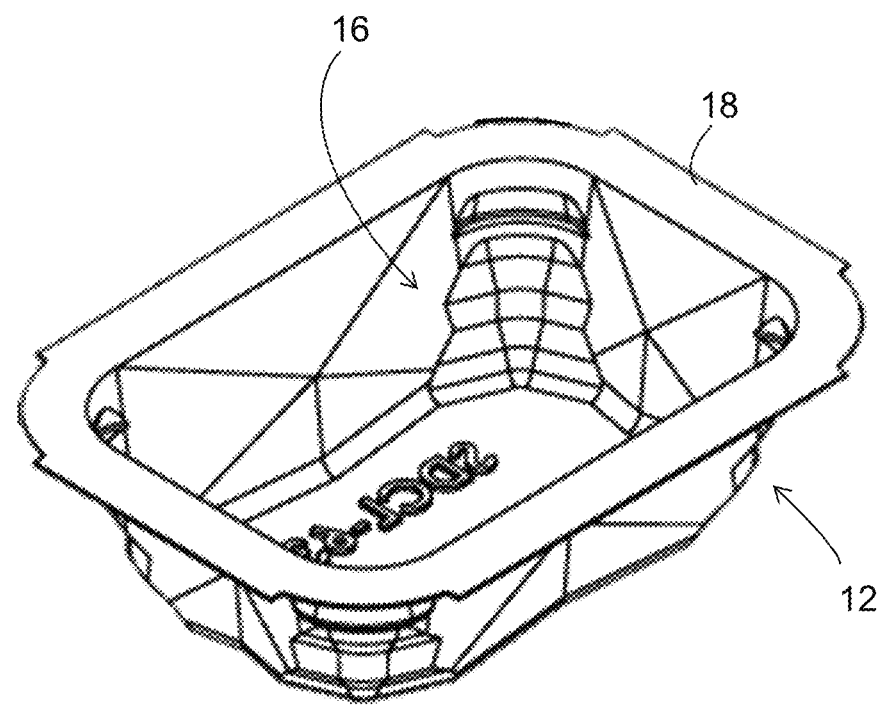
FIG. 14A is a top perspective view of a body of the container of FIG. 13A.
Figure 14B:
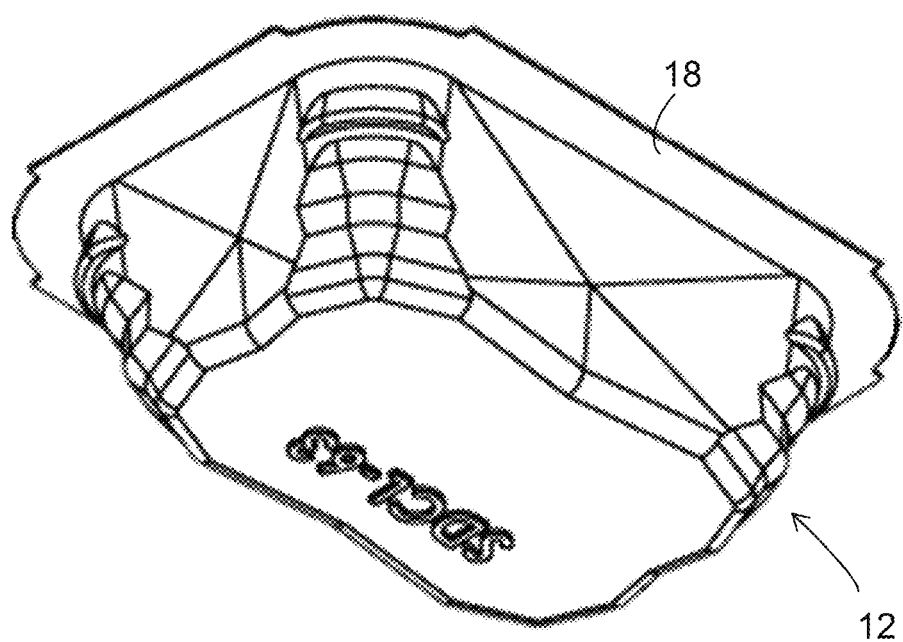
FIG. 14B is a bottom perspective view of the body of FIG. 14A.
Figure 14C:
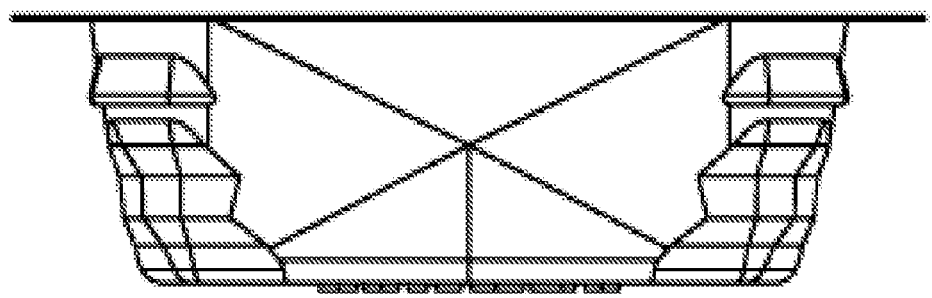
FIG. 14C is a front side view of the body of FIG. 14A.
Figure 14D:
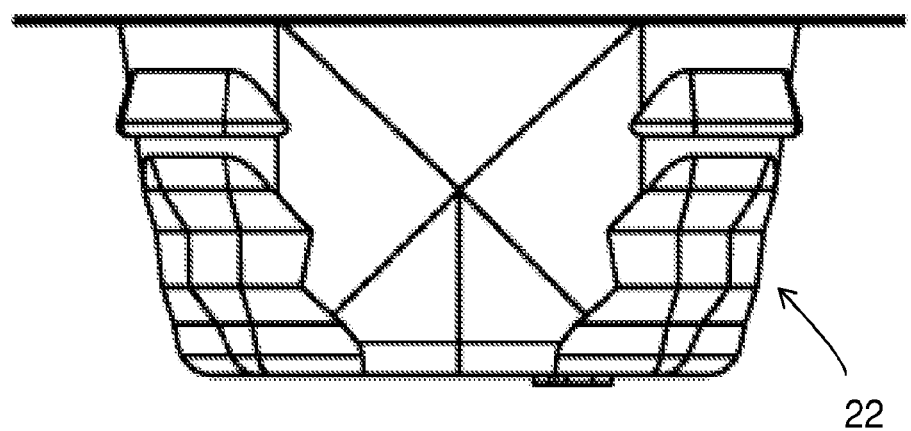
FIG. 14D is a left side view of the body of FIG. 14A.
Figure 14E:
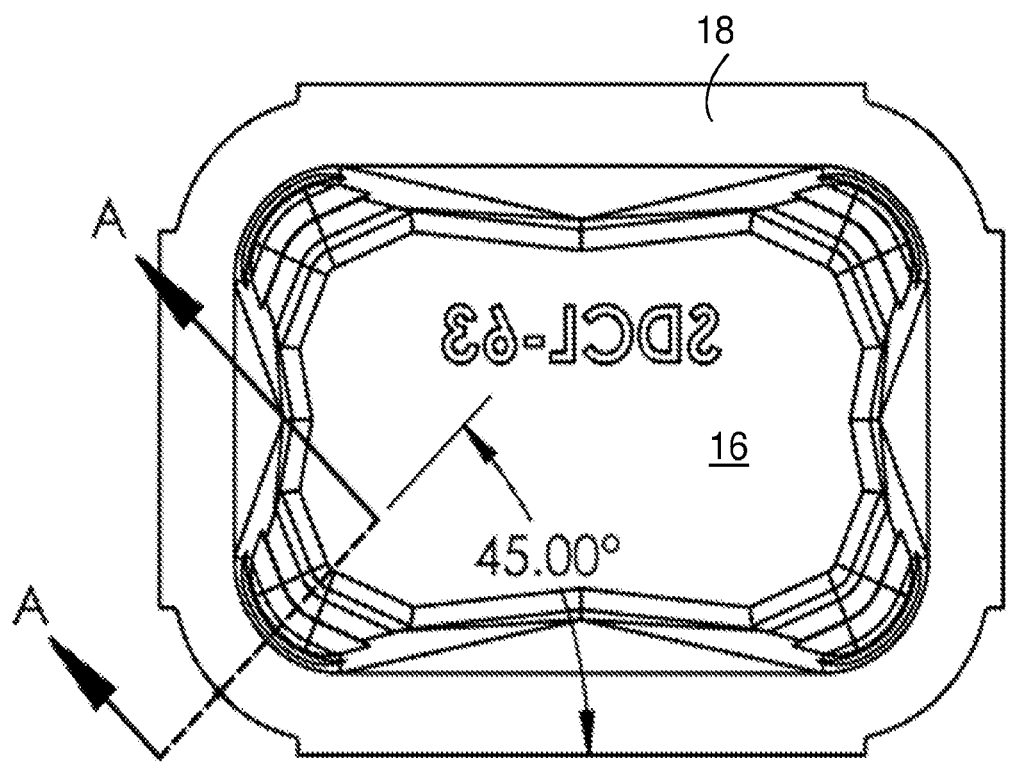
FIG. 14E is a top view of the body of FIG. 14A.
Figure 14F:
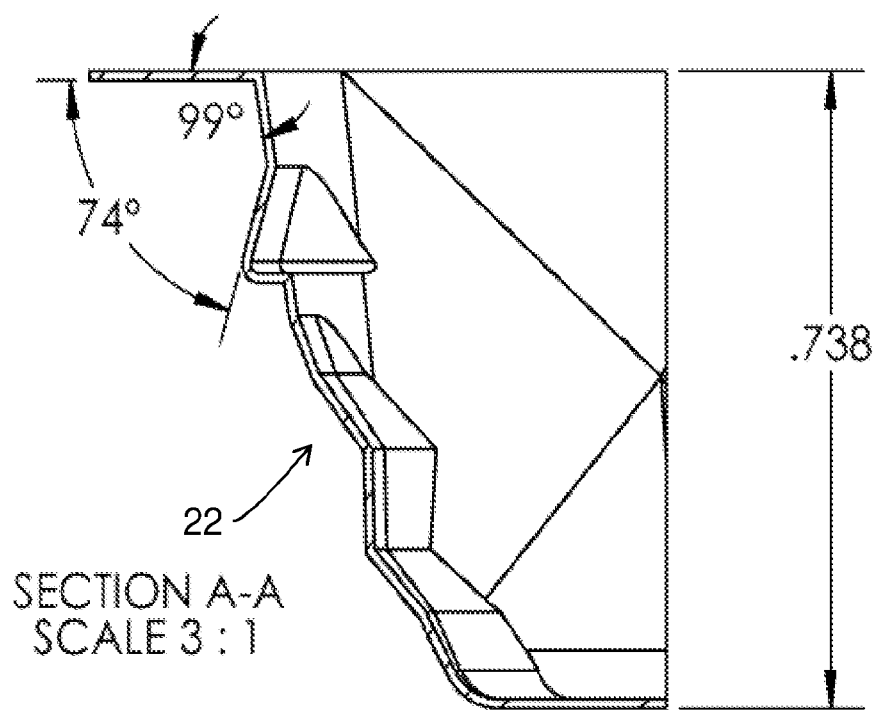
FIG. 14F is a cross-sectional view through section A-A of FIG. 14E.

FIGS. 14A-14F illustrate another embodiment of a body 12 of the container 10. In this embodiment, ribs 20 are provided in the corners 24 of the container 10 to provide an accordion region 22 at least in the vicinity of the spout-type opening 26 (see FIG. 13E). Similar to the body 12 of FIG. 2, the ribs 20 are provided with two separate drafts to allow the ribs 20 to collapse more easily when squeezed. In contrast to the embodiment illustrated in FIG. 2, the body 12 of FIG. 14 has side walls which draft inwardly to a point toward the interior volume 16. This creates a slightly faceted surface which allows it to bend.

Figure 18A:
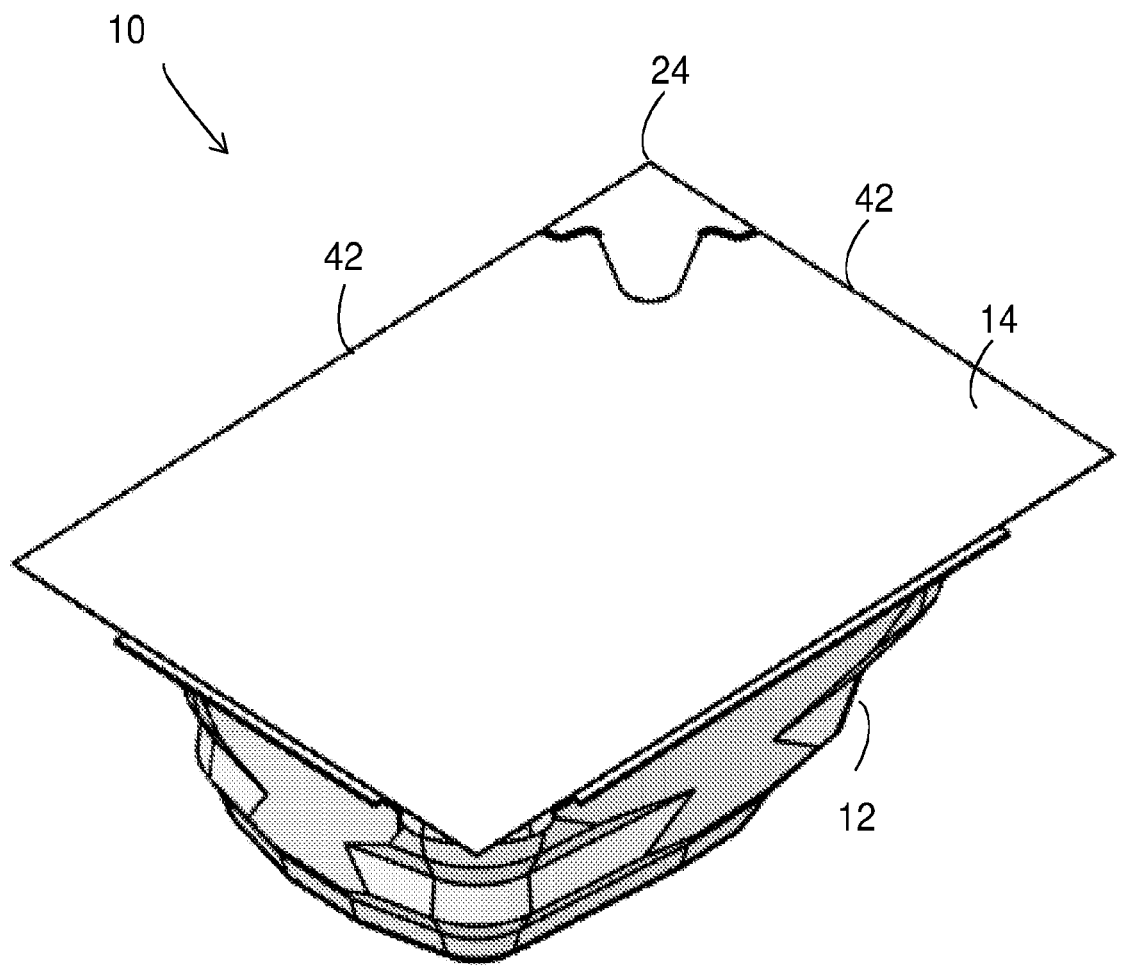
FIG. 18A is a top perspective view of a container in accordance with an embodiment of the disclosure.
Figure 18B:
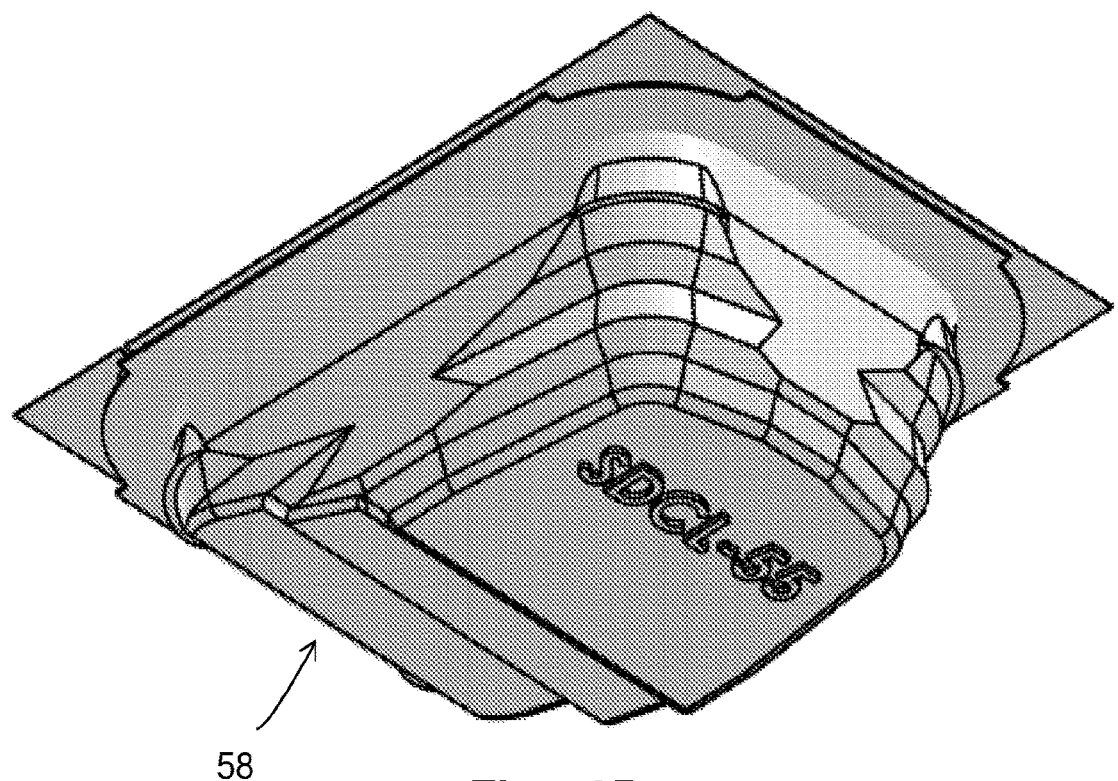
FIG. 18B is a bottom perspective view of the container of FIG. 18A.
Figure 18C:
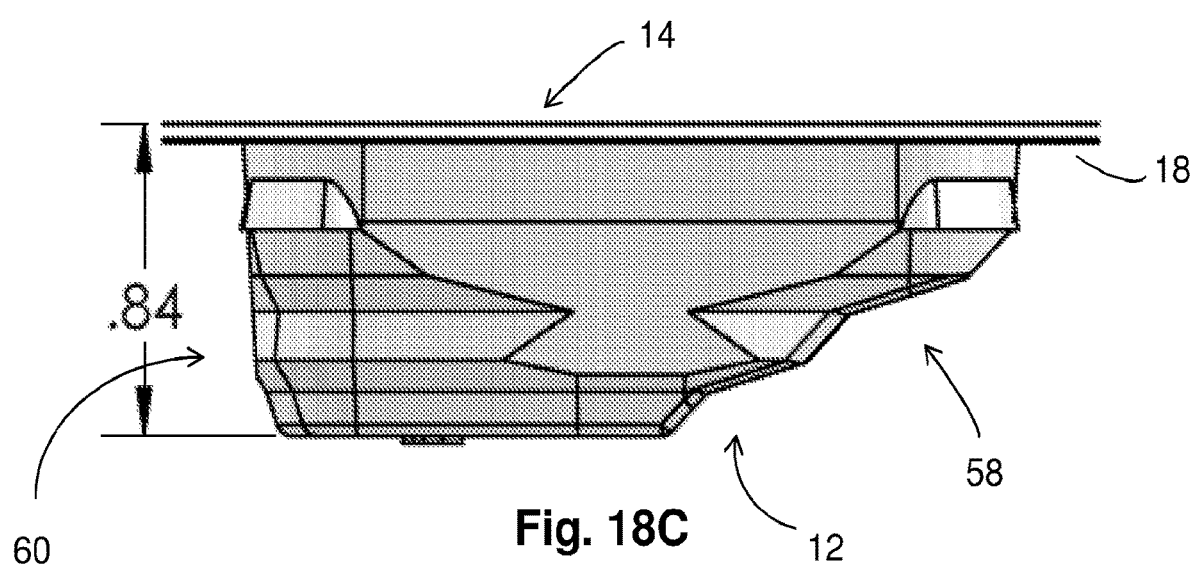
FIG. 18C is a font side view of the container of FIG. 18A.
Figure 18D:
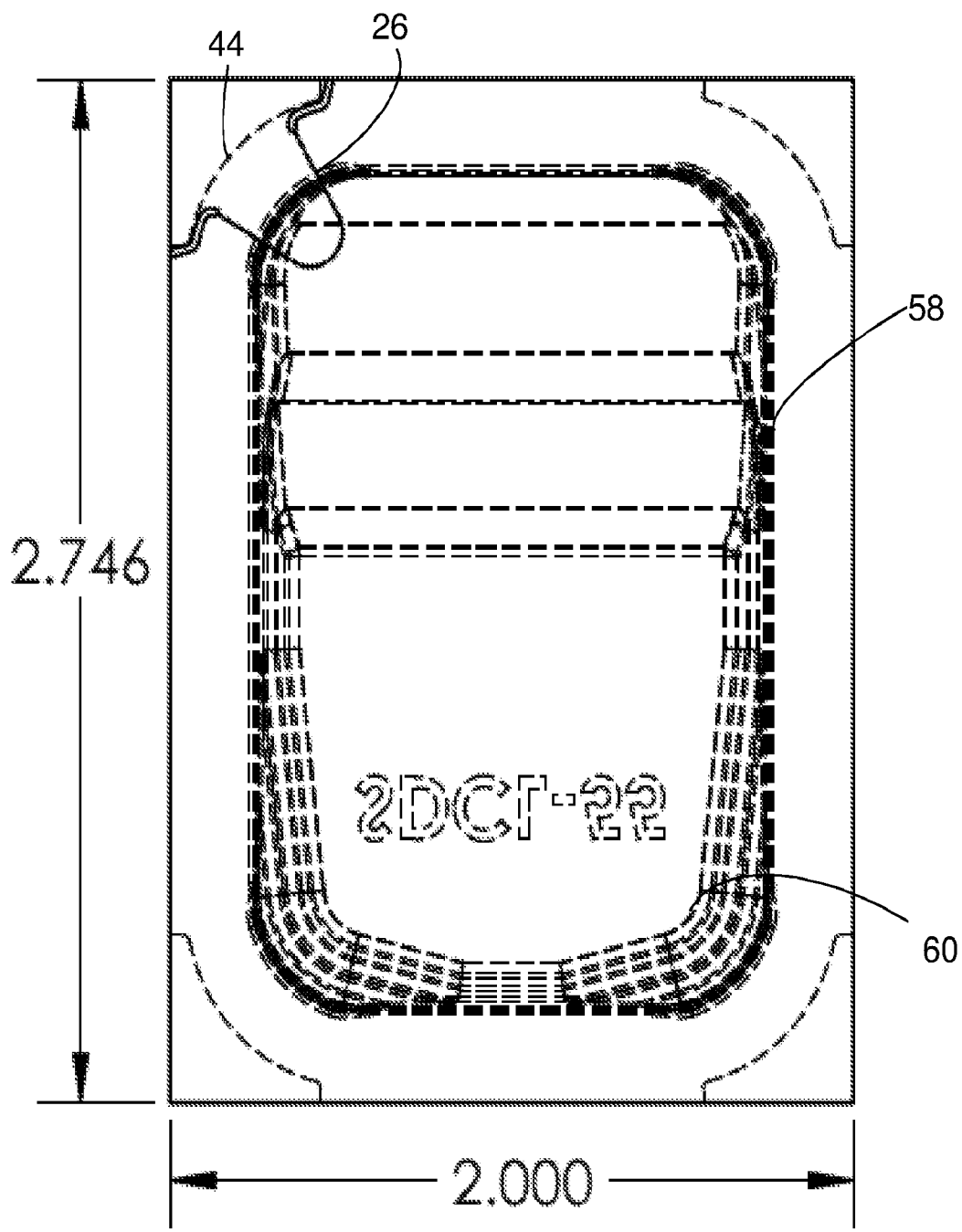
FIG. 18D is a top view of the container of FIG. 18A.
Figure 18E:
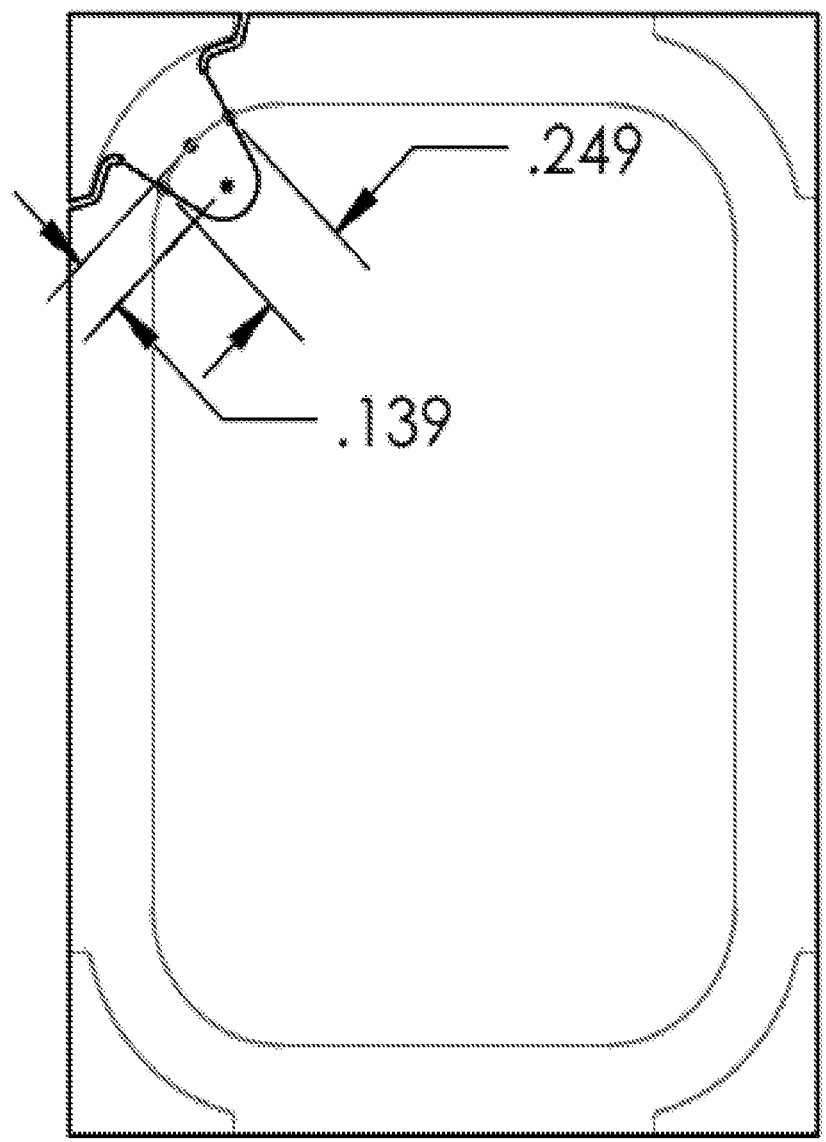
FIG. 18E is a top view of a lid of the container of FIG. 18A, showing the seal area.
Figure 19A:
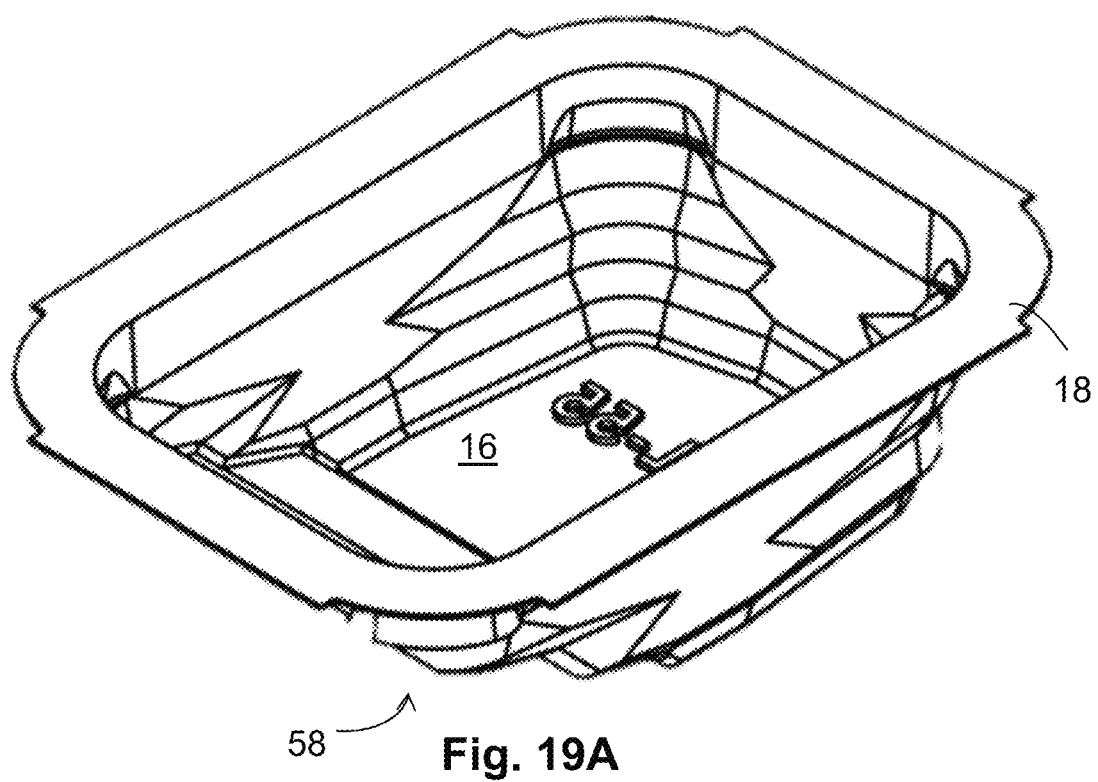
FIG. 19A is a top perspective view of a body of the container of FIG. 18A.
Figure 19B:
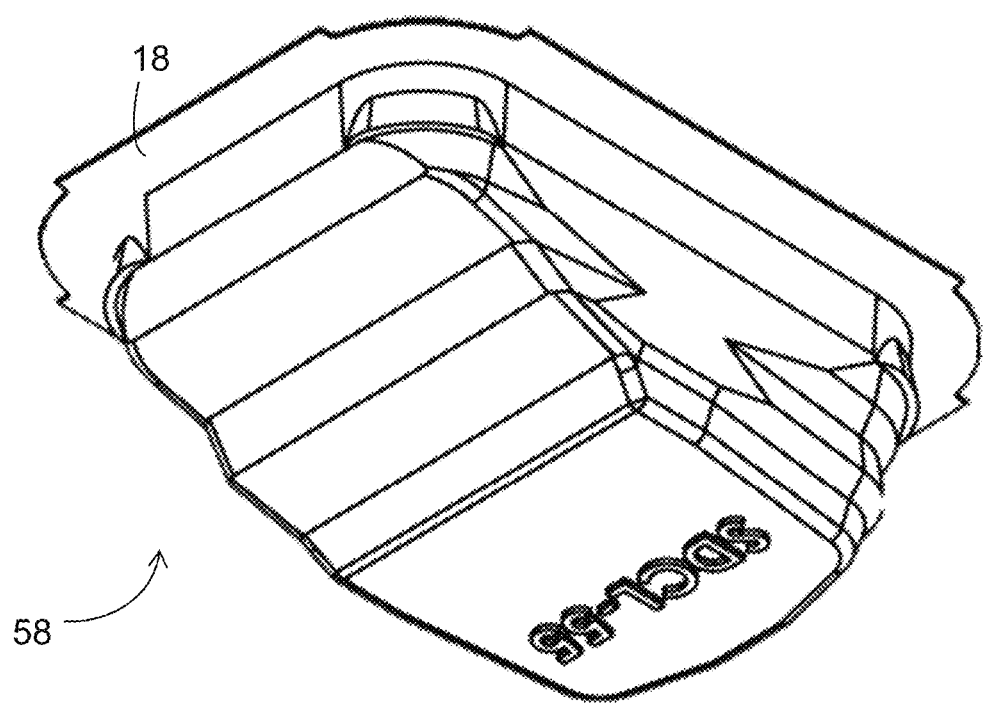
FIG. 19B is a bottom perspective view of the body of FIG. 19A.
Figure 19C:
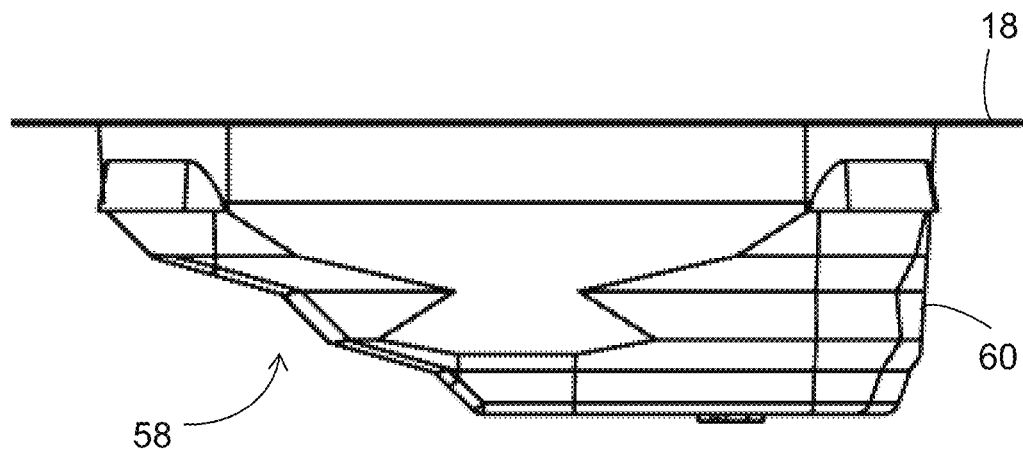
FIG. 19C is a front side view of the body of FIG. 19A.
Figure 19D:
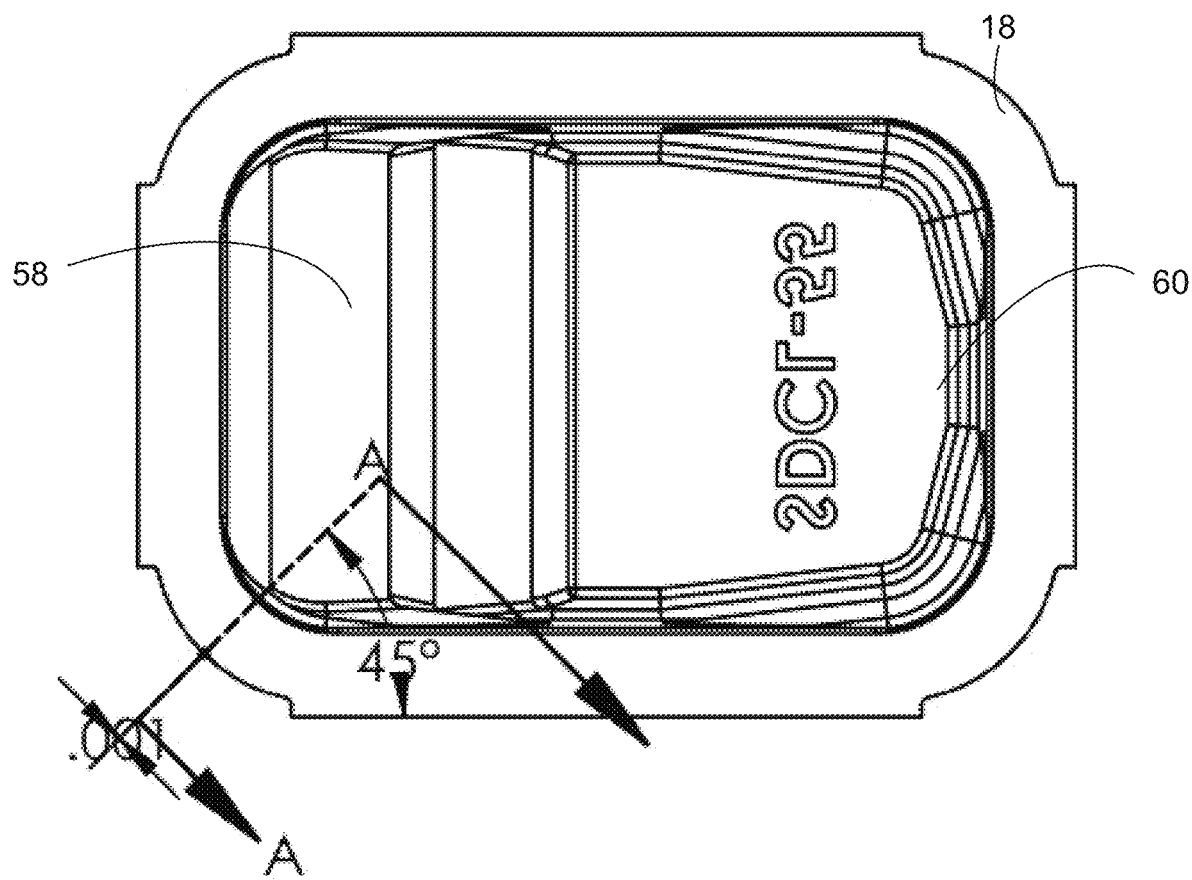
FIG. 19D is a top view of the body of FIG. 19A.
Figure 19E:
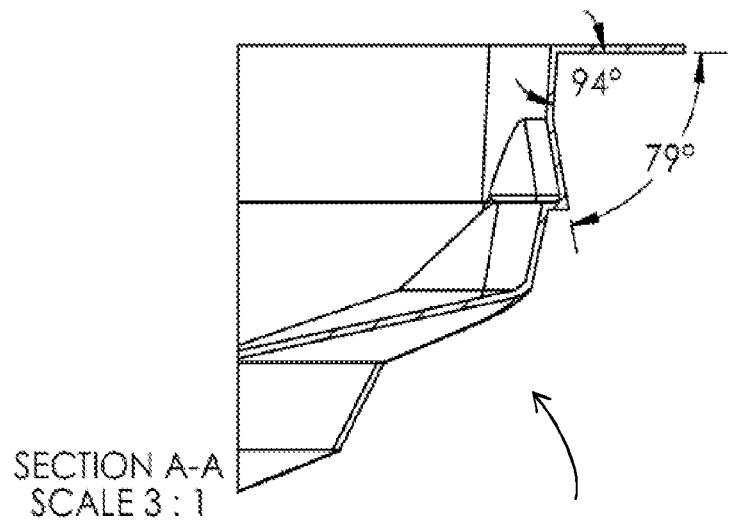
FIG. 19E is a cross-sectional view through section A-A of FIG. 19D.

FIGS. 19A-19E illustrate yet another embodiment of a body. In this embodiment, ribs 20 are provided in the corners 24 at only one side 60 of the container 10. The opposite side of the container 10 has a tapered step shape 58. As compared to the bodies 12 of FIGS. 2 and 14, this reduced the width of the bottom 13 of the body 12. As illustrated in FIG. 19C, the side wall having the stepped taper shape 58 tapers upwardly and outwardly from the edge of the bottom 13 of the body 12 to the top flange 18. Referring to FIG. 18D, the stepped taper shape 58d end of the body 12 of the container 10 can be disposed on the end of the container 10 having the spout-type opening 26. During dispensing of the product, this stepped configuration allows the entire end of the container 10 to be deformed, which can be a more ergonomic squeezing configuration for a user as it provides a wide area over the squeeze force is applied and there is a feed-back response from the body 12 of the container 10 in the form of collapsing of the container 10 at the stepped structure 58. Alternatively, the spout type opening 26 can be at the opposed end 60 that has a more substantially straight side-wall. FIG. 19E is a cross-sectional view of the stepped tapered region in the corner 24 corresponding to the spout-type opening 26, illustrating how the stepped portions, as with the ribs 20, form an accordion region 22 that collapses or nests together during squeezing. Advantageously, it has been found that by maintaining the top flange 18 shape to be substantially similar to conventional portion control containers, conventional fill and seal equipment can be used, despite the altered bottom shape of this body 12 configuration.

In any of the foregoing embodiments of the body 12, any lid 14, or lidding material disclosed herein may be used. Additionally, in any of the foregoing embodiments of the body 12, any of the body materials or combination of rib configurations can be used.

Figure 1E:
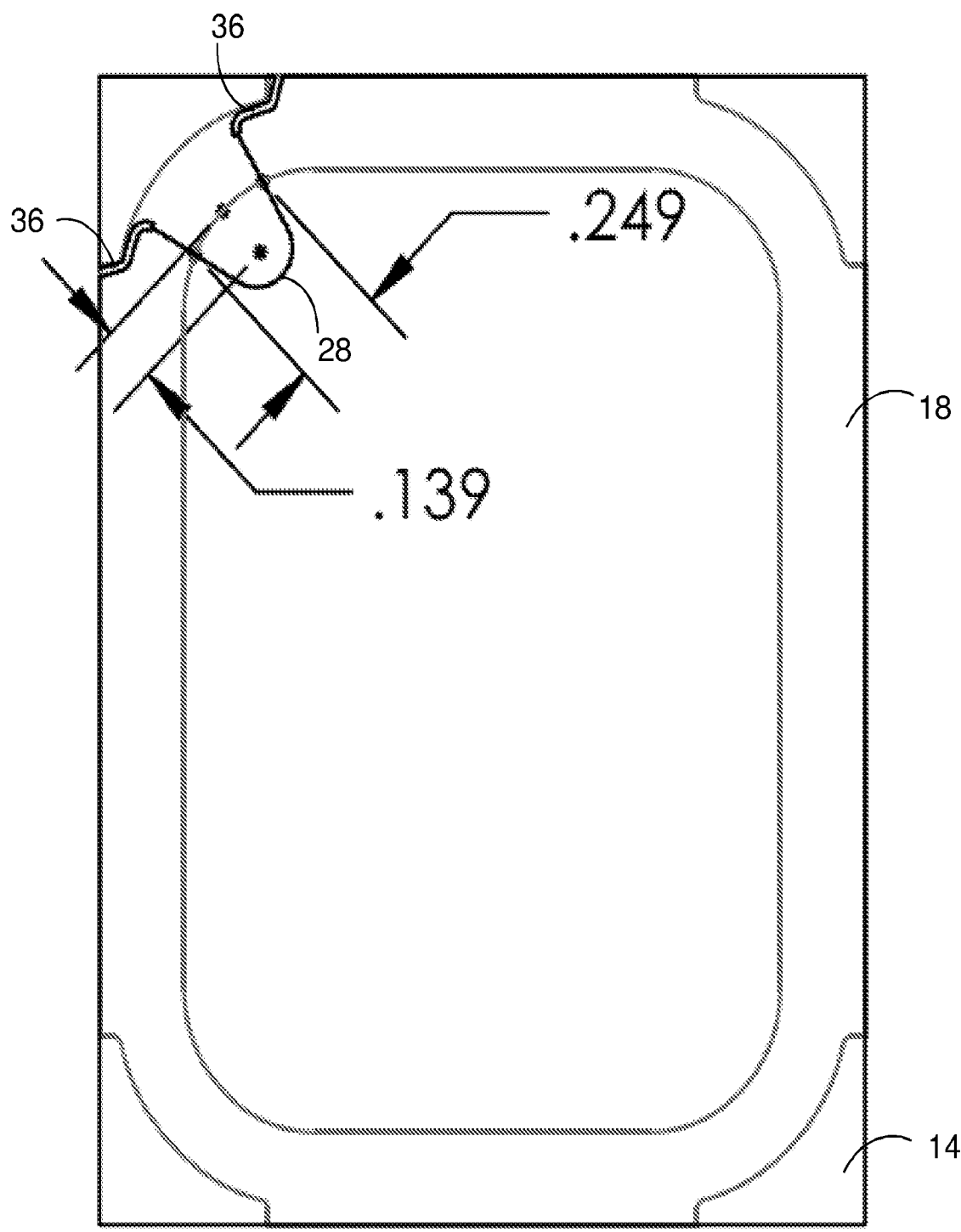
FIG. 1E is a top view of a lid of the container of FIG. 1A, showing the seal area.

Referring to FIG. 1E, a lid 14 in accordance with an embodiment of the disclosure can include an initiation region 36 that transitions into a pattern of reduced strength 28 defined in the lid 14 to allow a spout-type opening 26 to be generated by preferential tearing of the lid 14 along the pattern of reduced strength 28. The pattern of reduced strength 28 defines the shape of the opening of the spout-type opening 26. As illustrated in FIG. 1D, the pattern of reduced strength 28 extends past the top flange 18 of the body 12 such that it is disposed above the interior volume 16. When lidding material is removed at the pattern of reduced strength 28, a portion of the interior volume 16 at an opening 34 between the inner wall of the body and the edge of the pattern of reduced strength disposed over the interior volume 16. It is through this opening that that product can flow out from the interior volume 16. Together with the opening 34 and the exposed top flange 18, a spout-type opening 26 is formed such that flow initiated and controlled by application of a compression force to the container 10. It is also contemplated that the lid 14, which prior to use is sealed to the top flange 18, can be peeled from the top flange 18 to expose a large opening (not shown) for access of the interior volume 16, for example, for dipping.

The lid 14 can be formed of or include any suitable material. In various embodiments, the lid 14 is a flexible material. The lid material can have a layered structure, a laminate structure, or be a monolayer. Exemplary types of materials or layers that can be included in the lid material include polyesters, polyethylenes, polystyrenes, foils, unoriented materials, biaxially oriented materials, and combinations thereof. For example, the lidding material can include PET, APET, OPET, MET-PET, PE, LDPE, LLDPE, mLLDPE, HDPE, MDPE, mPE, EVA, PLA, PP, MET-OPP, PS, HIPS, foil, EVOH, and combination thereof. In an embodiment, the lid material is a laminate structure of foil-PE-PET- and a heat seal coating. A heat seal coating can be used in any of the materials disclosed herein. The lid material can include coatings, for example, heat sealable coatings, cold-sealable coatings, printing layers, and any suitable additives depending on the product to be contained, as known in the art. Heal sealable layers, such as polyethylene, can also be included as part of the lid material for sealing to the lid 14 to the body. Use of other sealable layers or materials are also contemplated herein.

The lid material can be fully oriented, partially oriented, or unoriented. In some embodiments, the lid material is an oriented material. In some embodiments, the entire lid material can be oriented. In other embodiments, the lid material can be locally oriented in the region of the removable portion to facilitate removal.

As illustrated in FIG. 1E, the pattern of reduced strength 28 can be defined at a corner 24 of the body. The lid 14 can have a first overhang portion 30 that extends past the top flange 18 to which the lid 14 is sealed. The first overhang portion 30 can provide a gripping region for applying a force to preferentially tear the lid 14 along the pattern of reduced strength 28. The lid 14 can further include at least a second overhang region 32 at another one of the corners 24 of the body 12. The second overhang region 32 can provide a gripping region for applying a force to peel the lid 14 away from the top flange 18, separating the seal between the lid 14 and the top flange 18 to expose a dip-type opening to the interior volume 16 of the body 12. In the embodiment illustrated in FIG. 1E, the lid 14 includes an overhang at each of the corners 24 of the body 12. This can advantageously allow the lid 14 to be cut as a square or rectangular structure, which can facilitate manufacturing.

Figure 5:
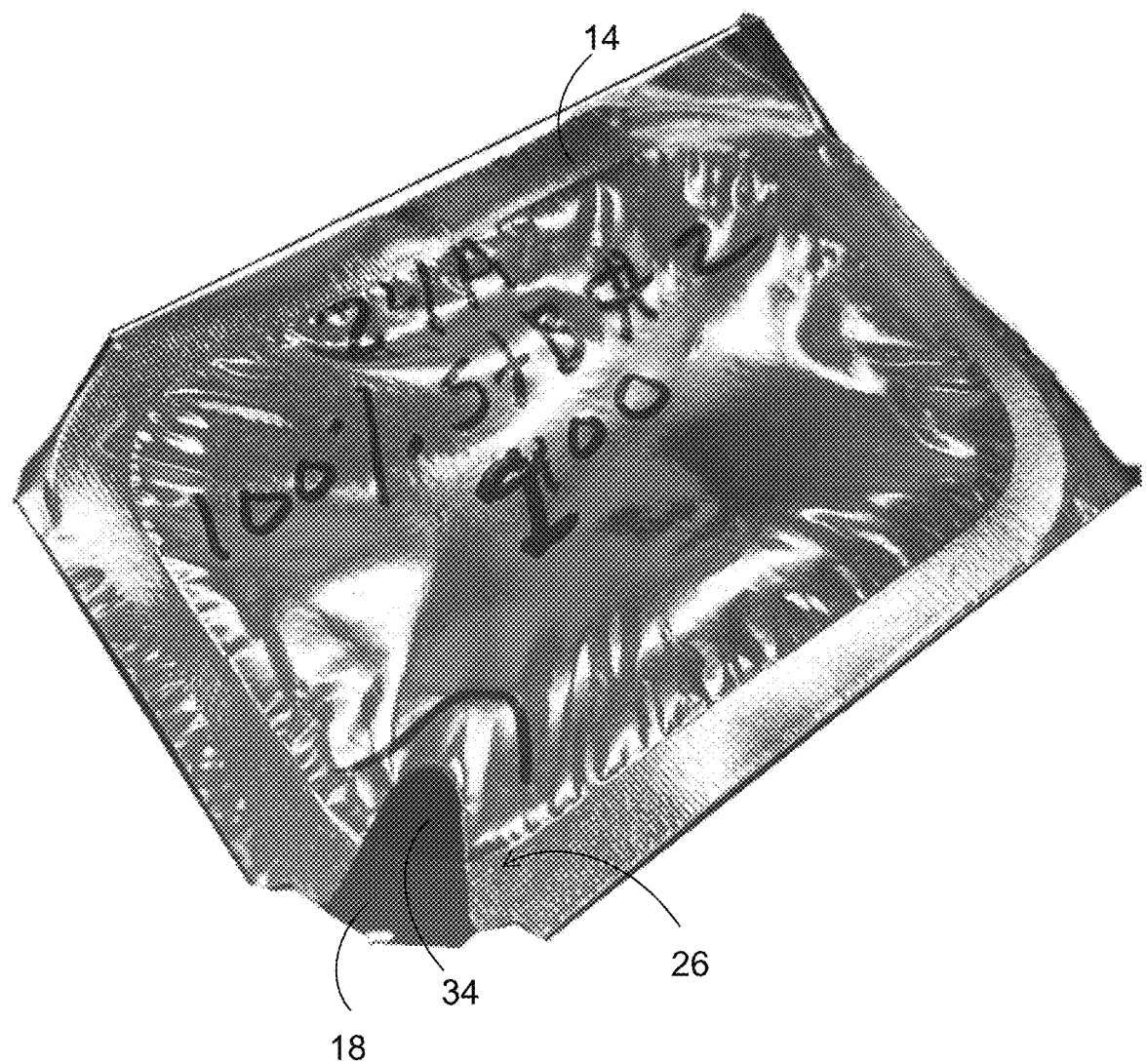
FIG. 5 is a photograph of a container in accordance with an embodiment of the disclosure, showing successful opening of a spout-type opening about a pattern of reduced strength when an initiation region having 100% penetration through the film.
Figure 6:
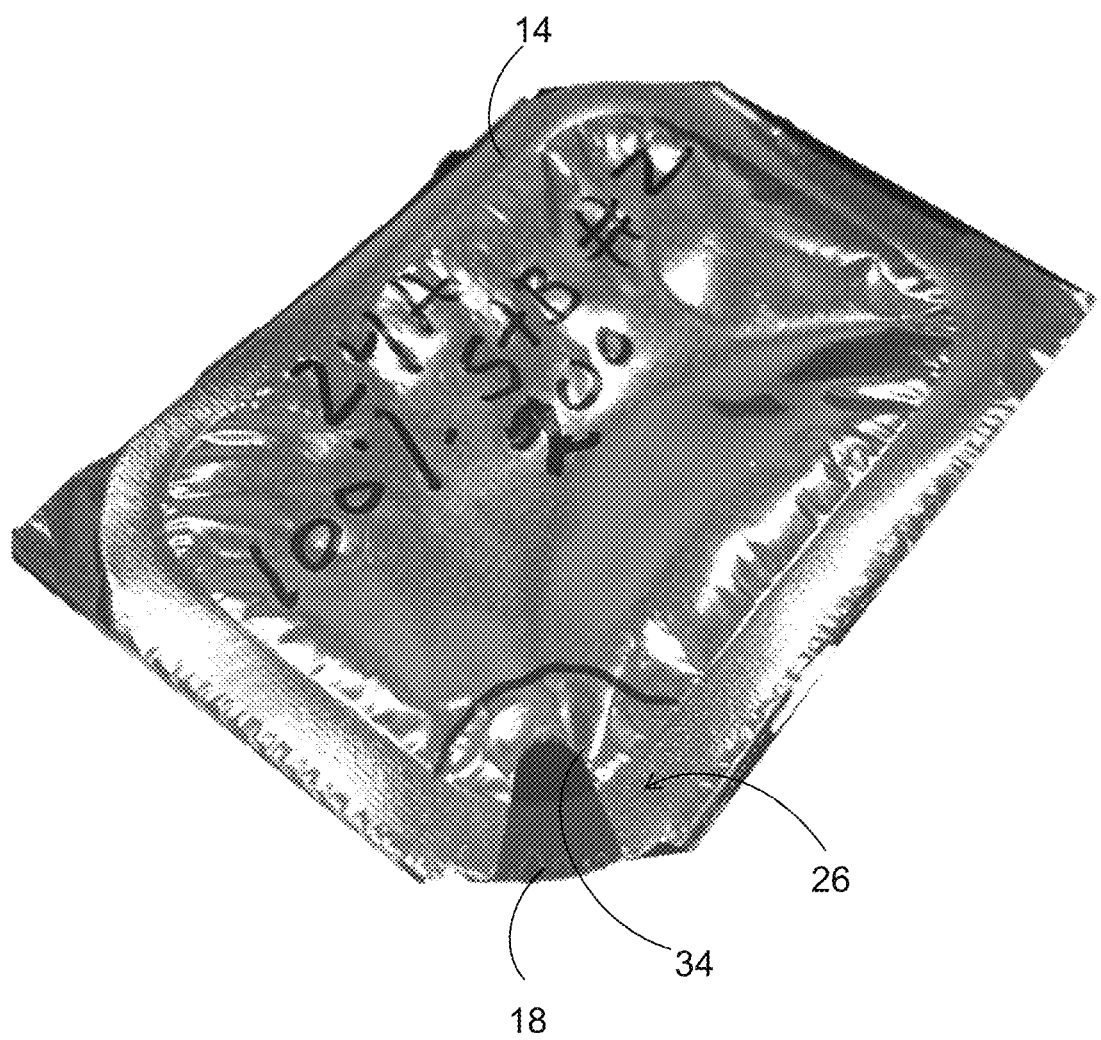
FIG. 6 is a photograph of another container in accordance with an embodiment of the disclosure, showing successful opening of a spout-type opening about a pattern of reduced strength when an initiation region in accordance with the disclosure was present.

FIGS. 5 and 6 illustrate a container 10 after removal of a portion of the lid 14 along the pattern of reduced strength 28 defining the spout type opening 26. Removal of the portion of the lid 14 exposes a portion of the top flange 18 as well as an opening 34 to the interior volume 16 of the body 12 that extends from an inner surface of the body 12 to an end of the spout-type opening 26. Together the exposed portion of the top flange 18 and the opening 34 define a controlled path for flow of the product from the interior volume 16 to the desired location outside of the container 10. The remainder of the lid 14 remains sealed to the top flange 18. When the container 10 is squeezed, the opening 34 constrains the flow of the product out of the container 10, such that a squeeze type dispenser is provided in which the flow of product is related to the force applied to squeeze the product from the container 10.

The shape and size of the spout-type opening 26 can be tailored to the product contained in the container 10. In various embodiments, such as illustrated in FIGS. 5 and 6, the spout type opening 26 can have a generally tapered shape, with the base of the spout type opening disposed at the top flange 18 of the body 12 being wider than the opposed end disposed over the interior volume 16. The opposed end which is disposed over the interior volume 16 can have a radius of curvature, which can be made narrower or wider. The radius of curvature can be made wider in some embodiments to ensure that the lidding material tears following the pattern of reduced strength 28. In various lidding materials, a sharp radius of curvature in the pattern of reduced strength 28 may result in undesirable tearing of the lid material past or in a direction that does not follow the curved radius.

The interior shape of the body 12 of the container 10 at the corner 24, as well as the interior surface of the top flange 18 at the corner 24 can also be adjusted to aid in controlling the flow of the product when squeezing to dispense through the spout-type opening 26. As illustrated in FIGS. 5 and 6, the size of the opening 34 is defined by the distance between the interior rim of the top flange 18 and the opposed end of the spout-type opening 26 disposed over the interior volume 16 as well as the width of the portion of the spout-type opening disposed over the interior volume 16. Both dimensions can be adjusted to control size of the opening 34, which in turn controls the amount or speed of flow of the product during squeezing. For example, a smaller distance between the interior surface of the top flange 18 at the corner 24 and the opposed end of the spout-type opening 26 would provide a smaller opening 34 to allow for more controlled or slower flow of the product. In more viscous products, it may be desirable to provide a larger distance between the top flange 18 and the opposed end of the spout-type opening 26 to provide a larger opening, which ultimately can reduce the force necessary to make the product flow out the container 10.

Figure 7:
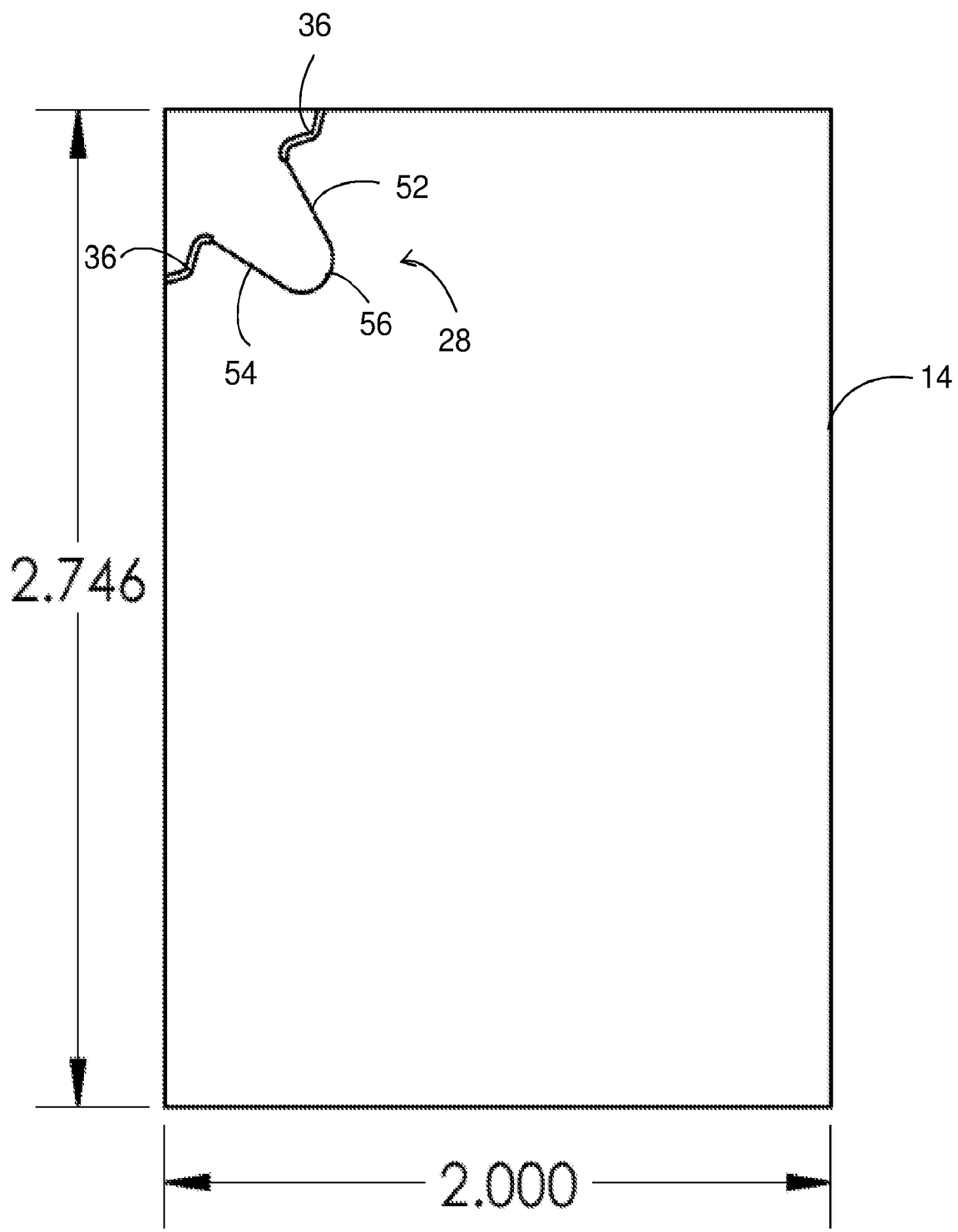
FIG. 7 is a top view of a lid for a container in accordance with an embodiment of the disclosure.

Referring to FIG. 7, an initiation region 36 can precede the pattern of reduced strength 28. The pattern of reduced strength 28 defines the portion of the lid 14 that is removed to define the spout type opening 26. At least a portion of the pattern of reduced strength 28 is disposed such that the interior surface of the lid material is exposed to the product contained in the body. In an embodiment, the pattern of reduced strength 28 can include a first portion 38 that is in the vicinity of the top flange 18 and remains sealed to the top flange 18 and a second portion 40 dispose over the interior volume 16 such that when spout-type opening is opened, the opening 34 is formed at this second portion 40. The pattern of reduced strength 28 is defined by partial penetration through the lid material. For example, in a lid 14 formed of a laminate structure of foil-polyethylene-PET, the pattern of reduced strength 28 can include penetration of a score line through the PET layer or a portion of the PET layer. In a lid 14 formed of a laminate structure of PET-foil-polyethylene, the pattern of reduced strength 28 can include penetration of a score line through only a portion of the PET layer so that the foil is not exposed through the score line. Advantageously, the pattern of reduced strength 28 does not have a penetration depth that exposes a foil layer if included in the lid material. Such foil layers are susceptible to reaction with various products, such as ketchup, which can adversely affect the flavor the contained product.

The pattern of reduced strength 28 can be a continuous line having less than 100% penetration through the material so that the container 10 remains sealed until the lid material is torn along the pattern of reduced strength 28 and the spout-type opening 26 is formed. Alternatively, the pattern of reduced strength 28 can include perforations that include cut openings that penetrate through a percentage (but less than the entirety of the lid material) and bridges that connect the cut openings. For example, suitable percent cut openings of perforations or percent penetration of continuous lines, commonly referred to herein as "percent penetration," include about 40% to about 95%, about 60% to about 95%, about 55% to about 80%, about 70% to about 99%, about 75% to about 90%. The percent penetration can be for example about 40, 42, 44, 46, 48, 50, 52, 54, 56, 58, 60, 62, 64, 68, 70, 72, 74, 76, 78, 80, 82, 84, 86, 88, 90, 91, 92, 93, 94, and 95%. In a lid material having a laminate or multilayer structure, the pattern for reduced strength 28 can have a percent penetration through the one of the laminate layer (i.e., the product facing or external facing layer) of about 40% to about 100%, about 60% to about 95%, about 55% to about 80%, about 70% to about 99%, about 75% to about 90%. The percent penetration can be for example about 40, 42, 44, 46, 48, 50, 52, 54, 56, 58, 60, 62, 64, 68, 70, 72, 74, 76, 78, 80, 82, 84, 86, 88, 90, 91, 92, 93, 94, 95, 96, 97, 98, and 100%.

The initiation region 36 is disposed at an end point, preceding or upstream of the pattern of reduced strength 28. The initiation region 36 can extend from a circumferential edge 42 of the lid 14. The initiation region 36 includes cut-through having substantially 100% penetration through the entire lid material. In various embodiments, the initiation region 36 can extend such that it remains entirely disposed in the vicinity of the top flange 18 so that the container 10 remains sealed, despite the presence of the initiation region 36, as the interior volume 16 16 is not exposed. For example, as illustrated in FIG. 1, the initiation region 36 can extend at or adjacent to a circumferential edge 44 of the top flange 18 and then curves towards the internal volume, at which point the initiation region 36 transitions into the pattern of reduced strength 28. While curving inwardly, the initiation region 36 can remain disposed above the top flange 18 so that the container 10 remains sealed prior to first use.

Figure 3:
FIG. 3 is a photograph of a container having a pattern of reduced strength without an adequate initiation region, illustrating failed opening of the container for forming a spout-type opening.
Figure 4:
FIG. 4 is a photograph of another container having a pattern of reduced strength without an adequate initiation region, illustrating failed opening of the container for forming a spout-type opening.

Referring to FIGS. 5 and 6, it has advantageously been found that inclusion of the initiation region 36 having 100% penetration through the initiation region allows for preferential tearing of the lid material along the pattern of reduced strength 28 to form a well-defined spout-type opening 26. FIGS. 3 and 4 illustrate examples in which an initiation region 36 did not have 100% penetration through the lid material. As illustrated in FIGS. 3 and 4, the lid material did not tear following the pattern of reduced strength 28 to form the spout-type opening 26. It was found that when the initiation region retains some adherence, such as by having less than 100% penetration in a score line or bridging between 100% perforations, the force needed to tear the lid material was greater than the force needed to peel the lid from the top flange 18. As a results, the lid 14 peeled from the body 12 as opposed to tearing about the pattern of reduced strength 28. In contrast, as shown in FIGS. 5 and 6, the inclusion of the initiation region 36 with the same pattern of reduced strength 28 resulted in well-defined tearing of the lid 14 along the pattern of reduced strength 28 to form the spout-type opening 26.

Figure 8:
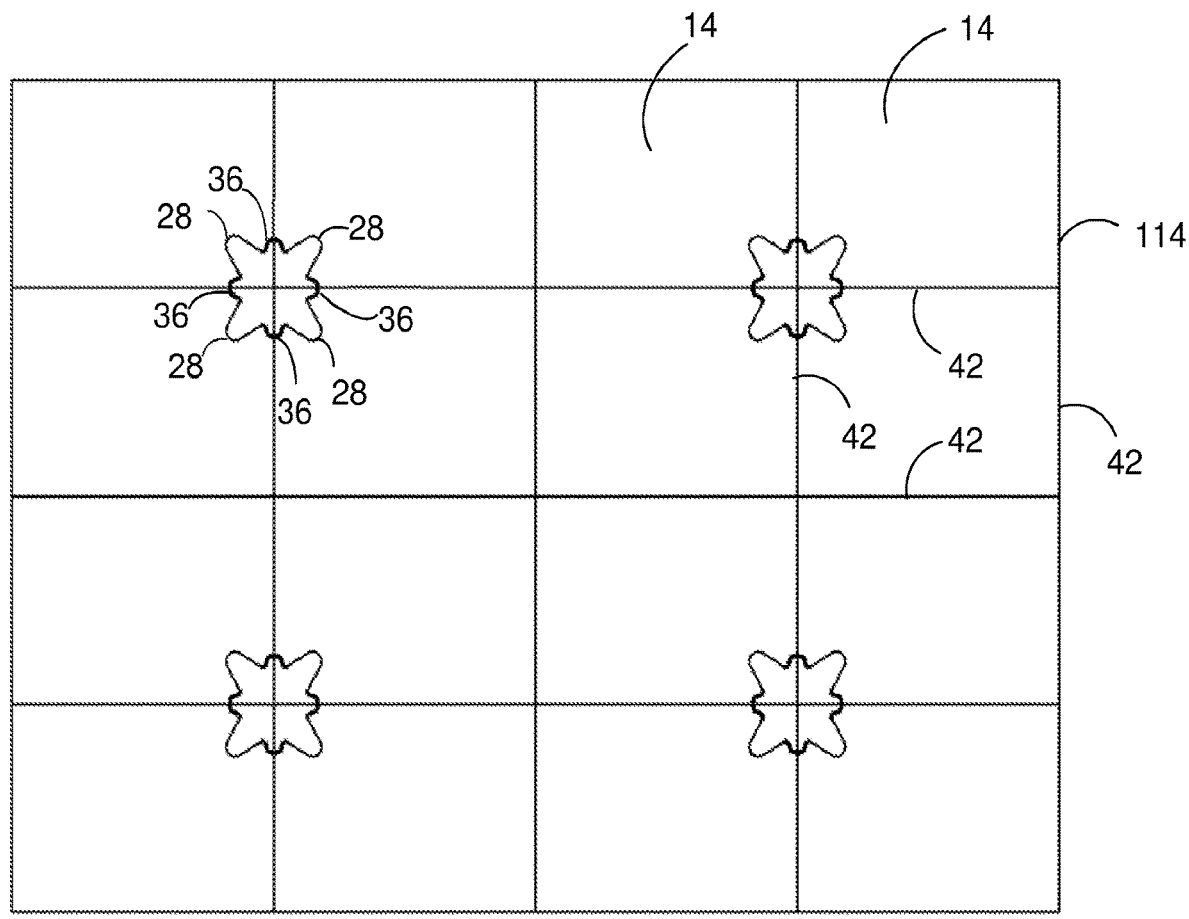
FIG. 8 is a top view of a sheet of lidding material having a plurality of lids in accordance with an embodiment of the disclosure.

In various embodiments, the pattern of reduced strength 28 and the initiation region 36 can be formed in the lid material as a sheet of lid material 114 containing a plurality of lids 14. Referring to FIG. 8, the pattern of reduced strength 28 and initiation region 36 can be formed in the sheet of lid material 114 prior to sealing of the lid material to bodies 12. For example, in an embodiment the pattern of reduced strength 28 and initiation region 36 can be formed by laser scoring. Other methods of forming continuous lines of reduced strength or perforation, such as die cutting and perforated may also be used. It has advantageously been found that by varying the speed and/or power of the laser, the initiation region 36 and the pattern of reduced strength 28 can be defined in the sheet of lid material 114 in a single operation. For example, when laser scoring, the laser can be set to a fixed power and the speed of the laser can be used to control whether the lid 14 is entirely cut through or have less than 100% penetration. For example, in the initiation region 36 a slower laser speed can be used to ensure the material is entirely cut through and then the laser speed can be accelerated when transition to defining the pattern of reduced strength 28 so that less than 100% penetration through the material is achieved. In some embodiments, as the laser curves around defining the spout and reaches the end point of the pattern of reduced strength 28 in the top flange 18 area, another initiation region 36 can be defined. This can be advantageous in providing access to tearing of the lid 14 either end of the pattern of reduced strength 28.

For example, in a method of forming the initiation region 36 and the pattern of reduced strength 28 using laser scoring, at 100% power, the speed of the laser can be adjusted to adjust the penetration depth of the score. In the pattern of reduced strength 28, a speed in a range of about 3,000 mm/sec to about 10,000 mm/sec can be used. Other suitable speeds include about 3,000 to 8,000 mm/sec, about 5,000 to 7,000 mm/sec, about 4,000 to about 6,000 mm/sec, and about 5,000 to about 10,000 mm/sec. For example, the pattern of reduced strength can be formed using a laser speed of about 3000, 3500, 4000, 4500, 5000, 5500, 6000, 6500, 7000, 7500, 8,000, 8500, 9000, 9500, and 10000 mm/sec. The initiation region, also referred to herein as the burn-through region, can be formed at 100% power using a speed of about 140 to about 400 mm/sec. Other suitable speeds for forming the initiation region 36 can be about 140 to 225 mm/sec, about 200 to 250 mm/sec, about 300 to 400 mm/sec, or about 150 to 250 mm/sec. For example, the initiation region 36 can be formed using a laser speed of about 140, 160, 180, 200, 220, 225, 240, 250, 260, 280, 300, 320, 340, 360, 380, and 400 mm/sec. A laser having 100 W power can be used in the foregoing embodiments.

The focus setting of the laser can be adjusted to adjust the width of the score lines in the pattern of reduced strength 28 and burn through in the initiation region 36. For example, a focus setting of about 400 to about 550, about 450 to about 480, or about 450 to about 500. Other suitable values include about 400, 405, 410, 415, 420, 425, 430, 435, 440, 445, 450, 455, 460, 465, 470, 475, 480, 485, 490, 495, and 500.

In any of the laser scoring embodiments disclosed herein, multiple lasers can be used simultaneously to form the initiation regions 36 and patterns of reduced strength 28 in parallel along the width of the sheet of lidding material 114 or rollstock. Additionally, higher power lasers than 100 W lasers can be used with adjustment of the speed and/or focus to account for the increased power.

Referring to FIG. 8, a sheet of lidding material 114 having a plurality of lids 14 defined therein can be used in forming a container assembly 100. Prior to sealing the sheet of lidding material 114 to a body assembly 112 to form the sealed container assembly 110, the spout-type opening 26 can be defined by forming the initiation region 36 and the pattern of reduced strength 28. In the embodiment of FIG. 8, a connected set of initiation regions 36 and patterns of reduced strength 28 are formed at the corner 24 intersection of four lids. During formation of the spout-type openings 26, for example using a laser scoring method, this allows for reduced number of laser passes needed to form the spout type openings in each lid. Four spout-type openings 26 can be formed simultaneously and with a single patterned movement of the laser. Control of the speed and/or power of the laser to vary the percent penetration provides for the formation of initiation regions 36 and patterns of reduced strength 28 while using single continuous patterned movement of the laser. As illustrated in FIG. 8, the initiation regions 36 of adjacent lids can be connected over the boundary between adjacent lids. This provides a tolerance for offset that may result when the lidding material is adhered to the body assembly 112 to form the container assembly 100 or when the container assembly 100 is cut into individual containers 10.

Figure 11:
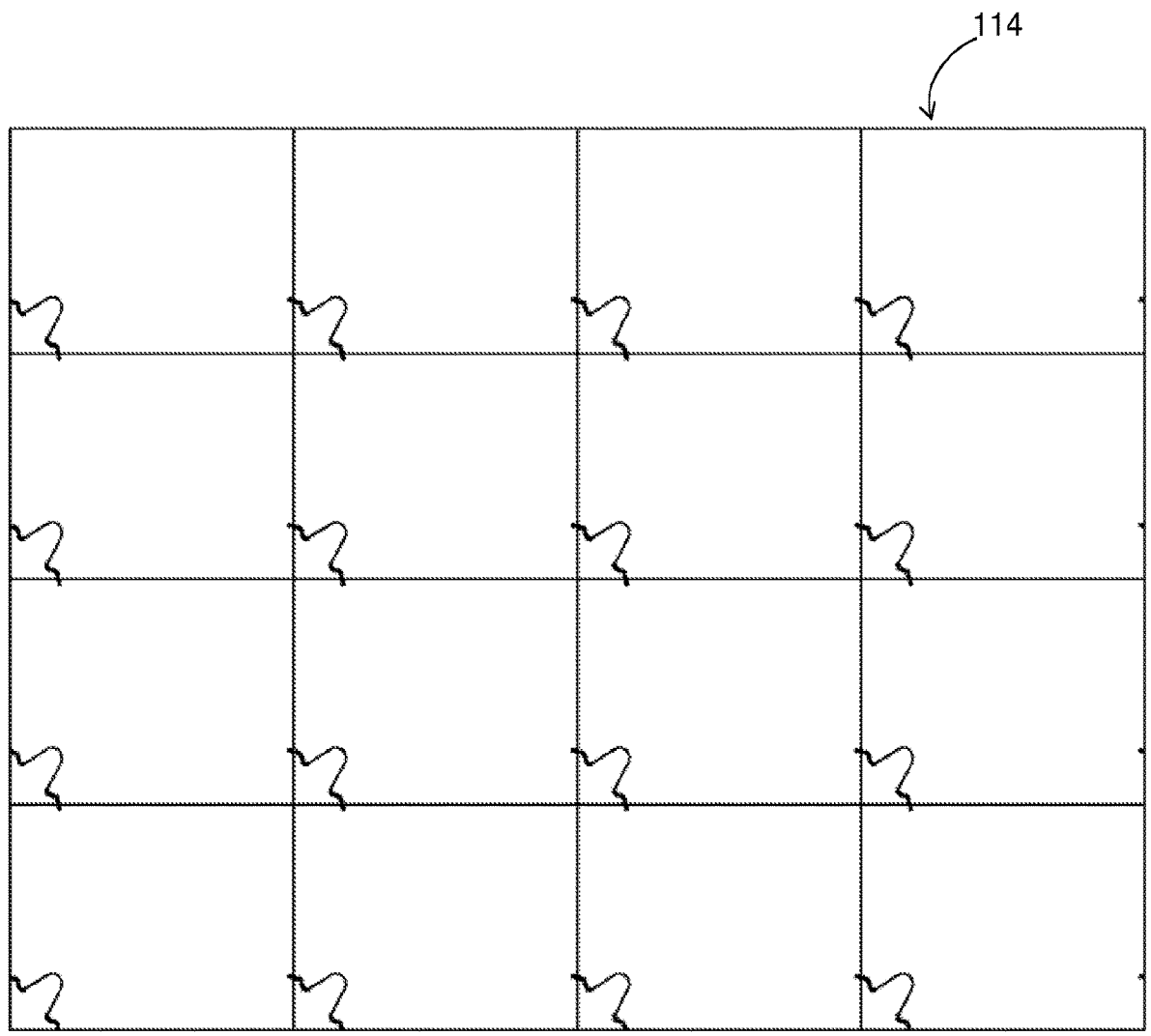
FIG. 11 is a top view of a sheet of lidding material having a plurality of lids in accordance with another embodiment of the disclosure.
Figure 12:
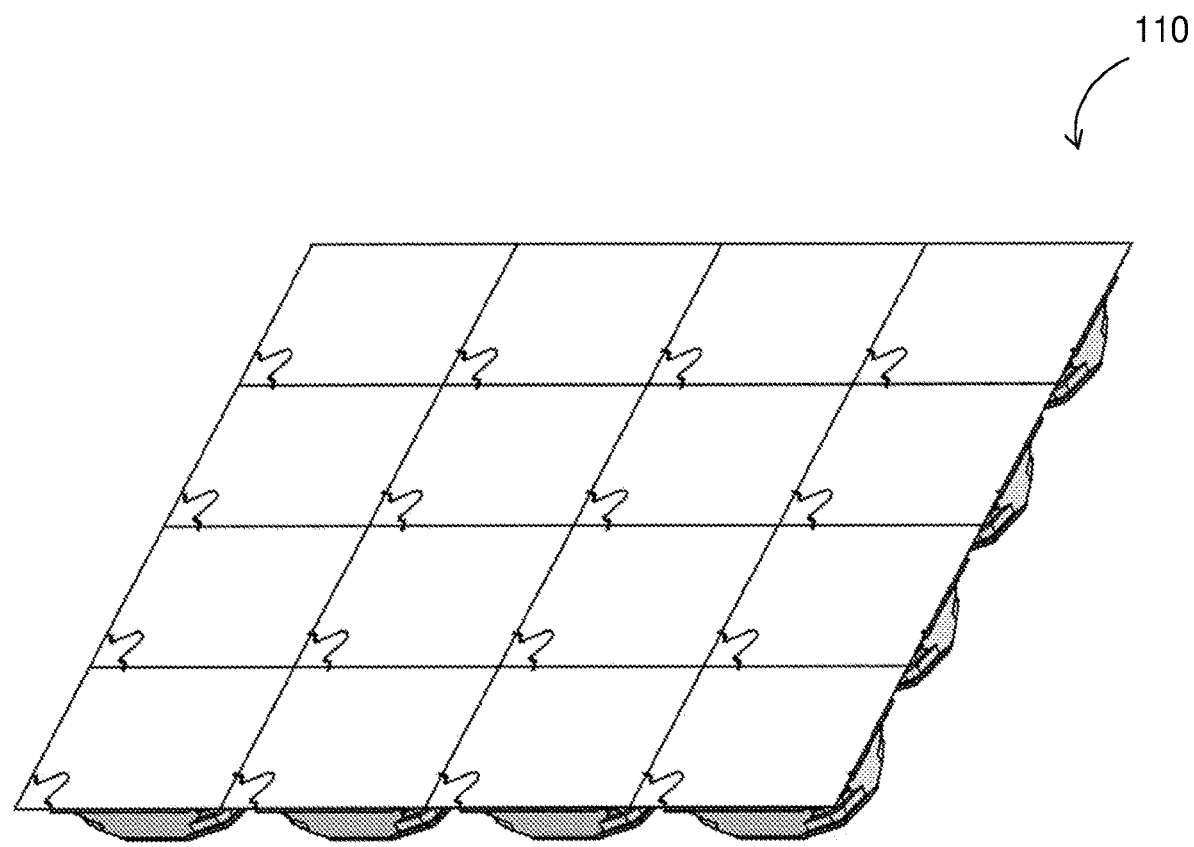
FIG. 12 is a top perspective view of a container assembly in accordance with an embodiment of the disclosure having the lidding material of FIG. 11.

In an alternative embodiment, illustrated in FIG. 11, each individual spout-type opening 26 can be defined in a corner 24 of each of the lids as opposed to using a patterned orientation.

A variety of patterns for the pattern of reduced strength 28 can be used depending on the product to be dispensed. FIG. 23 illustrates various spout-type opening shapes and sizes that can be used in lids and containers in accordance with the disclosure. For example, a wider spout-type opening 26 may be desirable when a more viscous product is contained in the container 10. The size and shape of the opening can be controlled by the pattern of reduced strength 28. In various embodiments, the initiation region 36 extends at or near a circumferential edge of the body 12 of the container 10 or top flange 18. The initiation region 36 can be relatively linear or have low degree of curvature, particularly as it transitions into the pattern of reduced strength 28 that is relatively linear and oriented in the direction of tear. It has been found that such orientation of the initiation region 36 and transition to the pattern of reduced strength 28 can facilitate preferential tearing along the pattern of reduced strength 28, particularly as it transitions to more highly curved regions defining the spout-shape.

In an embodiment, each spout-type opening 26 can include an initiation region 36 that starts at a circumferential edge 42 of the lid 14 and has a first initiation portion 46 that is angled inward towards the interior volume 16 from the starting point at the circumferential edge 42 of the lid, a second initiation portion 48 that is connected to the first initiation portion 46 that is angled away from the interior of lid, and a third initiation portion 50 that is angled back toward the interior volume 16 and transitions into the pattern of reduced strength 28. The portions of the initiation region 36 can be linear or substantially linear. Transitions between the one or more of the initiation portions can be curved or have a slight curvature. Referring to FIG. 1E, in some embodiments, the initiation region 36 can generally reside at or near the circumferential edge 44 of the top flange 18. The initiation region 36 transitions directly into the pattern of reduced strength 28. Referring to FIG. 8, in embodiments, such as described above in which formation of the initiation region 36 regions and the pattern of reduced strength 28 is done for a grouping of lids with a single continuous pattern, the initiation regions 36 between adjacent lids can be connected, for example, by a linear portion that is perpendicular to the boundary between the adjacent lids that the portion crosses. This linear portion can define the first initiation portions in each of the respective lids.

In the embodiment illustrated in FIG. 1E and FIG. 8, the pattern of reduced strength 28 can include a first reduced strength portion 52 that extends from the third initiation portion and is generally linear, a second reduced strength portion 54 that has a radius of curvature for defining a curved end of the spout-type opening 26, and a third reduced strength portion 56 that is generally linear. The third reduced strength portion 56 can transition to another initiation region 36. The first and third reduced strength portions 52, 56 of the pattern of reduced strength 28 can be mirror images. Each of the first and third reduced strength portions 52, 56 extends from a position disposed over the top flange 18 to a position disposed over the interior volume 16. The second reduced strength portion is disposed over the interior volume 16. The initiation regions 36 disposed on either side of the pattern of reduced strength 28 can be mirror images. While the embodiment discussed above is described with respect to separate portions of the initiation regions 36 and the patterns of reduced strength, it should be understood herein that portions can define a single continuous pattern of reduced strength 28 without a gap or interruption between the portions. The portions need to be distinct portions, but rather are used herein for illustrative purposes in describing the shape of the initiation regions 36 and the pattern of reduced strength 28. For example, as described above, the initiation portion and pattern of reduced strength 28 can be formed by a single and continuous laser pass. A greater or fewer number of portions can be used in the initiation region 36 and/or the pattern of reduced strength 28. Alternative geometries, angles, or sizes are also contemplated herein.

In any of the embodiments herein, the sheet of lidding material 114 can include the lids 14 arranged in columns and rows. Each column and each row can include any suitable number of lids 14 and can correspond to the number of bodies 12 in the column and rows of the body assembly 112 to which the sheet of lidding material 114 is to be sealed to form a container assembly 100 100. For example, the sheet of lidding material can be a 4×4 array of lids or a 5×4 array of lids or a 6×4 array of lids, or a 5×5 array of lids, or any other suitable number. The number of lids 14 in each column and row can be determined by the size of the lids 14. For example, the size in terms of lidding material and consequently the number of lids in the rows and columns can be configured to allow for use of existing equipment. In various embodiments, the lidding material can be provided as a rollstock having a plurality of lids 14 joined to at least one adjacent lid 14. The rollstock can have a number of columns corresponding to the body assembly 112 to which it is to be sealed, but an increased number of rows such that the rollstock material is cut during processing to the size (number of rows) of the body assembly 112 The discussion herein will refer to a sheet of lidding material 114 for ease of reference and illustration, but it should be understood that rollstock can also suitably be used.

Figure 9:
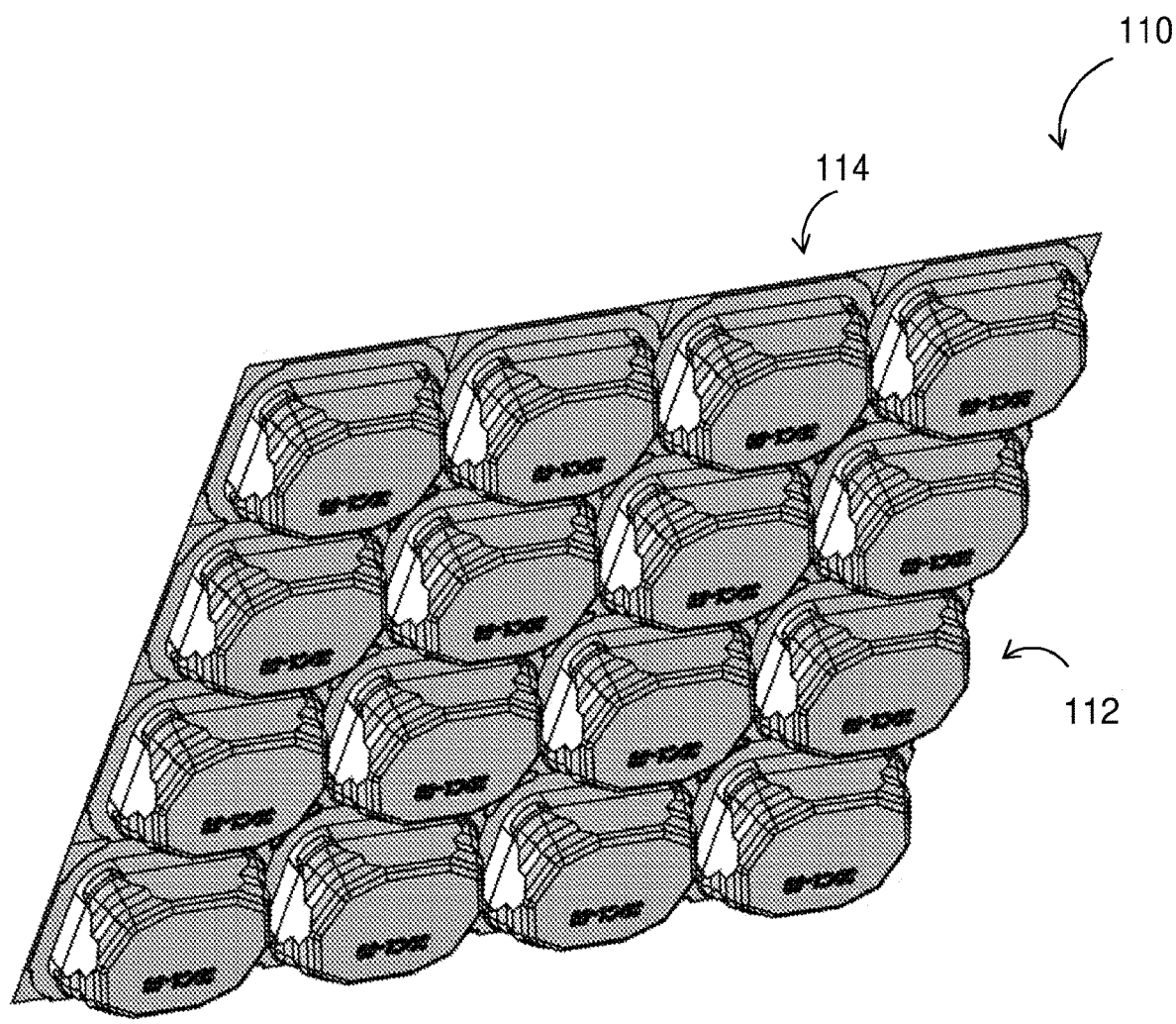
FIG. 9 is a bottom perspective view of a container assembly having a plurality of containers of FIG. 1A connected in accordance with an embodiment of the disclosure.
Figure 10:
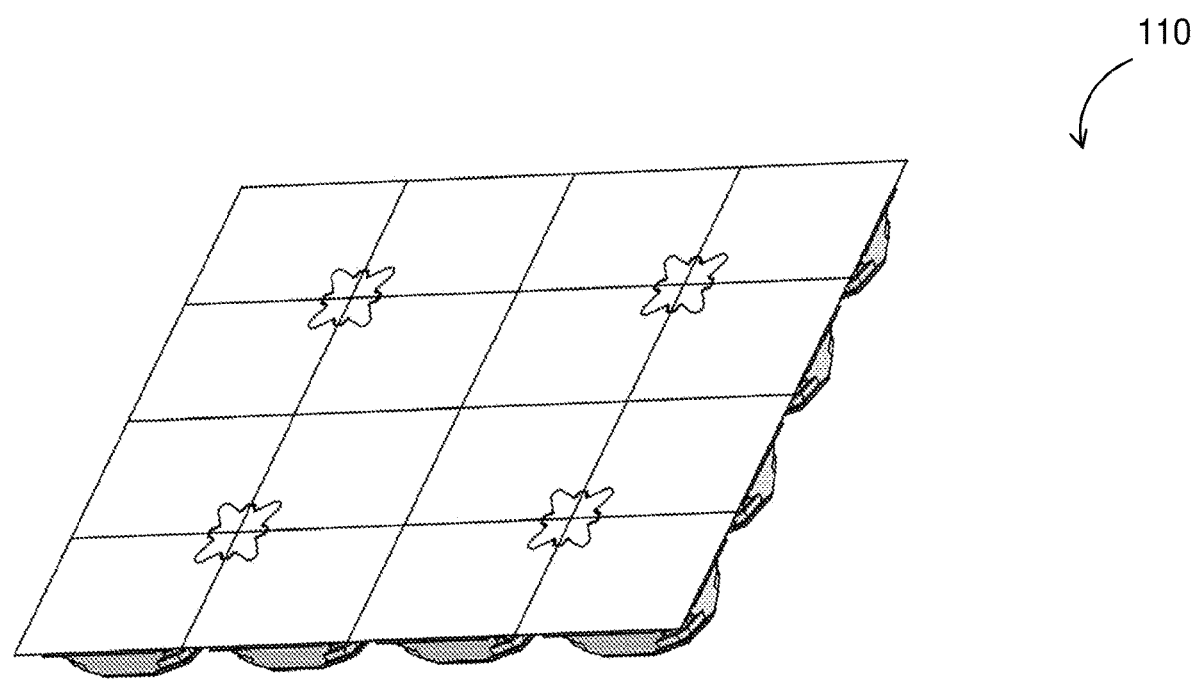
FIG. 10 is a top perspective view of a container assembly in accordance with an embodiment of the disclosure having the lidding material of FIG. 8.

Referring to FIGS. 9 and 10, for example, a container assembly 100 can include a plurality of containers 10, with each container 10 attached to an adjacent container 10 along at least one edge 112. It should be understood herein that in the container assembly 100 and lidding material figures, the lines showing the rows and columns, which identify the separated bodies 12 and/or lids, are illustrative and not necessarily defined lines within the material. Instead, such lines illustrate where the container assembly 100 and/or lidding material would be separated to provide individual bodies 12 and lids. Adjacent containers 10 can be joined by at least two edges, at least three edges, at least 4 edges, or more depending on the shape of the container 10. Depending on the arrangement of the containers 10, containers 10 in the container assembly 100 can have different numbers of attached edges. For example, containers 10 in the center of the container assembly 100 can be joined to adjacent containers 10 on each of the edges, while containers 10 at the perimeter of the container assembly 100 can be joined by less than all of the edges, for example two edges or three edges. The container assembly 100 can include the containers 10 arranged in columns and rows. Each column and each row can include any suitable number of containers 10. For example, the container assembly 100 can be a 4×4 array of containers or a 5×4 array of containers or 6×4 array of containers or a 5×5 array of containers, or any other suitable number. The number of containers 10 in each column and row can be determined by the size of the containers 10. For example, the size in terms of container assembly 100 and consequently the number of containers 10 in the rows and columns can be configured to allow for use of existing equipment, which can accommodate sheets of containers of a predetermined size.

Figure 15A:
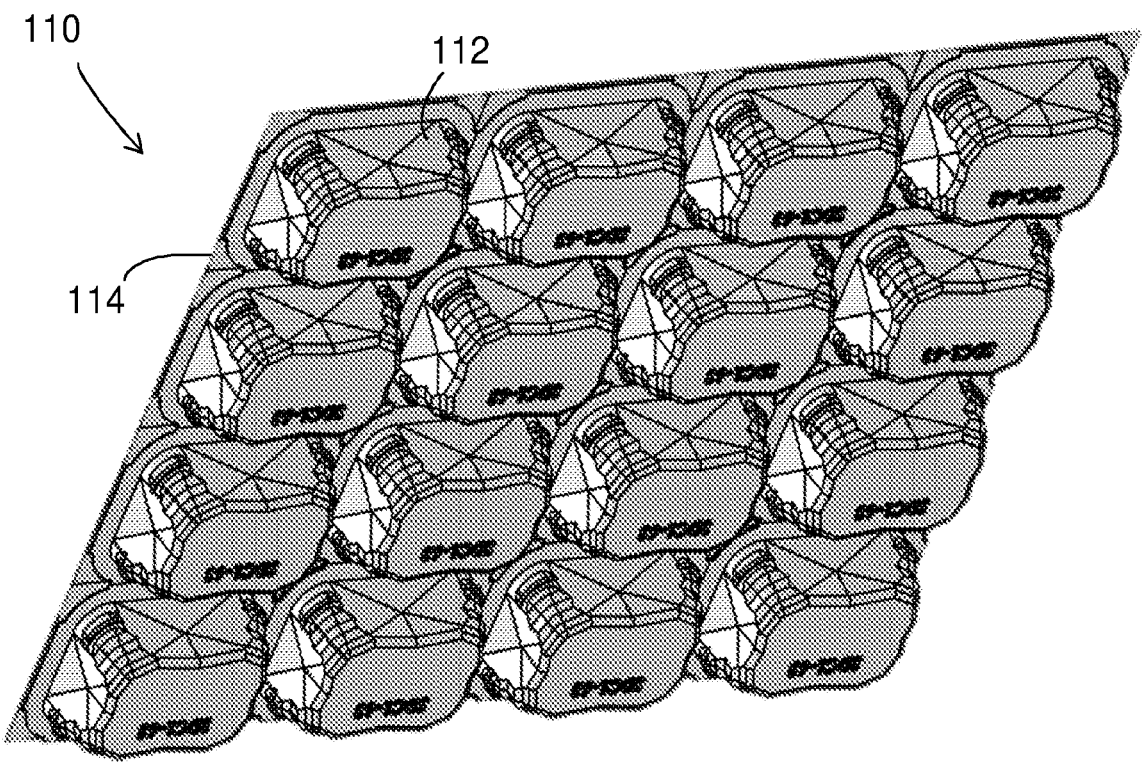
FIG. 15A is a bottom perspective view of a container assembly having a plurality of containers of FIG. 13A connected in accordance with an embodiment of the disclosure.
Figure 15B:
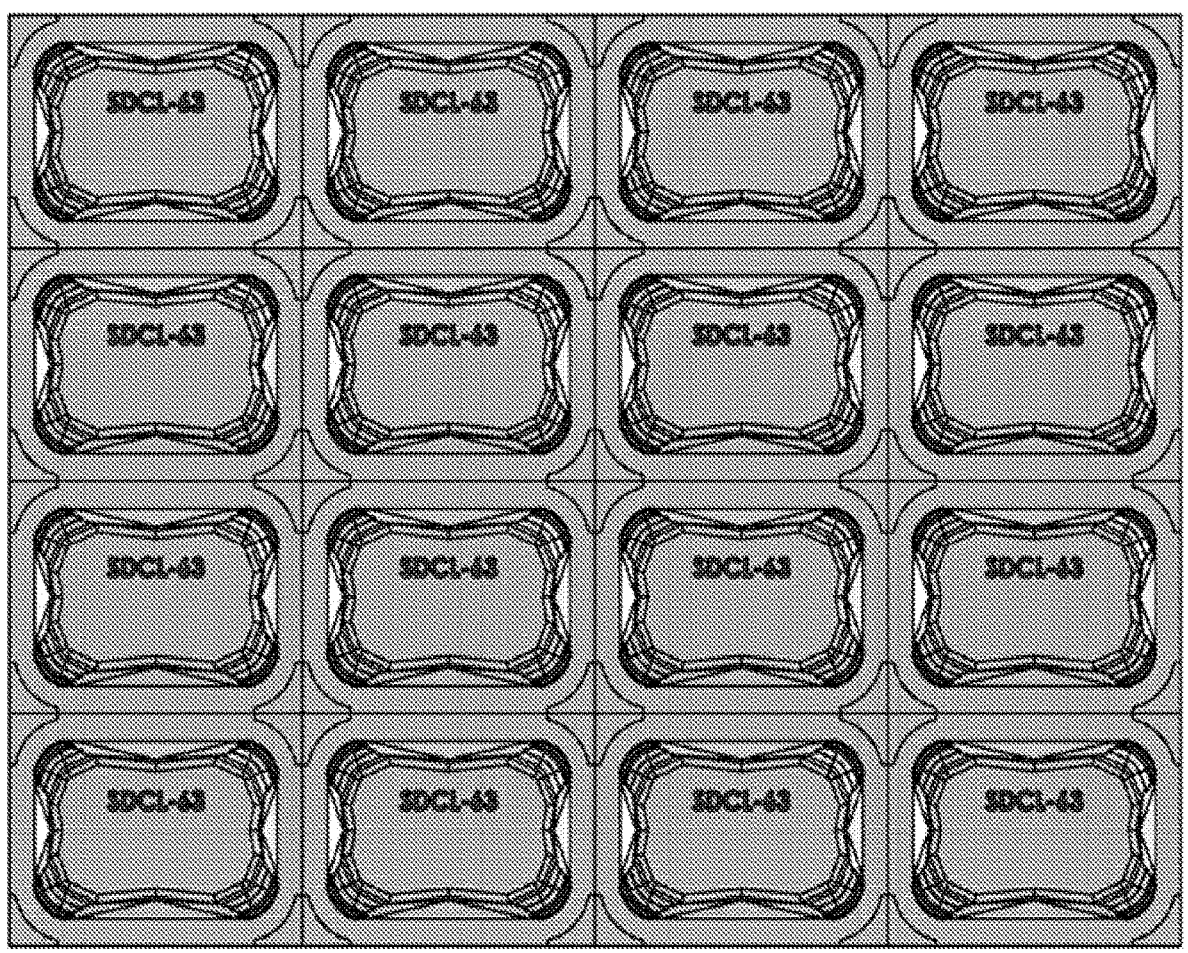
FIG. 15B is a bottom view of the container assembly of FIG. 15A.
Figure 16:
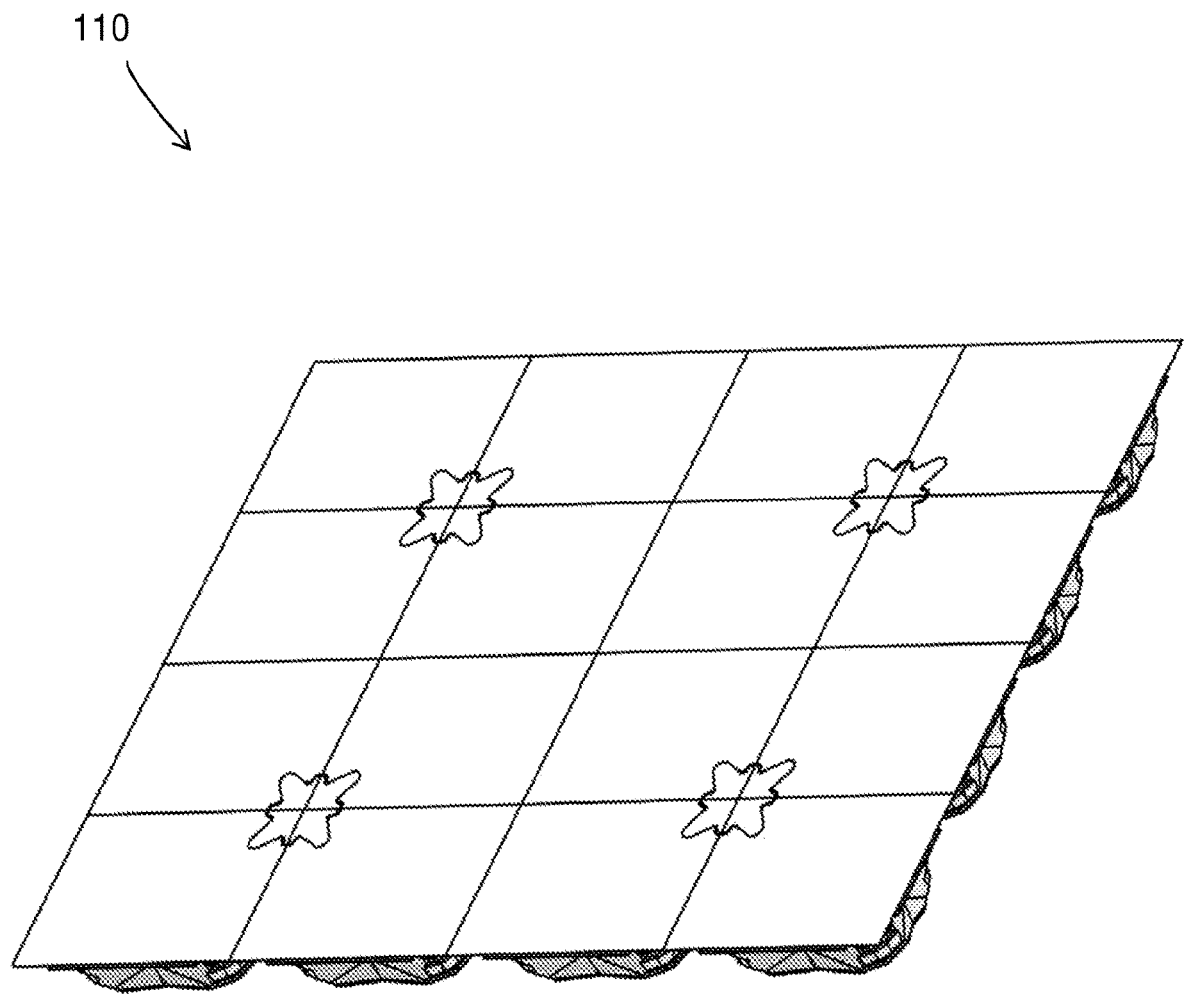
FIG. 16 is a top perspective view of a container assembly in accordance with an embodiment of the disclosure.
Figure 17:
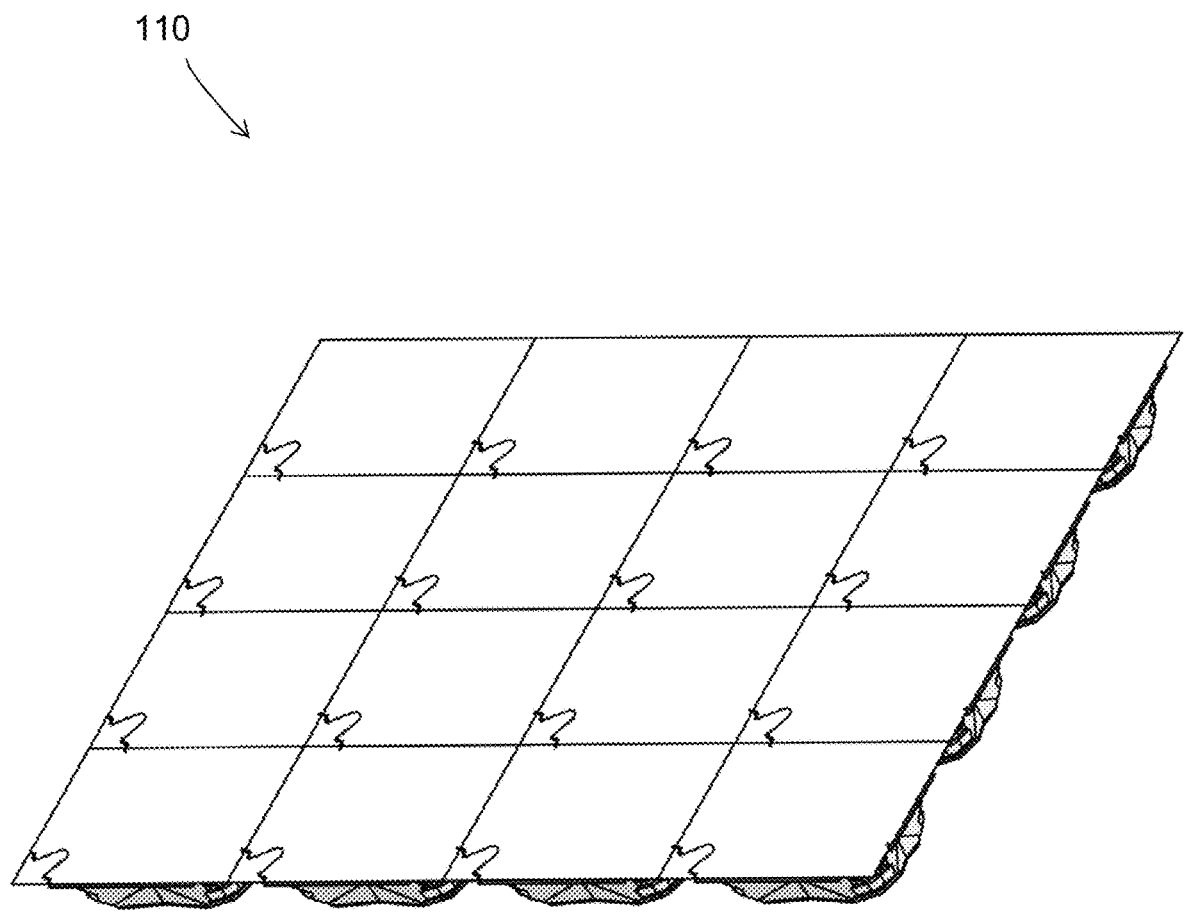
FIG. 17 is a top perspective view of a container assembly in accordance with another embodiment of the disclosure.

In an embodiment, the container assembly 100 can include the containers 10 arranged in a predetermined patterned. The container assembly 100 can be formed by sealing the lidding material (rollstock or sheet) to a body assembly 112. Referring to FIG. 15B, the body assembly 112 can include a plurality of bodies 12, with adjacent bodies 12 connected by at least one edge. In embodiment in which uniform rib structures are provided in each body, the bodies 12 of the body assembly 112 can be ordered in any manner, as the orientation will not affect the placement of lid 14 having the spout-type opening 26 defined therein. Star punching or other conventional treatment of a body assembly 112 of structures can be performed. Star punching is conventionally performed with portion control containers to facilitate the separation and trimming operation of the container assembly 100 by defining the curvature of the outer circumference of the top flange 18 at the corners 24 between four adjacent bodies 12.

Figure 20A:
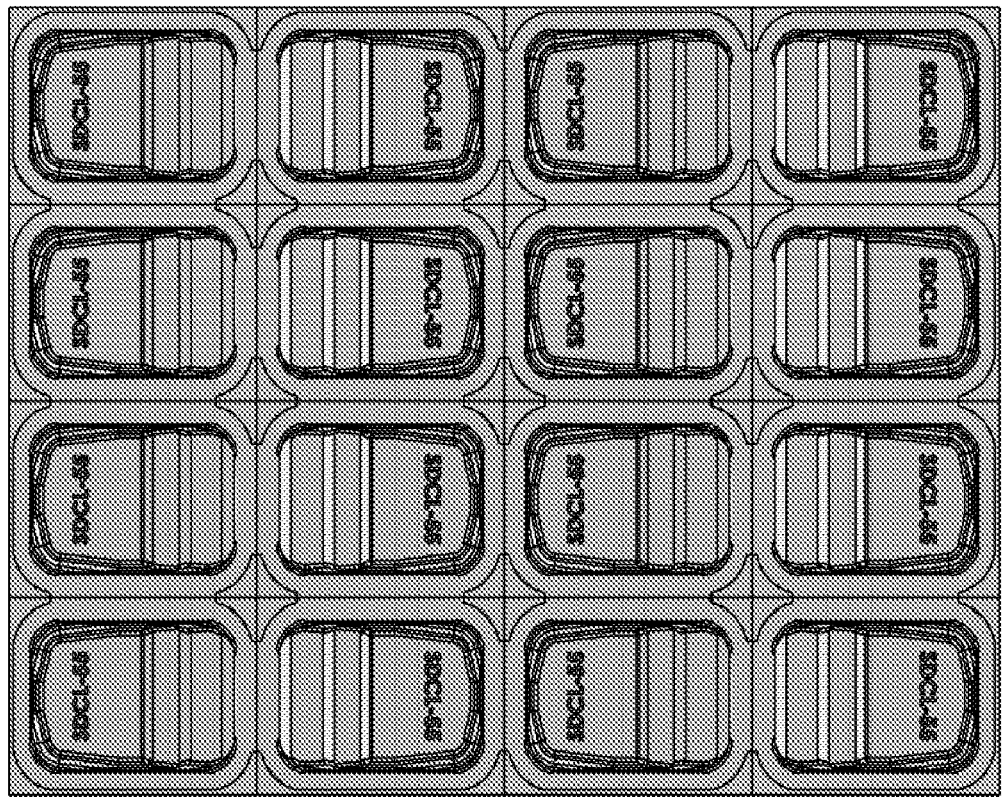
FIG. 20A is a bottom view of a container assembly having a plurality of containers in accordance with FIG. 18A connected in accordance with an embodiment of the disclosure.
Figure 20B:
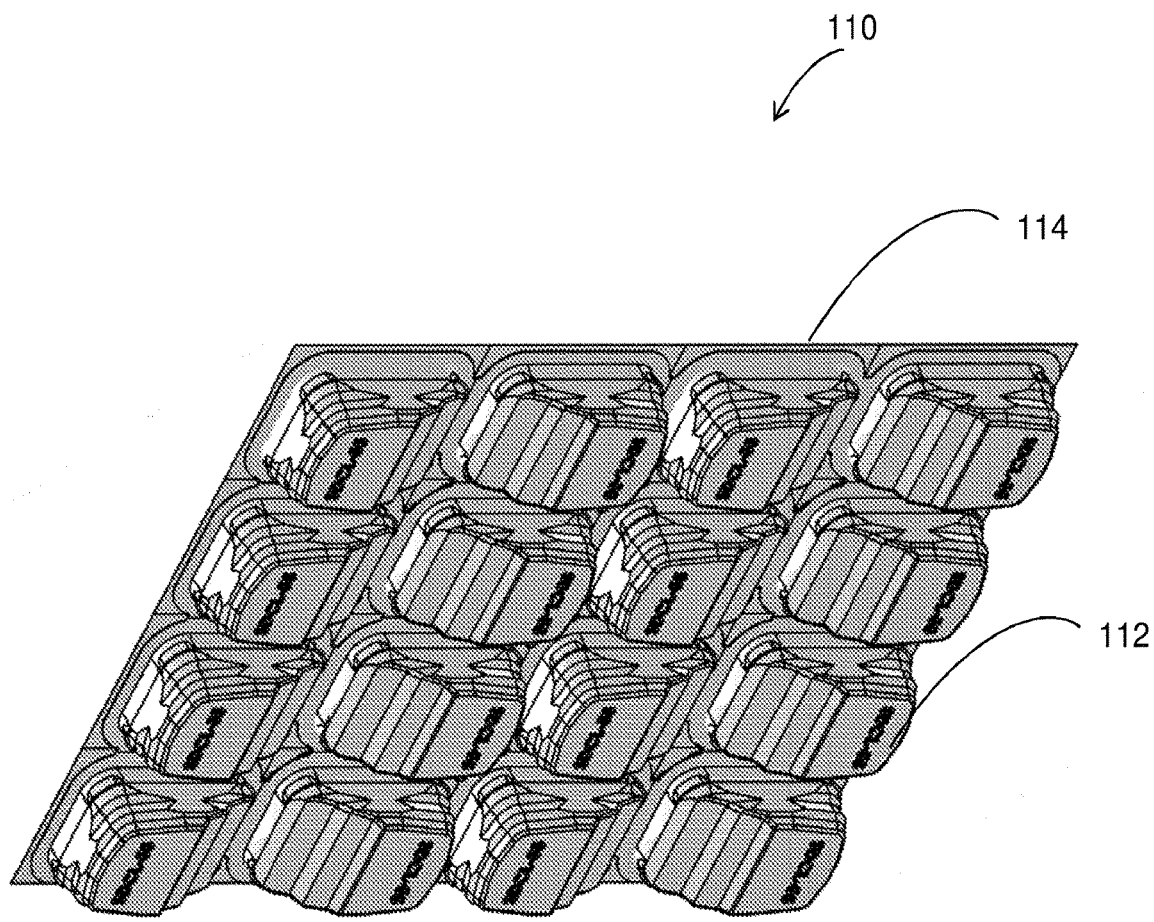
FIG. 20B is a bottom perspective view of the container assembly of FIG. 20.
Figure 21:
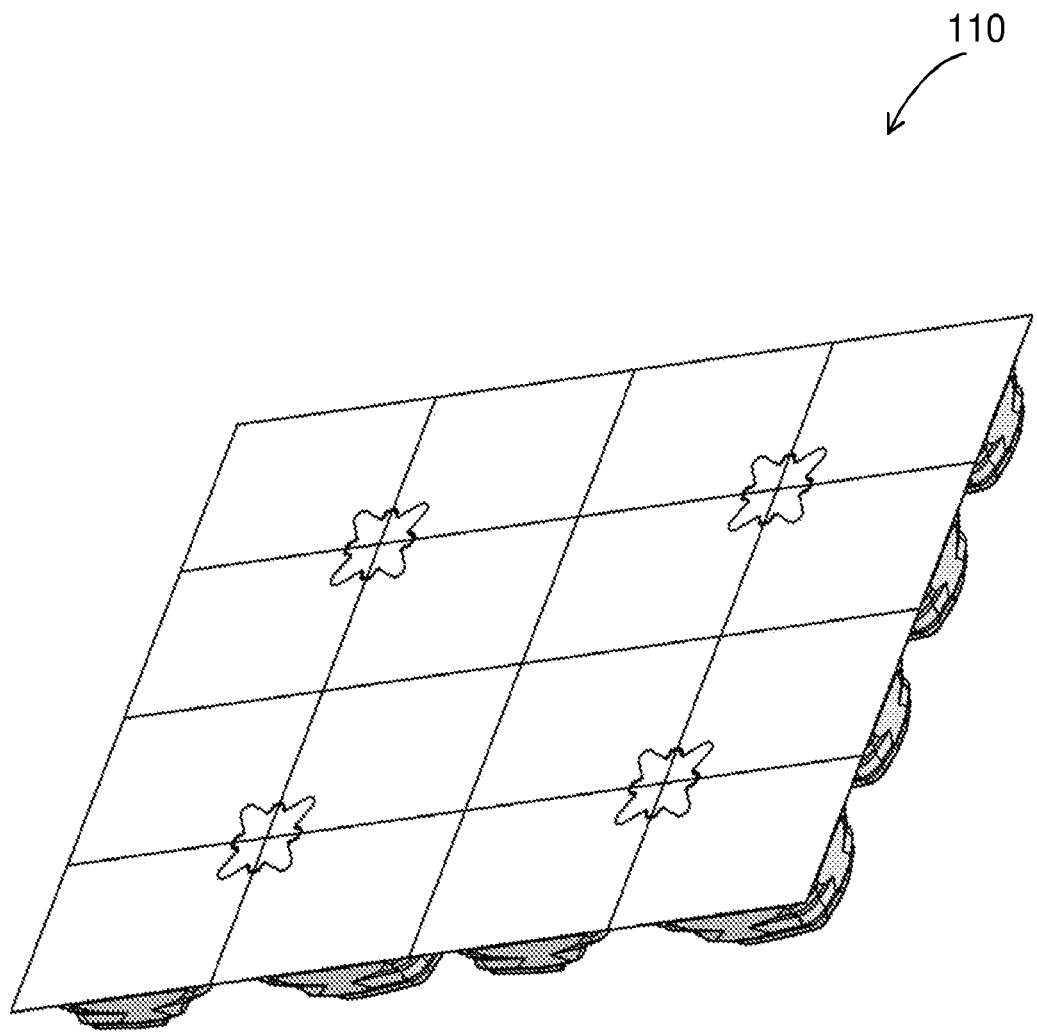
FIG. 21 is a top perspective view of a container assembly in accordance with an embodiment of the disclosure.
Figure 22:
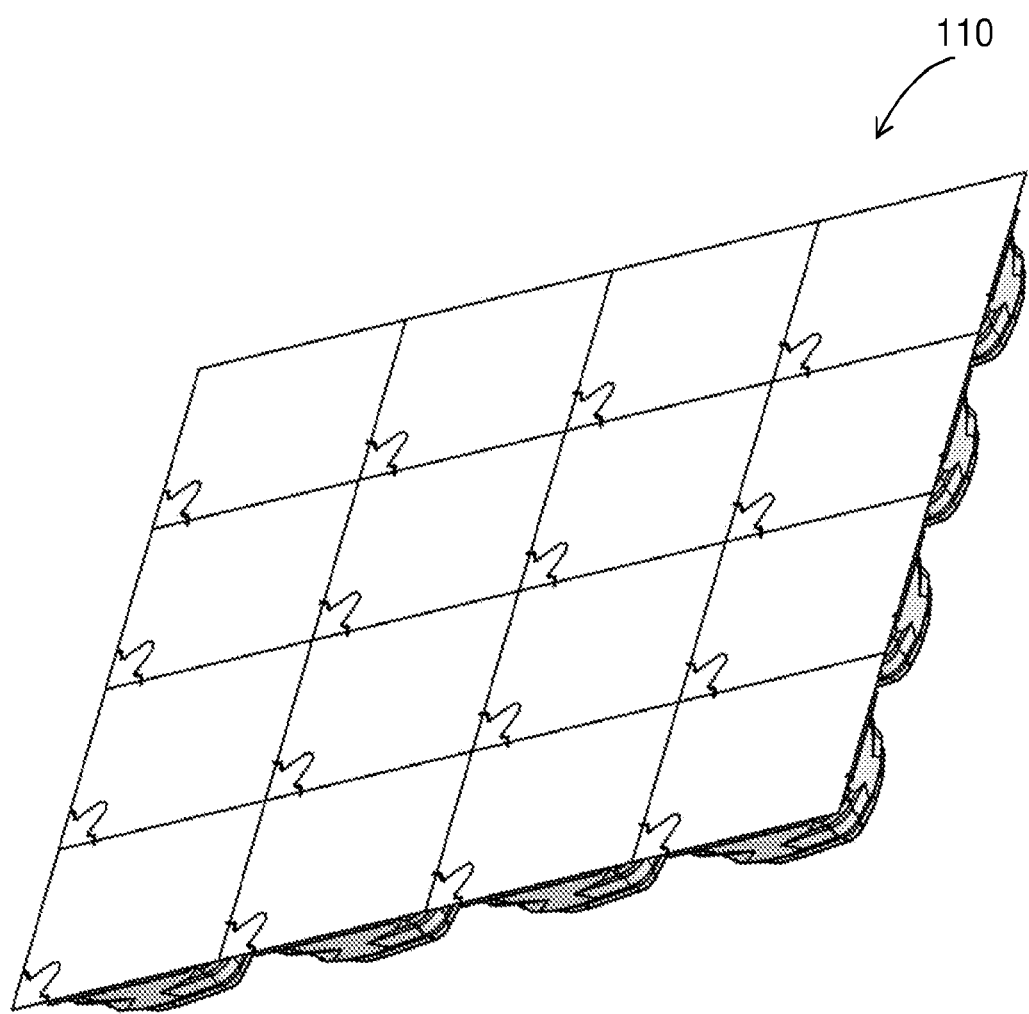
FIG. 22 is a top perspective view of a container assembly in accordance with another embodiment of the disclosure.
Figure 23A:
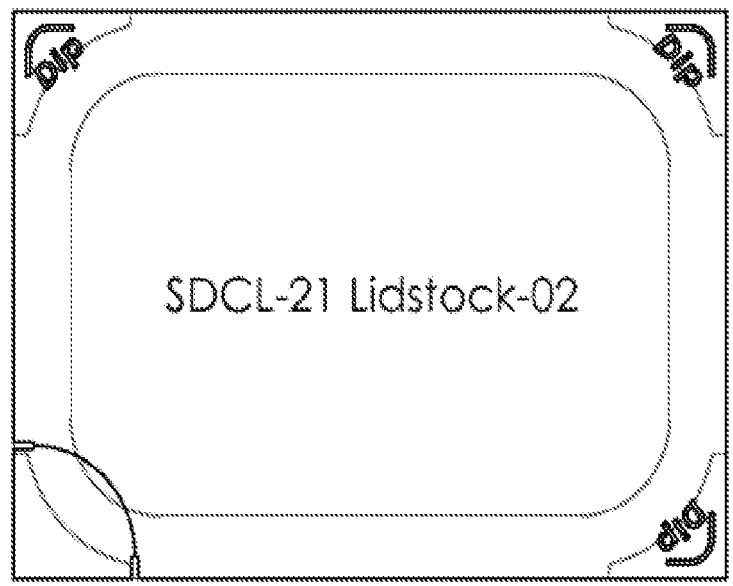
FIGS. 23A-W are top views of a lid having different spout-type openings in accordance with embodiments of the disclosure.
Figure 23B:
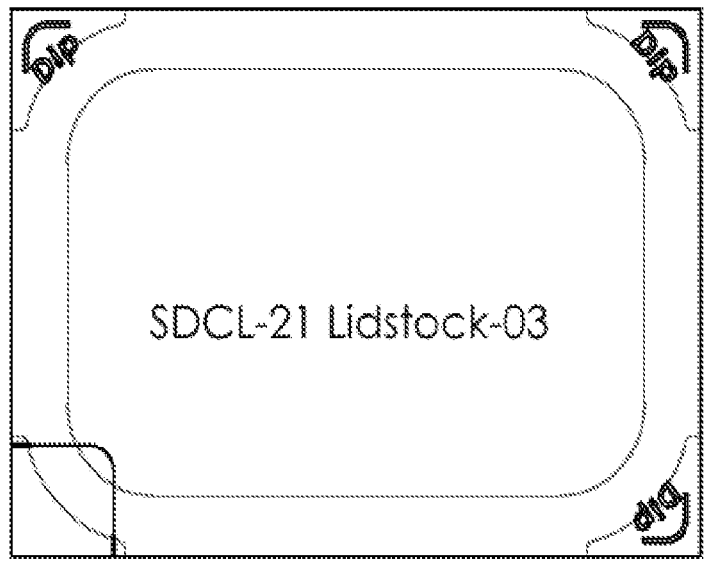
Figure 23C:
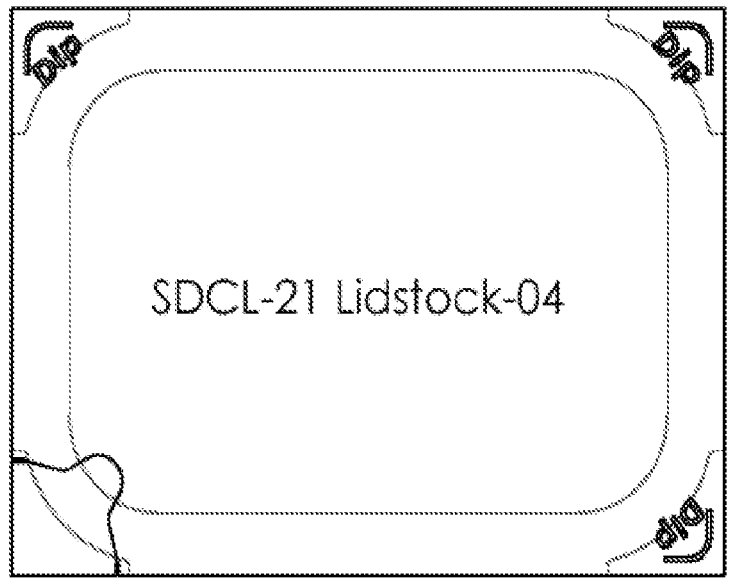
Figure 23D:
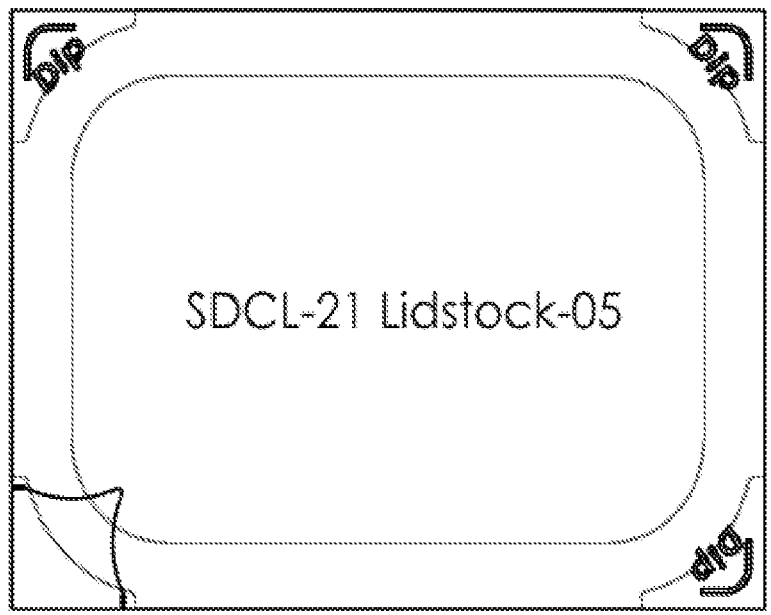
Figure 23E:
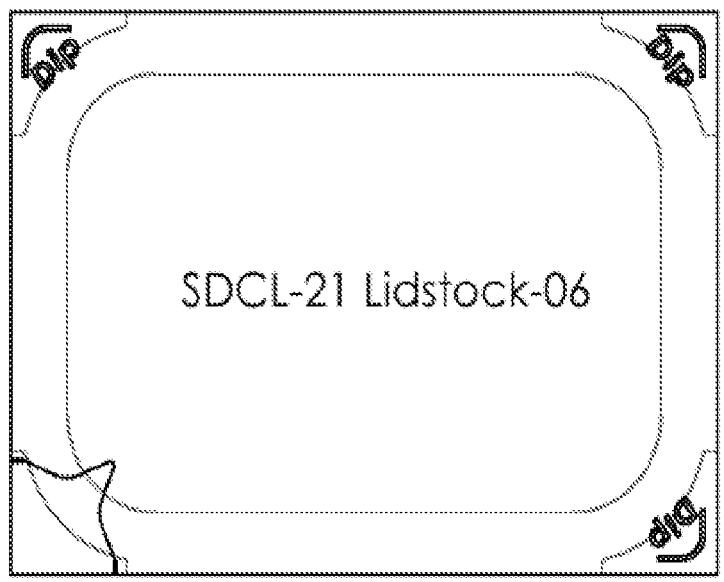
Figure 23F:
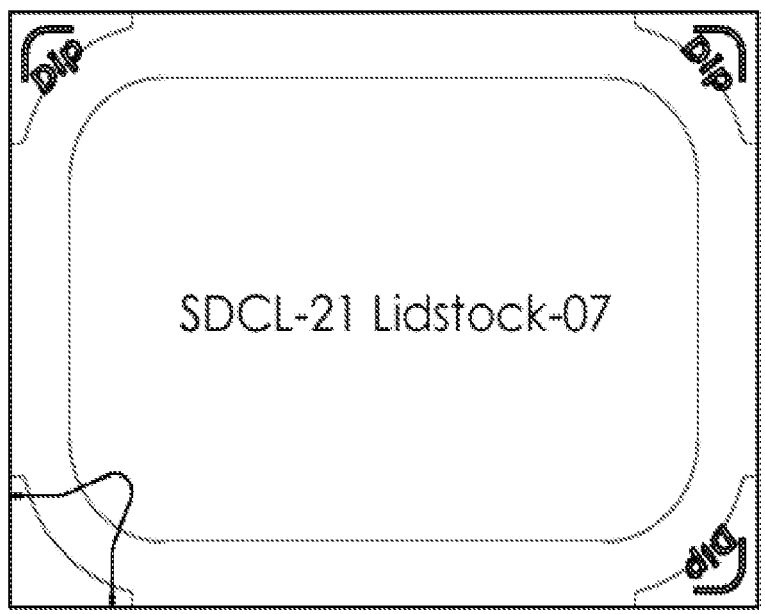
Figure 23G:
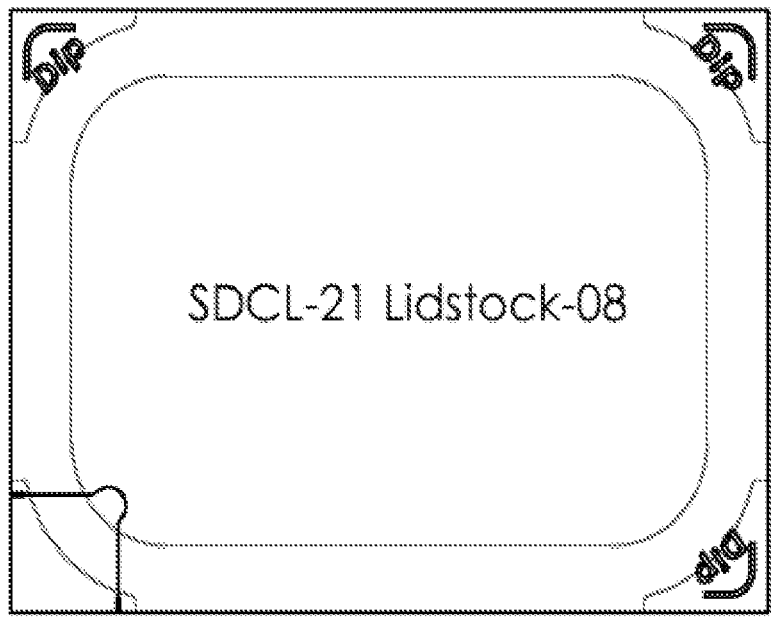
Figure 23H:
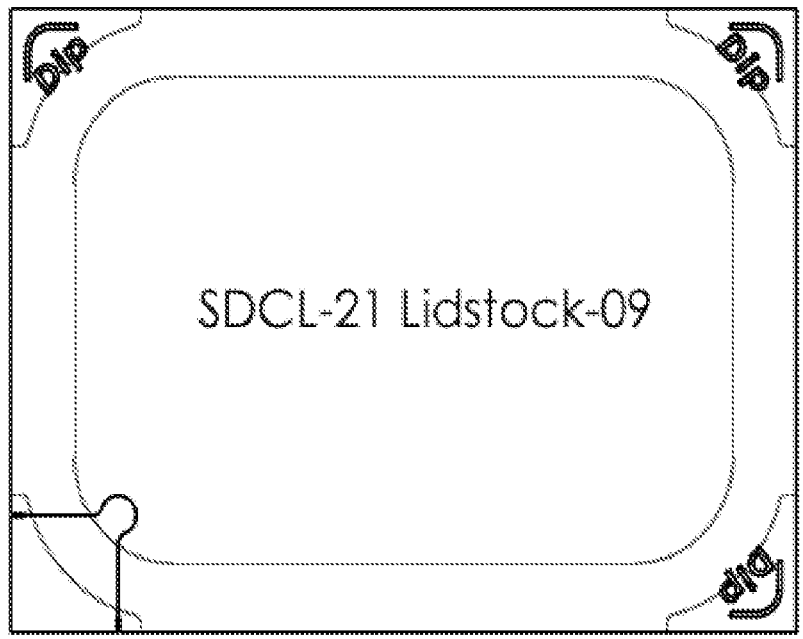
Figure 23I:
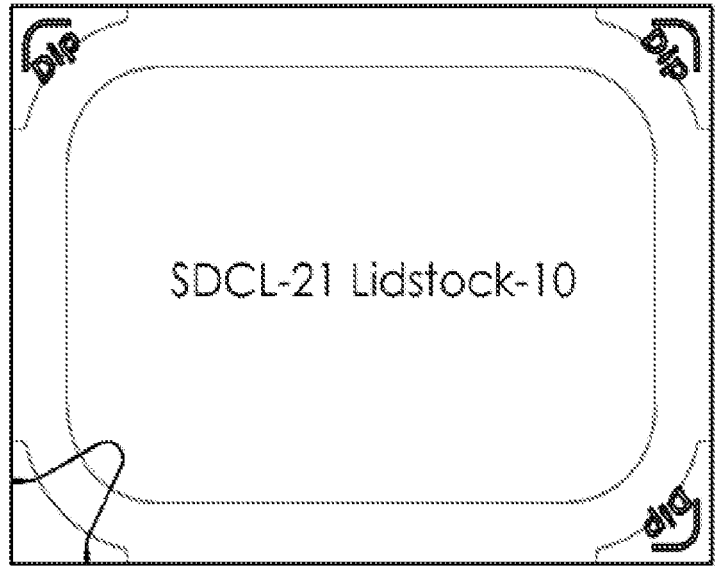
Figure 23J:
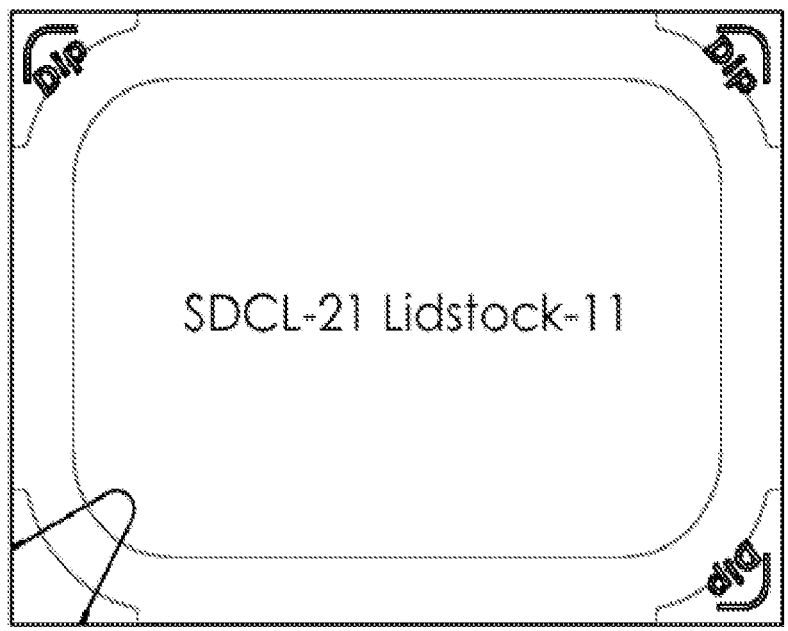
Figure 23K:
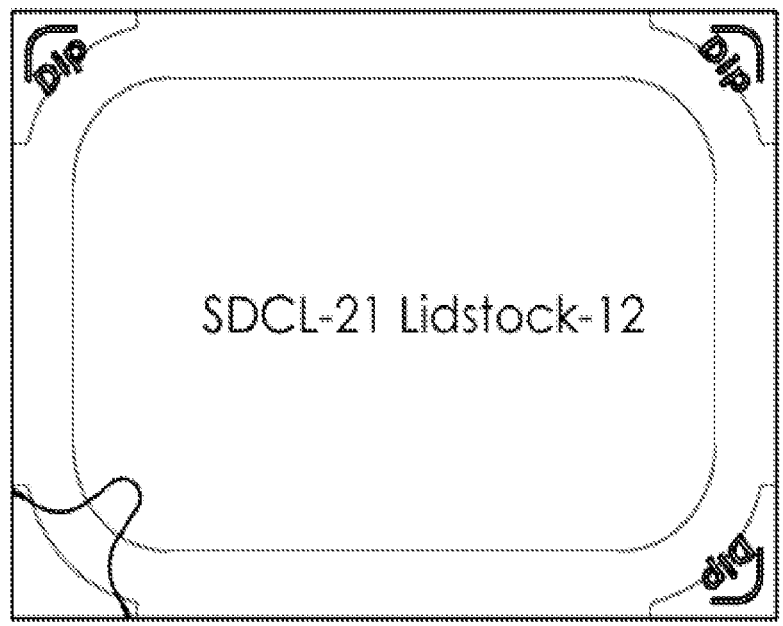
Figure 23L:
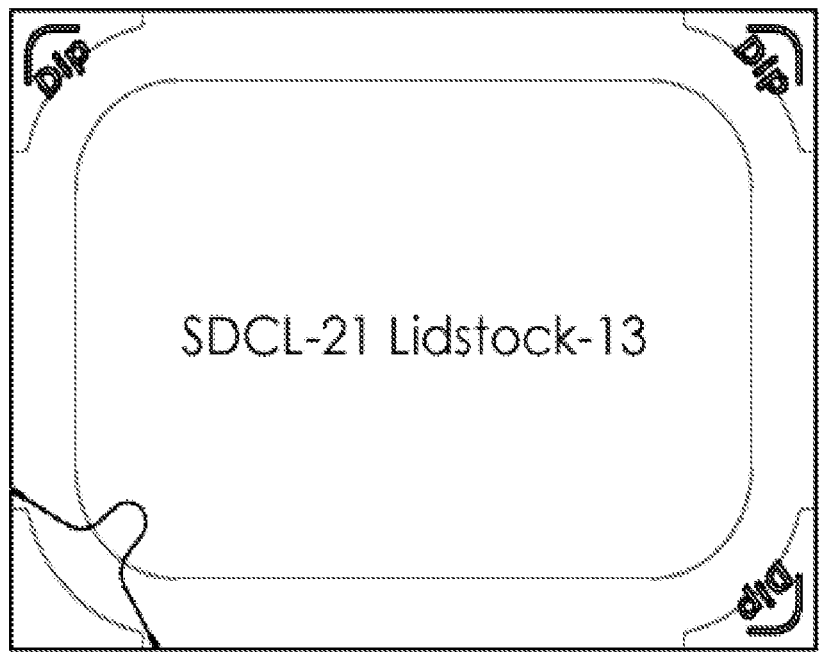
Figure 23M:
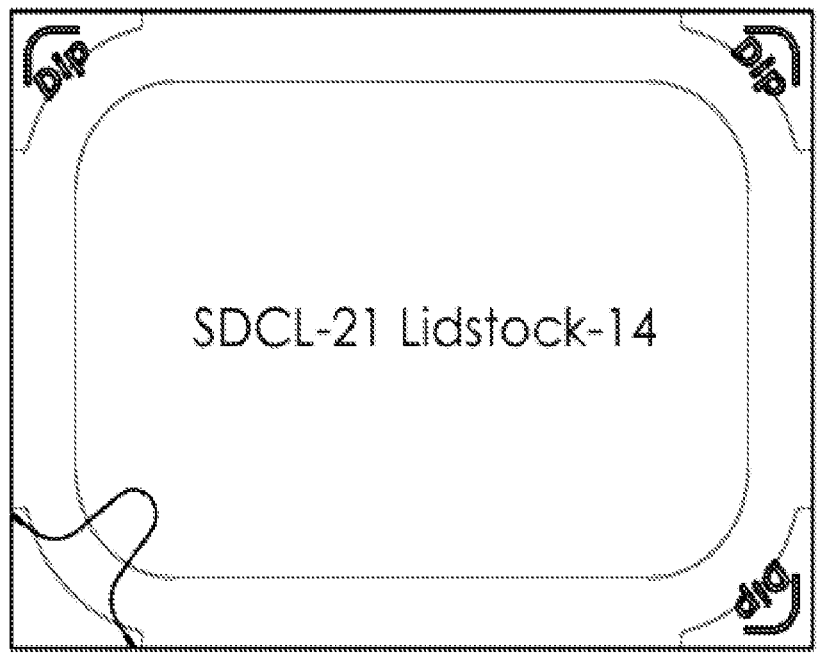
Figure 23N:
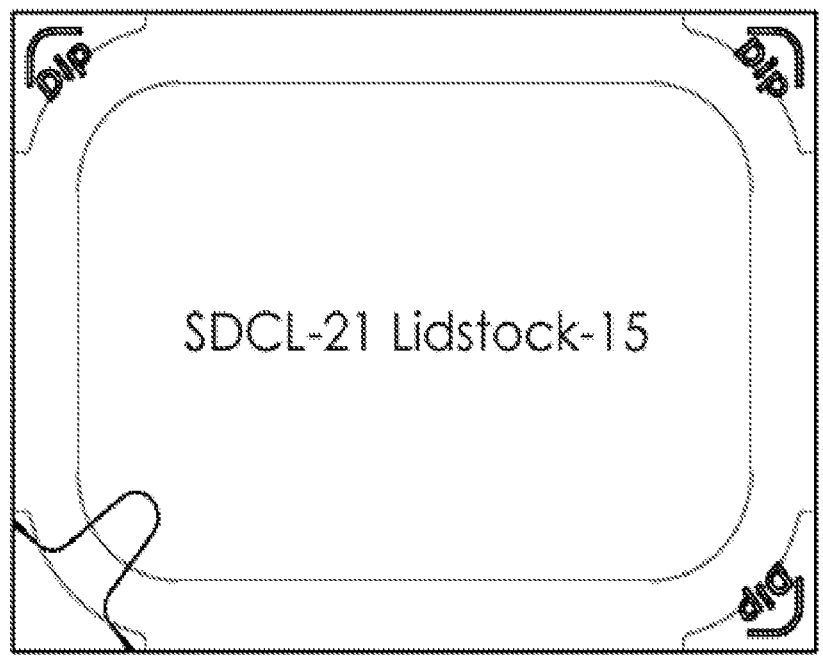
Figure 23O:
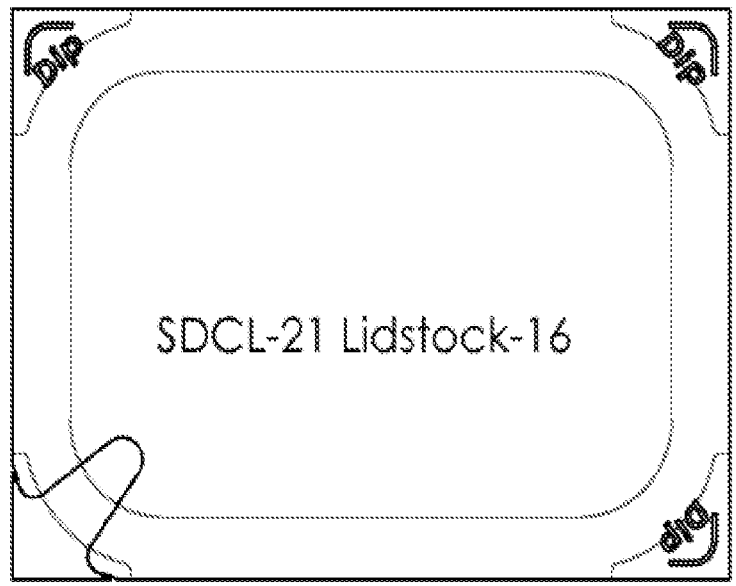
Figure 23P:
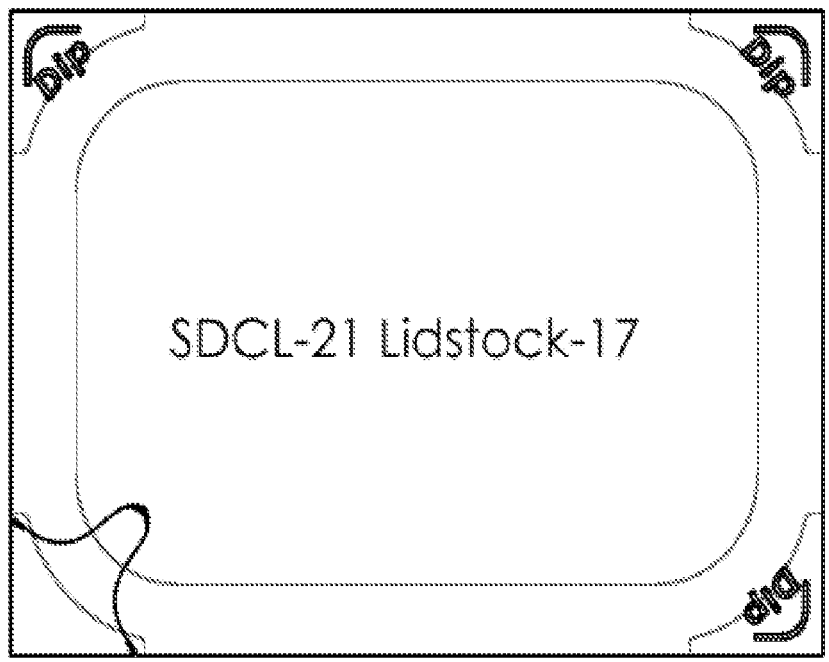
Figure 23Q:
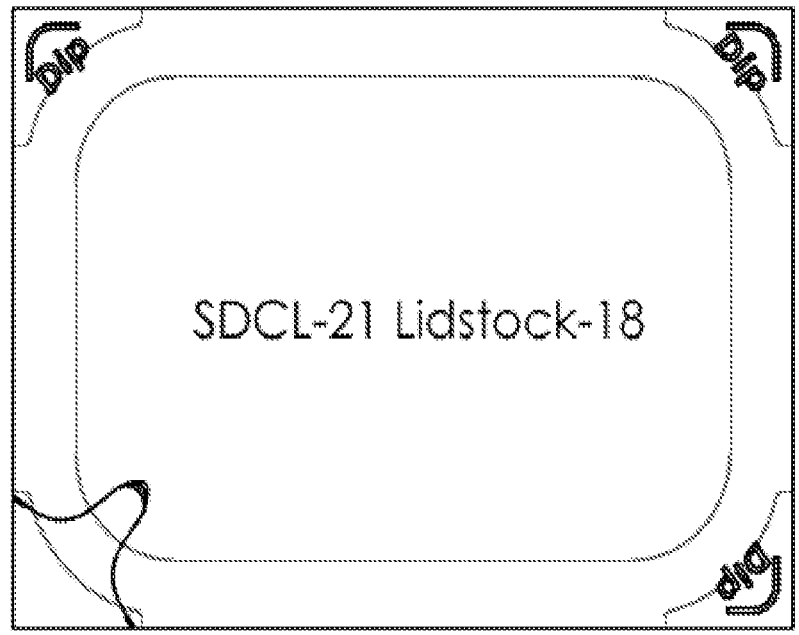
Figure 23R:
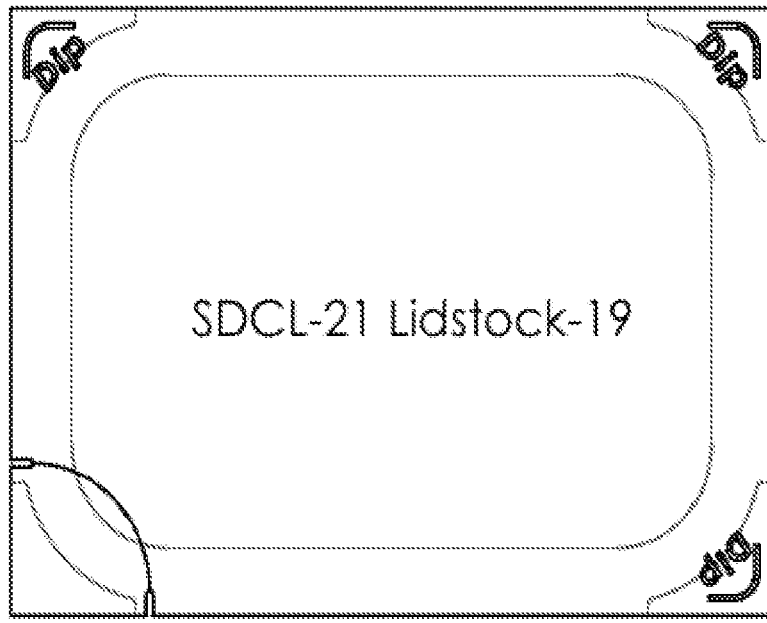
Figure 23S:
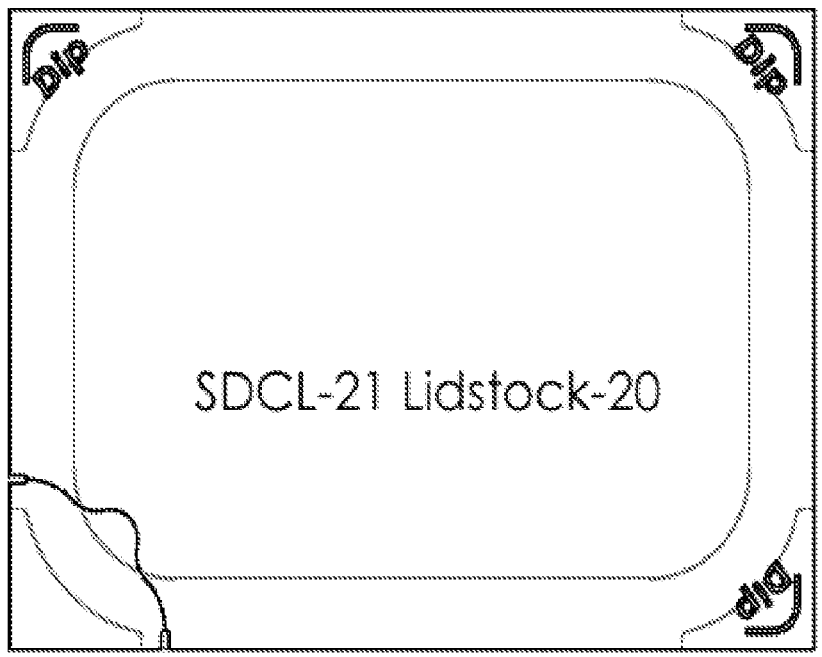
Figure 23T:
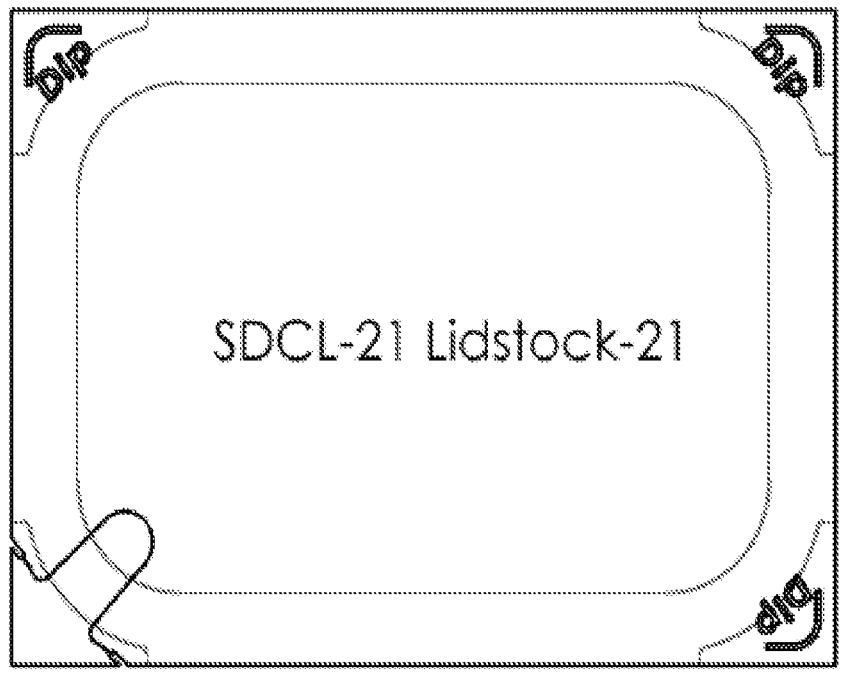
Figure 23U:
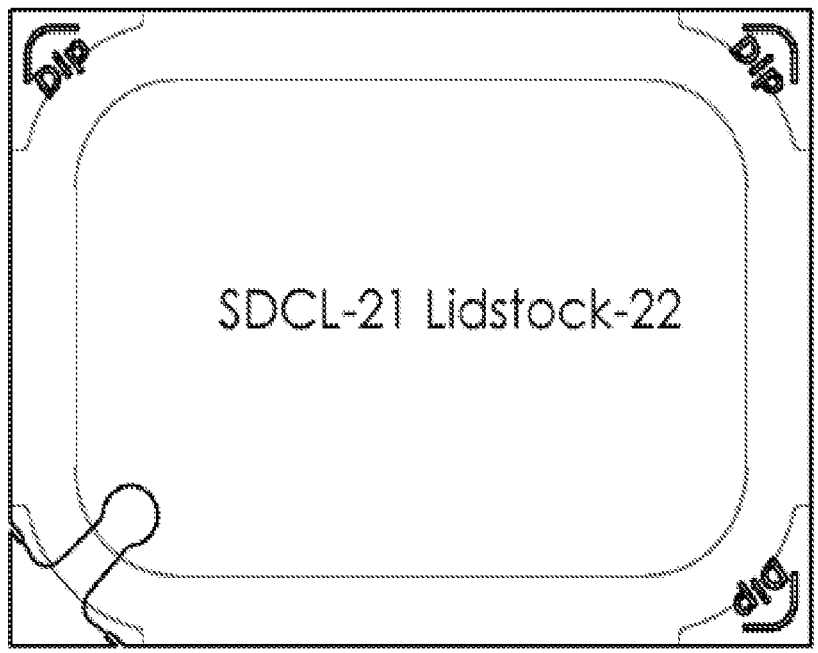
Figure 23V:
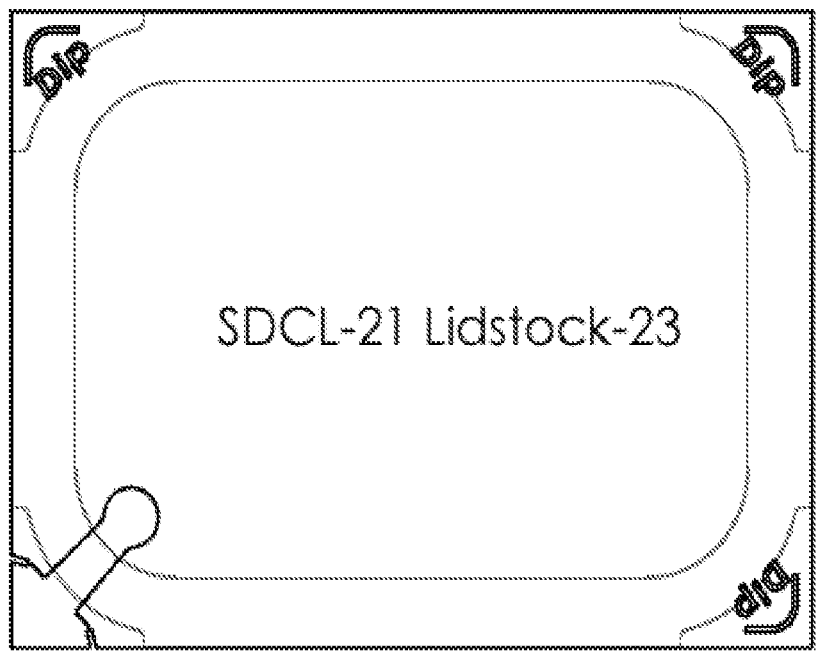
Figure 23W:
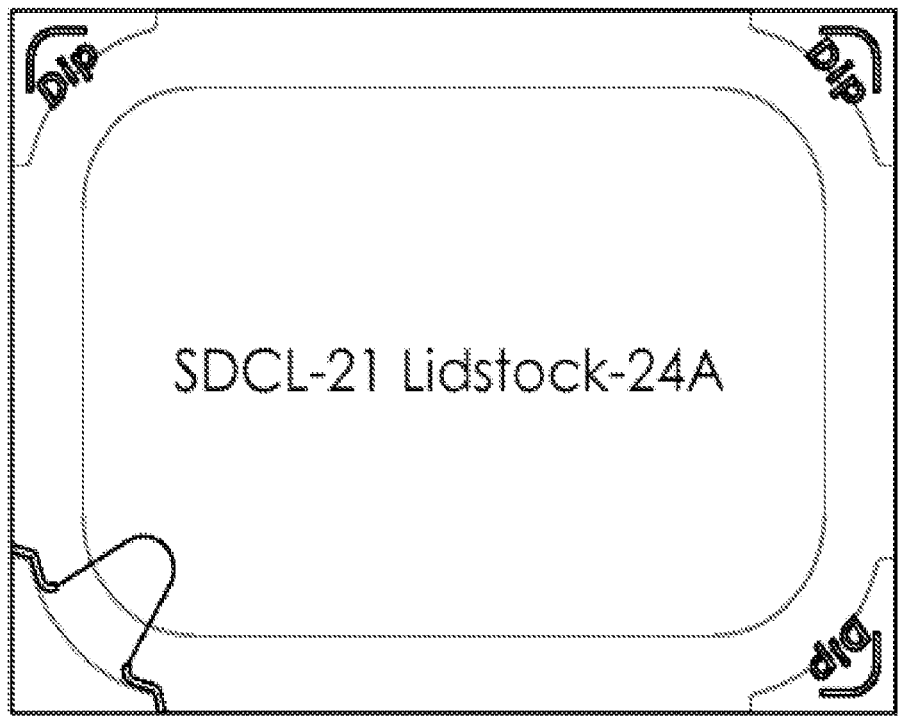

Referring to FIG. 20A, in this embodiment, orientation of the bodies 12 in the body assembly 112 must made to ensure proper orientation of the tapered step portion relative to the spout-type opening 26 defined in the lid. Referring to FIG. 21, when the spout type opening is defined by a patterned structure that defines the spout type openings of four adjacent containers 10, the bodies 12 of the embodiment illustrated in FIG. 21 must be arranged so that the tapered stepped portion is oriented to align with the spout-type opening 26. As seen in FIG. 20A, in the configuration of the container assembly 100 showing, this results in arrangement of the tapered stepped portion in facing relationship in two adjacent rows. Referring to FIG. 22, if the spout-type opening 26 is defined individually in each lid, as opposed to a grouped pattern, the bodies 12 of the embodiment must be oriented so that the tapered stepped portions are all disposed in the same direction. As noted above, in an alternative embodiment, the spout-type opening 26 can be disposed at the opposed end, which constitutes the deeper portion of the cup.

The body assembly 112 can be formed by various methods, including thermoforming, as is known in the art. Once thermoformed the body assembly 112 can then be filled with product and the lidding material having the spout-type opening 26 defined therein can be sealed to the body assembly 112 to form the container assembly 100. The sealed container assembly 100 can then be further processed to separate the containers into individual sealed containers. In some embodiments, depending on the filling equipment, the containers 10 can be separated prior to filling. In such embodiments, the equipment can also separate the lidding material 49 into the individual lids 50.

In any of the embodiments disclosed herein, the containers 10 of the container assembly 100 and/or the lids 50 of the lidding material 49 can in various embodiments be joined to adjacent containers 10 or lids 50 by a line of reduced strength to facilitate separation of the containers and lids.

EXAMPLES

Lids having spout-type openings 26 defined therein were made in accordance with embodiments of the disclosure, using laser scoring. A grouped pattern of spout-type openings 26 was formed in adjacent lids 14 of a sheet of lidding material 114 as illustrated in FIG. 8. The pattern of the laser scoring used in the following examples was as shown in FIG. 8. In each of the examples below, three lasers were used in parallel to form burn through and scoring patterns across the width the lidding material. Each laser forming a grouped pattern of spout-type openings 26 for four adjacent lids. The tables below provide the laser settings as well as the quality of the laser score or burn through in each of the rows and columns of the sheet of lidding material. In the table below, "burn through" refers to 100% penetration of the lidding material for formation of the initiation regions 36 and "score" refers to less than 100% penetration of the lidding material for formation of the patterns of reduced strength. In the present examples, the lidding material was a multi-layer structure having the following structure:

Ink—2.85 mil Foil—1 mil Polyethylene—48-gauge PET—Heat sealable coating.

Laser scoring was initiated from the heat sealable coating side of the film. When forming the pattern of reduced strength 28, the laser was operated to form a score line having penetration through only a portion of the PET layer. When forming the initiation regions 36, the laser was operated to burn through (100%) the entire structure.

Example 1

| L2, L3, L4 Score Process Speed (mm/sec) | L2 Burn Process Speed (mm/sec) | L3 Burn Process Speed (mm/sec) | L4 Burn Process Speed (mm/sec) | Score Frequency (kHz) | Burn Frequency (kHz) | Power (%) | L2 Focus Setting | L3 Focus Setting | L4 Focus Setting | Machine Running Speed (Ft/Min) |
|---|---|---|---|---|---|---|---|---|---|---|
| 3,000 | 250 | 250 | 250 | 20 | 40 | 100% | 500 | 485 | 450 | 25 |

| Laser Used: | Quality Rating, (0-10): Lane 1 Flex #L-2 A | Quality Rating, (0-10): Lane2 Flex #L-2 B | Quality Rating, (0-10): Lane3 Flex #L-3 A | Quality Rating, (0-10): Lane4 Flex #L-3 B | Quality Rating, (0-10): Lane5 Flex #L-4 A | Quality Rating, (0-10): Lane6 Flex #L-4 B | |
|---|---|---|---|---|---|---|---|
| Row #1 | 10 | 10 | 10 | 10 | 10 | 10 | |
| Row #2 | 10 | 10 | 10 | 10 | 10 | 10 | |
| Row #3 | 10 | 10 | 10 | 10 | 10 | 10 | |
| Row #4 | 10 | 10 | 10 | 10 | 10 | 10 | |
| | | | | | | | Lane 1-6 Burn Average |
| Min. | 10 | 10 | 10 | 10 | 10 | 10 | 10.00 |
| Max. | 10 | 10 | 10 | 10 | 10 | 10 | 10.00 |
| Ave. | 10 | 10 | 10 | 10 | 10 | 10 | 10.00 |
| StDev. | 0 | 0 | 0 | 0 | 0 | 0 | 0.00 |
| Score QC Sample #1 | 10 | 10 | 10 | 10 | 10 | 10 | Beginning |
| Score QC Sample #2 | 10 | 10 | 10 | 10 | 10 | 10 | End |
| Score QC Sample #3 | 10 | 10 | 10 | 10 | 10 | 10 | Beginning |
| Score QC Sample #4 | 10 | 10 | 10 | 10 | 10 | 10 | End |

|  | | | | | | | Lane 1-6 Score Average |
|---|---|---|---|---|---|---|---|
| Min. | 10 | 10 | 10 | 10 | 10 | 10 | 10.00 |
| Max. | 10 | 10 | 10 | 10 | 10 | 10 | 10.00 |
| Ave. | 10 | 10 | 10 | 10 | 10 | 10 | 10.00 |
| StDev. | 0 | 0 | 0 | 0 | 0 | 0 | 0.00 |

Example 2

| L2, L3, L4 Score Process Speed (mm/sec) | L2 Burn Process Speed (mm/sec) | L3 Burn Process Speed (mm/sec) | L4 Burn Process Speed (mm/sec) | Score Frequency (kHz) | Burn Frequency (kHz) | Power, (%) | L2 Focus Setting | L3 Focus Setting | L4 Focus Setting | Machine Running Speed (Ft/Min) |
|---|---|---|---|---|---|---|---|---|---|---|
| 5,000 | 250 | 250 | 250 | 40 | 40 | 100% | 500 | 485 | 450 | 25 |

| Laser Used: | Quality Rating, (0-10): Lane 1 Flex #L-2 A | Quality Rating, (0-10): Lane2 Flex #L-2 B | Quality Rating, (0-10): Lane3 Flex #L-3 A | Quality Rating, (0-10): Lane4 Flex #L-3 B | Quality Rating, (0-10): Lane5 Flex #L-4 A | Quality Rating, (0-10): Lane6 Flex #L-4 B |
|---|---|---|---|---|---|---|
| Row #1 | 10 | 10 | 10 | 10 | 10 | 10 |
| Row #2 | 10 | 10 | 10 | 10 | 10 | 10 |
| Row #3 | 10 | 10 | 10 | 10 | 10 | 10 |
| Row #4 | 10 | 10 | 10 | 10 | 10 | 10 |

|  | | | | | | | Lane 1-6 Burn Average |
|---|---|---|---|---|---|---|---|
| Min. | 10 | 10 | 10 | 10 | 10 | 10 | 10.00 |
| Max. | 10 | 10 | 10 | 10 | 10 | 10 | 10.00 |
| Ave. | 10 | 10 | 10 | 10 | 10 | 10 | 10.00 |
| StDev. | 0 | 0 | 0 | 0 | 0 | 0 | 0.00 |
| Score QC Sample #1 | 10 | 10 | 10 | 10 | 10 | 10 | Beginning |
| Score QC Sample #2 | 10 | 10 | 10 | 8 | 8 | 10 | End |
| Score QC Sample #3 | 10 | 10 | 10 | 10 | 10 | 10 | Beginning |
| Score QC Sample #4 | 10 | 10 | 10 | 10 | 10 | 10 | End |

|  | | | | | | | Lane 1-6 Score Average |
|---|---|---|---|---|---|---|---|
| Min. | 10 | 10 | 10 | 8 | 8 | 10 | 9.33 |
| Max. | 10 | 10 | 10 | 10 | 10 | 10 | 10.00 |
| Ave. | 10 | 10 | 10 | 9.5 | 9.5 | 10 | 9.83 |
| StDev. | 0 | 0 | 0 | 1 | 1 | 0 | 0.33 |

Example 3

| L2, L3, L4 Score Process Speed (mm/sec) | L2 Burn Process Speed (mm/sec) | L3 Burn Process Speed (mm/sec) | L4 Burn Process Speed (mm/sec) | Score Frequency (kHz) | Burn Frequency (kHz) | Power, (%) | L2 Focus Setting | L3 Focus Setting | L4 Focus Setting | Machine Running Speed (Ft/Min) |
|---|---|---|---|---|---|---|---|---|---|---|
| 7,000 | 250 | 250 | 250 | 40 | 40 | 100% | 500 | 485 | 450 | 25 |

| Laser Used: | Quality Rating, (0-10): Lane 1 Flex #L-2 | Quality Rating, (0-10): Lane2 Flex #L-2 | Quality Rating, (0-10): Lane3 Flex #L-3 | Quality Rating, (0-10): Lane4 Flex #L-3 | Quality Rating, (0-10): Lane5 Flex #L-4 | Quality Rating, (0-10): Lane6 Flex #L-4 |
|---|---|---|---|---|---|---|

|  | A | B | A | B | A | B |  |
|---|---|---|---|---|---|---|---|
| Row #1 | 10 | 10 | 10 | 10 | 10 | 10 |  |
| Row #2 | 10 | 10 | 10 | 10 | 10 | 10 |  |
| Row #3 | 10 | 10 | 10 | 10 | 10 | 10 |  |
| Row #4 | 10 | 10 | 10 | 10 | 10 | 10 |  |
|  |  |  |  |  |  |  | Lane 1-6 Burn Average |
| Min. | 10 | 10 | 10 | 10 | 10 | 10 | 10.00 |
| Max. | 10 | 10 | 10 | 10 | 10 | 10 | 10.00 |
| Ave. | 10 | 10 | 10 | 10 | 10 | 10 | 10.00 |
| StDev. | 0 | 0 | 0 | 0 | 0 | 0 | 0.00 |
| Score QC Sample #1 | 10 | 10 | 10 | 10 | 6 | 10 | Beginning |
| Score QC Sample #2 | 10 | 10 | 10 | 10 | 10 | 10 | End |
| Score QC Sample #3 | 10 | 10 | 10 | 10 | 10 | 10 | Beginning |
| Score QC Sample #4 | 10 | 10 | 10 | 10 | 10 | 10 | End |
|  |  |  |  |  |  |  | Lane 1-6 Score Average |
| Min. | 10 | 10 | 10 | 10 | 6 | 10 | 9.33 |
| Max. | 10 | 10 | 10 | 10 | 10 | 10 | 10.00 |
| Ave. | 10 | 10 | 10 | 10 | 9 | 10 | 9.83 |
| StDev. | 0 | 0 | 0 | 0 | 2 | 0 | 0.33 |

Example 4

| L2, L3, L4 Score Process Speed (mm/sec) | L2 Burn Process Speed (mm/sec) | L3 Burn Process Speed (mm/sec) | L4 Burn Process Speed (mm/sec) | Score Frequency (kHz) | Burn Frequency (kHz) | Power (%) | L2 Focus Setting | L3 Focus Setting | L4 Focus Setting | Machine Running Speed (Ft/Min) |
|---|---|---|---|---|---|---|---|---|---|---|
| 10,000 | 225 | 225 | 225 | 40 | 40 | 100% | 500 | 485 | 450 | 25 |

| Laser Used: | Quality Rating, (0-10): Lane 1 Flex #L-2 A | Quality Rating, (0-10): Lane2 Flex #L-2 B | Quality Rating, (0-10): Lane3 Flex #L-3 A | Quality Rating, (0-10): Lane4 Flex #L-3 B | Quality Rating, (0-10): Lane5 Flex #L-4 A | Quality Rating, (0-10): Lane6 Flex #L-4 B |  |
|---|---|---|---|---|---|---|---|
| Row #1 | 10 | 10 | 10 | 10 | 10 | 10 |  |
| Row #2 | 10 | 10 | 10 | 10 | 10 | 10 |  |
| Row #3 | 10 | 10 | 10 | 10 | 10 | 10 |  |
| Row #4 | 10 | 10 | 10 | 10 | 10 | 10 |  |
|  |  |  |  |  |  |  | Lane 1-6 Burn Average |
| Min. | 10 | 10 | 10 | 10 | 10 | 10 | 10.00 |
| Max. | 10 | 10 | 10 | 10 | 10 | 10 | 10.00 |
| Ave. | 10 | 10 | 10 | 10 | 10 | 10 | 10.00 |
| StDev. | 0 | 0 | 0 | 0 | 0 | 0 | 0.00 |
| Score QC Sample #1 | 10 | 10 | 8 | 10 | 10 | 10 | Beginning |
| Score QC Sample #2 | 10 | 10 | 8 | 9 | 10 | 10 | End |
| Score QC Sample #3 | 10 | 10 | 8 | 10 | 10 | 10 | Beginning |
| Score QC Sample #4 | 10 | 10 | 8 | 8 | 10 | 10 | End |
|  |  |  |  |  |  |  | Lane 1-6 Score Average |
| Min. | 10 | 10 | 8 | 8 | 10 | 10 | 9.33 |
| Max. | 10 | 10 | 8 | 10 | 10 | 10 | 9.67 |

-continued

| | | | | | | | |
|---|---|---|---|---|---|---|---|
| Ave. | 10 | 10 | 8 | 9.25 | 10 | 10 | 9.54 |
| StDev. | 0 | 0 | 0 | 0.957427108 | 0 | 0 | 0.16 |

Example 5

| L2, L3, L4 Score Process Speed (mm/sec) | L2 Burn Process Speed (mm/sec) | L3 Burn Process Speed (mm/sec) | L4 Burn Process Speed (mm/sec) | Score Frequency (kHz) | Burn Frequency (kHz) | Power (%) | L2 Focus Setting | L3 Focus Setting | L4 Focus Setting | Machine Running Speed (Ft/Min) |
|---|---|---|---|---|---|---|---|---|---|---|
| 6,000 | 225 | 225 | 225 | 40 | 40 | 100% | 500 | 485 | 450 | 25 |

| Laser Used: | Quality Rating, (0-10): Lane 1 Flex #L-2 A | Quality Rating, (0-10): Lane2 Flex #L-2 B | Quality Rating, (0-10): Lane3 Flex #L-3 A | Quality Rating, (0-10): Lane4 Flex #L-3 B | Quality Rating, (0-10): Lane5 Flex #L-4 A | Quality Rating, (0-10): Lane6 Flex #L-4 B | |
|---|---|---|---|---|---|---|---|
| Row #1 | 10 | 10 | 10 | 10 | 10 | 10 | |
| Row #2 | 10 | 10 | 10 | 10 | 10 | 10 | |
| Row #3 | 10 | 10 | 10 | 10 | 10 | 10 | |
| Row #4 | 10 | 10 | 10 | 10 | 10 | 10 | |
| | | | | | | | Lane 1-6 Burn Average |
| Min. | 10 | 10 | 10 | 10 | 10 | 10 | 10.00 |
| Max. | 10 | 10 | 10 | 10 | 10 | 10 | 10.00 |
| Ave. | 10 | 10 | 10 | 10 | 10 | 10 | 10.00 |
| StDev. | 0 | 0 | 0 | 0 | 0 | 0 | 0.00 |
| Score QC Sample #1 | 10 | 10 | 10 | 10 | 10 | 10 | Beginning |
| Score QC Sample #2 | 10 | 10 | 10 | 10 | 10 | 10 | End |
| Score QC Sample #3 | 10 | 10 | 10 | 10 | 10 | 10 | Beginning |
| Score QC Sample #4 | 10 | 10 | 10 | 10 | 10 | 10 | End |
| | | | | | | | Lane 1-6 Score Average |
| Min. | 10 | 10 | 10 | 10 | 10 | 10 | 10.00 |
| Max. | 10 | 10 | 10 | 10 | 10 | 10 | 10.00 |
| Ave. | 10 | 10 | 10 | 10 | 10 | 10 | 10.00 |
| StDev. | 0 | 0 | 0 | 0 | 0 | 0 | 0.00 |

While various embodiments have been described above, the disclosure is not intended to be limited thereto. Variations can be made to the disclosed embodiments that are still within the scope of the appended aspect.

What is claimed:

1. A container, comprising:
a body having an interior volume defined therein for retaining a product;
a top flange surrounding a top surface of the body; and
a lid having a spout-shaped opening region defined therein by at least one initiation region and a pattern of reduced strength connected to the initiation region, wherein:
the spout-shaped opening is formed by removal of a portion of the lid starting at the initiation region and following the pattern of reduced strength,
the initiation region comprises a score line having 100% penetration through the lid, and
the pattern of reduced strength comprises a score line or perforations having less than 100% penetration through the lid.

2. The container of claim 1, wherein the body comprises one or more ribs.

3. The container of claim 2, wherein the one or more ribs are disposed in at least one corner of body of the container.

4. The container of claim 3, wherein the one or more ribs are disposed in each of the corners of the container.

5. The container of claim 1, wherein the lid is formed of a material having a multi-layer structure.

6. The container of claim 5, wherein the material comprises a foil-polyethylene-polyethylene terephthalate-heat sealable coating, and the pattern of reduced strength comprises a score line or perforations having penetration through only a portion of the polyethylene terephthalate layer.

7. The container of claim 1, wherein the pattern of reduced strength comprises score lines or perforations having about 40% to about 100% penetration through a polyethylene terephthalate layer.

8. The container of claim 1, wherein the body comprises a bottom oppositely disposed the top flange, wherein the bottom has a width that is less than the width of the body at the top flange, and a side wall of the body is tapered upwardly from the bottom of the body to the top flange and comprises stepped portions as it tapers upwardly.

9. The container of claim 1, wherein the initiation region is disposed at or near a circumference of the top flange.

10. The container of claim 1, wherein the transition between the initiation region and the pattern of reduced strength is disposed about the top flange.

11. The container of claim 1, wherein the pattern of reduced strength extends from the top flange inwardly such that at least a portion of the pattern of reduced strength is disposed over the interior volume.

12. The container of claim 1, wherein the spout-shaped opening comprises an initiation region disposed at opposed end points of the pattern of reduced strength.

13. The container of claim 1, wherein the pattern of reduced strength includes a curved portion disposed above the interior volume.

14. The container of claim 1, wherein the at least one initiation region and the pattern of reduced strength are formed by laser scoring.

\* \* \* \* \*